(12) United States Patent
Jahnes et al.

(10) Patent No.: US 10,618,803 B2
(45) Date of Patent: Apr. 14, 2020

(54) PLANAR CAVITY MEMS AND RELATED STRUCTURES, METHODS OF MANUFACTURE AND DESIGN STRUCTURES

(71) Applicant: INTERNATIONAL BUSINESS MACHINES CORPORATION, Armonk, NY (US)

(72) Inventors: Christopher V. Jahnes, Upper Saddle River, NJ (US); Anthony K. Stamper, Burlington, VT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/270,905

(22) Filed: Feb. 8, 2019

(65) Prior Publication Data
US 2019/0169017 A1    Jun. 6, 2019

Related U.S. Application Data

(60) Continuation of application No. 15/802,801, filed on Nov. 3, 2017, now Pat. No. 10,246,319, which is a
(Continued)

(51) Int. Cl.
*H01P 1/12* (2006.01)
*B81B 3/00* (2006.01)
(Continued)

(52) U.S. Cl.
CPC .......... *B81B 3/0072* (2013.01); *B81B 3/0021* (2013.01); *B81C 1/0015* (2013.01);
(Continued)

(58) Field of Classification Search
CPC ..... H01P 1/10; H01P 1/12; B81C 1/10; B81C 1/0015
(Continued)

(56) References Cited

U.S. PATENT DOCUMENTS

| | | |
|---|---|---|
| 5,278,368 A | 1/1994 | Kasano et al. |
| 5,324,683 A | 6/1994 | Fitch et al. |

(Continued)

FOREIGN PATENT DOCUMENTS

| | | |
|---|---|---|
| CN | 101417785 | 4/2009 |
| DE | 10321482 | 11/2003 |

(Continued)

OTHER PUBLICATIONS

Final Office Action dated Mar. 21, 2019 in related U.S. Appl. No. 15/238,854, 18 pages.
(Continued)

*Primary Examiner* — Dean O Takaoka
(74) *Attorney, Agent, or Firm* — Alvin Borromeo; Andrew M. Calderon; Roberts Mlotkowski Safran Cole & Calderon P.C.

(57) ABSTRACT

A method of forming a Micro-Electro-Mechanical System (MEMS) includes forming a lower electrode on a first insulator layer within a cavity of the MEMS. The method further includes forming an upper electrode over another insulator material on top of the lower electrode which is at least partially in contact with the lower electrode. The forming of the lower electrode and the upper electrode includes adjusting a metal volume of the lower electrode and the upper electrode to modify beam bending.

12 Claims, 35 Drawing Sheets

Related U.S. Application Data continuation of application No. 15/284,868, filed on Oct. 4, 2016, now Pat. No. 9,926,191, which is a continuation of application No. 14/963,844, filed on Dec. 9, 2015, now Pat. No. 9,828,243, which is a continuation of application No. 14/184,950, filed on Feb. 20, 2014, now Pat. No. 9,352,954, which is a division of application No. 12/973,235, filed on Dec. 20, 2010, now Pat. No. 8,709,264.

(60) Provisional application No. 61/358,621, filed on Jun. 25, 2010.

(51) Int. Cl.
*H01L 41/113* (2006.01)
*B81C 1/00* (2006.01)
*H01H 57/00* (2006.01)
*G06F 17/50* (2006.01)
*H01H 1/00* (2006.01)
*H01H 59/00* (2006.01)

(52) U.S. Cl.
CPC ...... *B81C 1/00365* (2013.01); *B81C 1/00476* (2013.01); *B81C 1/00619* (2013.01); *B81C 1/00626* (2013.01); *B81C 1/00666* (2013.01); *G06F 17/5068* (2013.01); *G06F 17/5072* (2013.01); *H01H 1/0036* (2013.01); *H01H 57/00* (2013.01); *H01H 59/0009* (2013.01); *H01L 41/1136* (2013.01); *B81B 2201/01* (2013.01); *B81B 2201/014* (2013.01); *B81B 2203/0118* (2013.01); *B81B 2203/0315* (2013.01); *B81B 2203/04* (2013.01); *B81C 2201/013* (2013.01); *B81C 2201/017* (2013.01); *B81C 2201/0109* (2013.01); *B81C 2201/0167* (2013.01); *B81C 2203/0136* (2013.01); *B81C 2203/0172* (2013.01); *H01H 2057/006* (2013.01); *H01L 2924/0002* (2013.01); *Y10S 438/937* (2013.01); *Y10T 29/42* (2015.01); *Y10T 29/435* (2015.01); *Y10T 29/49002* (2015.01); *Y10T 29/4913* (2015.01); *Y10T 29/49105* (2015.01); *Y10T 29/49121* (2015.01); *Y10T 29/49126* (2015.01); *Y10T 29/49155* (2015.01); *Y10T 29/5313* (2015.01)

(58) Field of Classification Search
USPC .................................................. 333/105, 262
See application file for complete search history.

(56) References Cited

U.S. PATENT DOCUMENTS

| | | |
|---|---|---|
| 5,544,001 A | 8/1996 | Ichiya et al. |
| 5,619,061 A | 4/1997 | Goldsmith et al. |
| 5,693,568 A | 12/1997 | Liu et al. |
| 5,795,829 A | 8/1998 | Shen |
| 6,018,184 A | 1/2000 | Becker |
| 6,116,863 A | 9/2000 | Ahn et al. |
| 6,143,638 A | 11/2000 | Bohr |
| 6,160,230 A | 12/2000 | McMillan et al. |
| 6,352,917 B1 | 3/2002 | Gupta et al. |
| 6,359,374 B1 | 3/2002 | Daush et al. |
| 6,445,106 B1 | 9/2002 | Ma et al. |
| 6,573,822 B2 | 6/2003 | Ma |
| 6,639,488 B2 | 10/2003 | Deligianni et al. |
| 6,701,779 B2 | 3/2004 | Volant et al. |
| 6,713,235 B1 | 3/2004 | Ide et al. |
| 6,746,891 B2 | 6/2004 | Cunningham et al. |
| 6,789,029 B2 | 9/2004 | Rober |
| 6,808,954 B2 | 10/2004 | Ma et al. |
| 6,812,814 B2 | 11/2004 | Ma et al. |
| 6,847,114 B2 | 1/2005 | Sett et al. |
| 6,852,926 B2 | 2/2005 | Ma et al. |
| 6,876,047 B2 | 4/2005 | Cunningham et al. |
| 6,876,482 B2 | 4/2005 | DeRuss |
| 6,882,264 B2 | 4/2005 | Cunningham |
| 6,897,537 B2 | 4/2005 | de los Santos |
| 6,917,086 B2 | 7/2005 | Cunningham et al. |
| 6,928,879 B2 | 8/2005 | Partridge et al. |
| 7,002,439 B2 | 2/2006 | Rottenberg et al. |
| 7,008,812 B1 | 3/2006 | Carley |
| 7,019,434 B2 | 3/2006 | Helmbrecht |
| 7,033,910 B2 | 4/2006 | Faris |
| 7,045,843 B2 | 5/2006 | Goto |
| 7,064,637 B2 | 6/2006 | Tactic-Lucic et al. |
| 7,138,745 B1 | 11/2006 | Helmbrecht |
| 7,180,145 B2 | 2/2007 | Musalem et al. |
| 7,215,229 B2 | 5/2007 | Shen et al. |
| 7,285,863 B2 | 10/2007 | Kanda |
| 7,294,282 B1 | 11/2007 | Helmbrecht |
| 7,299,538 B2 | 11/2007 | Tactic-Lucic |
| 7,319,274 B2 | 1/2008 | Beyer et al. |
| 7,344,907 B2 | 3/2008 | Colgan et al. |
| 7,361,962 B2 | 4/2008 | Plowman et al. |
| 7,381,583 B1 | 6/2008 | Ebel et al. |
| 7,388,316 B2 | 6/2008 | Musalem et al. |
| 7,394,332 B2 | 7/2008 | Hsu et al. |
| 7,402,449 B2 | 7/2008 | Fukuda et al. |
| 7,544,531 B1 | 6/2009 | Grosjean |
| 7,545,081 B2 | 6/2009 | Kim et al. |
| 7,545,622 B2 | 6/2009 | Morris, III et al. |
| 7,579,663 B2 | 8/2009 | Wan |
| 7,666,700 B2 | 2/2010 | Igarashi |
| 7,692,519 B2 | 4/2010 | Premerlani et al. |
| 7,880,246 B2 | 2/2011 | Hohlfeld et al. |
| 7,923,790 B1 | 4/2011 | Quevy et al. |
| 7,972,884 B2 | 7/2011 | Obata et al. |
| 8,004,053 B2 | 8/2011 | Miyagi et al. |
| 8,053,850 B2 | 11/2011 | Yamaguchi et al. |
| 8,138,008 B1 | 3/2012 | Hasselbach et al. |
| 8,142,669 B2 | 3/2012 | Akiba et al. |
| 8,294,976 B1 | 10/2012 | De Wolf et al. |
| 8,432,240 B2 | 4/2013 | Page et al. |
| 8,458,888 B2 | 6/2013 | Stamper et al. |
| 8,685,778 B2 | 4/2014 | Jahnes et al. |
| 8,709,264 B2 | 4/2014 | Jahnes et al. |
| 8,722,445 B2 | 5/2014 | Dang et al. |
| 8,779,886 B2 | 7/2014 | Aimi et al. |
| 8,865,497 B2 | 10/2014 | Dunbar, III et al. |
| 8,921,144 B2 | 12/2014 | Dunbar, III et al. |
| 8,955,212 B2 | 2/2015 | Mao et al. |
| 8,956,903 B2 | 2/2015 | Herrin et al. |
| 8,957,747 B2 | 2/2015 | Wilson et al. |
| 9,041,128 B2 | 5/2015 | Dunbar, III et al. |
| 9,330,856 B2 | 5/2016 | Herrin et al. |
| 9,352,954 B2 | 5/2016 | Jahnes et al. |
| 9,637,373 B2 | 5/2017 | Jahnes et al. |
| 9,815,690 B2 | 11/2017 | Herrin et al. |
| 9,828,243 B2 | 11/2017 | Jahnes et al. |
| 9,862,598 B2 | 1/2018 | Herrin et al. |
| 9,926,191 B2 * | 3/2018 | Jahnes ............... B81C 1/00365 |
| 9,932,225 B2 | 4/2018 | Jahnes et al. |
| 10,011,477 B2 | 7/2018 | Jahnes et al. |
| 10,081,540 B2 | 9/2018 | Stamper et al. |
| 10,214,416 B2 | 2/2019 | Jahnes et al. |
| 10,246,319 B2 * | 4/2019 | Jahnes ............... B81C 1/00476 |
| 10,308,501 B2 | 6/2019 | Jahnes et al. |
| 10,315,913 B2 | 6/2019 | Jahnes et al. |
| 2002/0099980 A1 | 7/2002 | Olarig |
| 2002/0168136 A1 | 11/2002 | Atia et al. |
| 2003/0034239 A1 | 2/2003 | Chason et al. |
| 2003/0061958 A1 | 4/2003 | Zhang |
| 2003/0116417 A1 | 6/2003 | DeReus |
| 2003/0148550 A1 | 8/2003 | Volant et al. |
| 2003/0217915 A1 | 11/2003 | Ouellet et al. |
| 2003/0229412 A1 | 12/2003 | White et al. |
| 2004/0033639 A1 | 2/2004 | Chinn et al. |
| 2004/0094086 A1 | 5/2004 | Shimaoka et al. |
| 2004/0126921 A1 | 7/2004 | Volant et al. |
| 2004/0150869 A1 | 8/2004 | Kasai |

(56) References Cited

U.S. PATENT DOCUMENTS

| | | |
|---|---|---|
| 2004/0180541 A1 | 9/2004 | Joshi |
| 2004/0235297 A1 | 11/2004 | Lin |
| 2005/0036269 A1 | 2/2005 | Ma et al. |
| 2005/0048687 A1 | 3/2005 | Tatic-Lucic |
| 2005/0098840 A1 | 5/2005 | Fuertsch et al. |
| 2005/0124089 A1 | 6/2005 | Gogoi et al. |
| 2005/0184836 A1 | 8/2005 | Chou |
| 2005/0285161 A1 | 12/2005 | Kang et al. |
| 2006/0055287 A1 | 3/2006 | Kawakubo et al. |
| 2006/0065941 A1 | 3/2006 | Delapierre |
| 2006/0108652 A1 | 5/2006 | Partridge et al. |
| 2006/0203421 A1 | 9/2006 | Morris, III et al. |
| 2007/0048888 A1 | 3/2007 | Christenson |
| 2007/0090447 A1 | 4/2007 | Morimoto et al. |
| 2007/0093045 A1 | 4/2007 | Yamaguchi et al. |
| 2007/0134835 A1 | 6/2007 | Fukuda et al. |
| 2007/0134927 A1 | 6/2007 | Fortin et al. |
| 2007/0138582 A1 | 6/2007 | Nystrom et al. |
| 2007/0190680 A1 | 8/2007 | Fukuda et al. |
| 2008/0001239 A1 | 1/2008 | Enomoto et al. |
| 2008/0014663 A1 | 1/2008 | Hsu et al. |
| 2008/0050676 A1 | 2/2008 | Hoshino |
| 2008/0093684 A1 | 4/2008 | Inaba et al. |
| 2008/0105951 A1 | 5/2008 | Sato et al. |
| 2008/0108381 A1 | 5/2008 | Hong et al. |
| 2008/0194076 A1 | 8/2008 | Chang et al. |
| 2008/0224319 A1 | 9/2008 | Nakamura |
| 2008/0257497 A1 | 10/2008 | Shimaoka et al. |
| 2008/0272867 A1 | 11/2008 | Cohn et al. |
| 2008/0308920 A1 | 12/2008 | Wan |
| 2008/0315332 A1 | 12/2008 | Kaelberer et al. |
| 2009/0017579 A1 | 1/2009 | Jeong et al. |
| 2009/0045474 A1 | 2/2009 | Nakatani |
| 2009/0108381 A1 | 4/2009 | Buchwalter et al. |
| 2009/0134492 A1 | 5/2009 | Morris et al. |
| 2009/0134513 A1 | 5/2009 | Qiu |
| 2009/0145629 A1 | 6/2009 | Mikami et al. |
| 2009/0146227 A1 | 6/2009 | Igarashi |
| 2009/0169035 A1 | 7/2009 | Rombach et al. |
| 2009/0218233 A1 | 9/2009 | Fredenberg et al. |
| 2009/0236114 A1 | 9/2009 | Obata et al. |
| 2009/0267166 A1 | 10/2009 | Verheijden et al. |
| 2009/0275163 A1 | 11/2009 | Lacey et al. |
| 2009/0325335 A1 | 12/2009 | Perruchot et al. |
| 2010/0009509 A1 | 1/2010 | Coolbaugh et al. |
| 2010/0038731 A1 | 2/2010 | Van Kampen et al. |
| 2010/0065930 A1 | 3/2010 | Nakatani |
| 2010/0181866 A1 | 7/2010 | DeRues |
| 2010/0295138 A1 | 11/2010 | Montanya Silvestre et al. |
| 2010/0308423 A1 | 12/2010 | Shimooka |
| 2011/0049649 A1 | 3/2011 | Anderson et al. |
| 2011/0281389 A1 | 11/2011 | Mikami et al. |
| 2011/0315527 A1 | 12/2011 | Dang et al. |
| 2011/0315528 A1 | 12/2011 | Herrin et al. |
| 2011/0316097 A1 | 12/2011 | Herrin et al. |
| 2012/0031746 A1 | 2/2012 | Hwang et al. |
| 2012/0133006 A1 | 5/2012 | Hasselbach et al. |
| 2013/0234265 A1 | 9/2013 | Stamper et al. |
| 2015/0041932 A1 | 2/2015 | Herrin et al. |
| 2016/0244321 A1 | 8/2016 | Jahnes et al. |
| 2017/0022048 A1 | 1/2017 | Jahnes et al. |
| 2017/0158490 A1 | 6/2017 | Jahnes et al. |
| 2018/0009658 A1 | 1/2018 | Jahnes et al. |
| 2018/0072566 A1 | 3/2018 | Jahnes et al. |

FOREIGN PATENT DOCUMENTS

| | | |
|---|---|---|
| DE | 60215045 | 3/2007 |
| DE | 60222468 | 6/2008 |
| DE | 102008040851 | 2/2010 |
| EP | 1382565 | 1/2004 |
| WO | 0016105 | 3/2000 |
| WO | 0198786 | 12/2001 |
| WO | 2009050209 | 4/2009 |
| WO | 2011162950 | 12/2011 |
| WO | 2011162953 | 12/2011 |

OTHER PUBLICATIONS

Office Action dated Apr. 12, 2019 in related U.S. Appl. No. 16/042,303, 6 pages.
Notice of Allowance dated May 7, 2019 in related U.S. Appl. No. 15/787,023, 8 pages.
Notice of Allowance dated Jan. 17, 2019 in related U.S. Appl. No. 15/698,682, 7 pages.
Notice of Allowance dated Jan. 25, 2019 in related U.S. Appl. No. 15/957,058, 7 pages.
Yang, Fuqian et al., " Diffusion-induces beam bending in hydrogen sensors", Journal of Applied Physics, Jun. 2003, 1 page.
Lund, J. et al., "A Low Temperature Bi-CMOS . . . and Filters", Solid-State Sensor, Actuator and Microsystems Workshop, Jun. 2-6, 2002, 4 pages.
Written Opinion of the International Searching Authority for Appl. No. PCT/EP2011/059881, dated Dec. 6, 2011.
Written Opinion of the International Searching Authority for Appl. No. PCT/EP2011/059880, dated Dec. 22, 2011.
International Search Report of the International Searching Authority for Appl. No. PCT/EP2011/059880, dated Dec. 22, 2011.
Written Opinion of the International Searching Authority for Appl. No. PCT/US2011/039571, dated Jan. 12, 2012.
International Search Report of the International Searching Authority for Appl. No. PCT/US2011/039571, dated Jan. 12, 2012.
Written Opinion of the International Searching Authority for Appl. No. PCT/US2011/039564, dated Mar. 5, 2012.
International Search Report of the International Searching Authority for Appl. No. PCT/US2011/039564, dated Mar. 5, 2012.
Written Opinion of the International Searching Authority for Appl. No. PCT/US2011/039560, dated Mar. 28, 2012.
International Search Report of the International Searching Authority for Appl. No. PCT/US2011/039560, dated Mar. 28, 2012.
In Response to Examination Report dated Nov. 26, 2014 in related Application No. GB 1300040.1, 22 pages.
In Response to Examination Report dated Nov. 28, 2014 in related Application No. GB 1300265.4, 13 pages.
In Response to Examination Report dated Dec. 22, 2014 in related Application No. GB 1300265.4, 112 pages.
Examination Report dated Sep. 1, 2014 in related Application No. GB 1300265.4, 2 pages.
In Response to Examination Report dated Sep. 1, 2014 in related Application No. GB 1300085.6, 13 pages.
Examination Report dated Sep. 1, 2014 in related Application No. GB 1300085.6, 2 pages.
Response to Examination Report dated Sep. 27, 2013 in related Application No. GB 1300040.1, 5 pages.
Response to Examination Report dated Dec. 31, 2013 in related Application No. GB 1300265.4, 14 pages.
Response to Examination Report dated Dec. 31, 2013 in related Application No. GB 1300085.6, 17 pages.
Charles G. Smith et al., Nonmechanical cantilever arrays for low-power and low-voltage embedded nonvolatile memory applications, Feb. 2007, SPIE, vol. 6464, 10 pages.
Wilson, Nathan Marshall. Geometric algorithms and software architecture for computational prototyping: applications in vascular surgery and MEMS. Diss. Stanford University, Dec. 2002, 274 pages (Year: 2003).
Office Action dated Jun. 26, 2019 in related U.S. Appl. No. 15/973,958, 7 pages.
Office Action dated Aug. 6, 2019 in related U.S. Appl. No. 16/239,132, 6 pages.
Notice of Allowance dated Aug. 7, 2019 in related U.S. Appl. No. 16/042,303, 7 pages.
Office Action dated Aug. 7, 2019 in related U.S. Appl. No. 16/379,982, 6 pages.
Notice of Allowance dated Aug. 13, 2019 in related U.S. Appl. No. 16/394,138, 8 pages.

(56) References Cited

OTHER PUBLICATIONS

Notice of Allowance dated Nov. 1, 2019 in related U.S. Appl. No. 15/973,958, 7 pages.
Notice of Allowance dated Dec. 27, 2019 in related U.S. Appl. No. 16/239,132, 7 pages.
Notice of Allowance dated Dec. 30, 2019 in related U.S. Appl. No. 16/379,982, 7 pages.
Office Action dated Nov. 22, 2019 in related U.S. Appl. No. 16/394,138, 5 pages.
Notice of Allowance dated Dec. 19, 2019 in related U.S. Appl. No. 16/042,303, 5 pages.

* cited by examiner

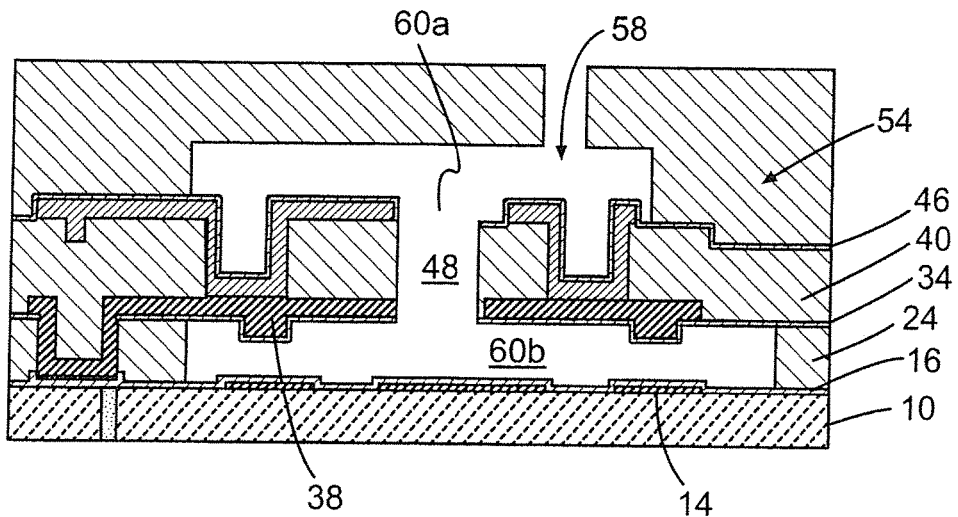
*FIG. 21A*
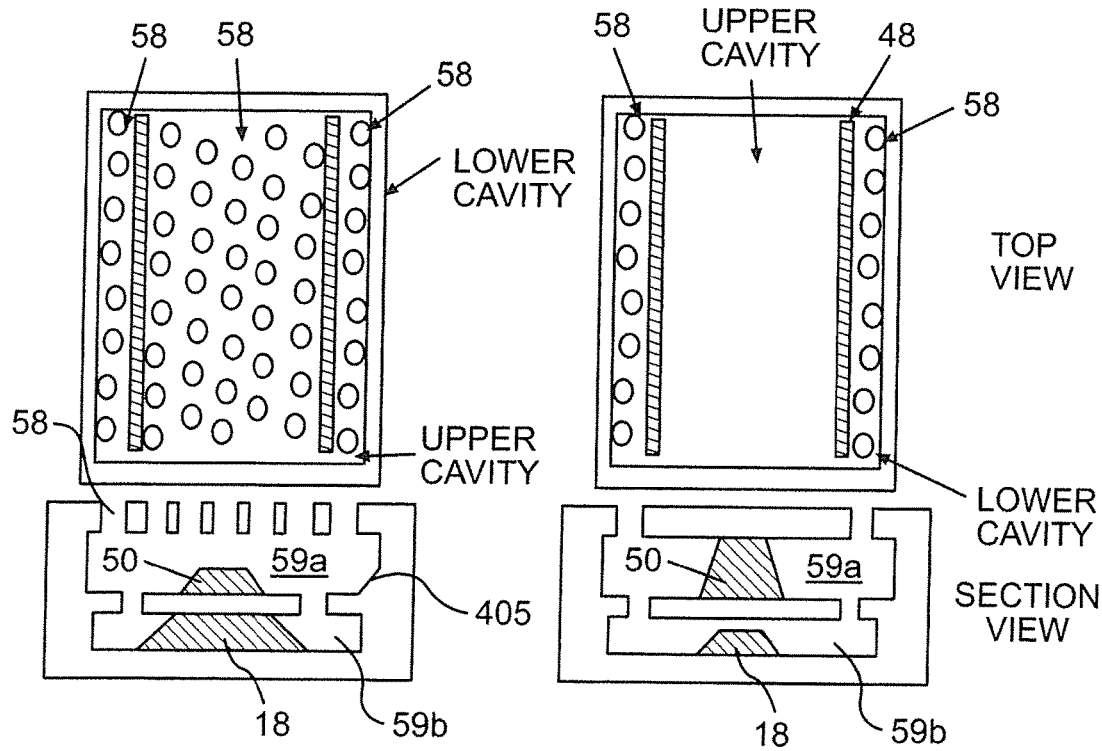
*FIG. 21B*  *FIG. 21C*

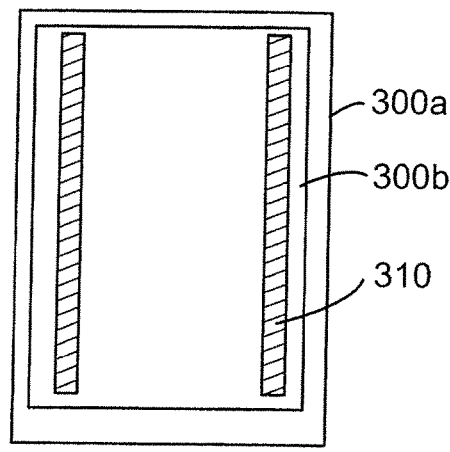
FIG. 24D
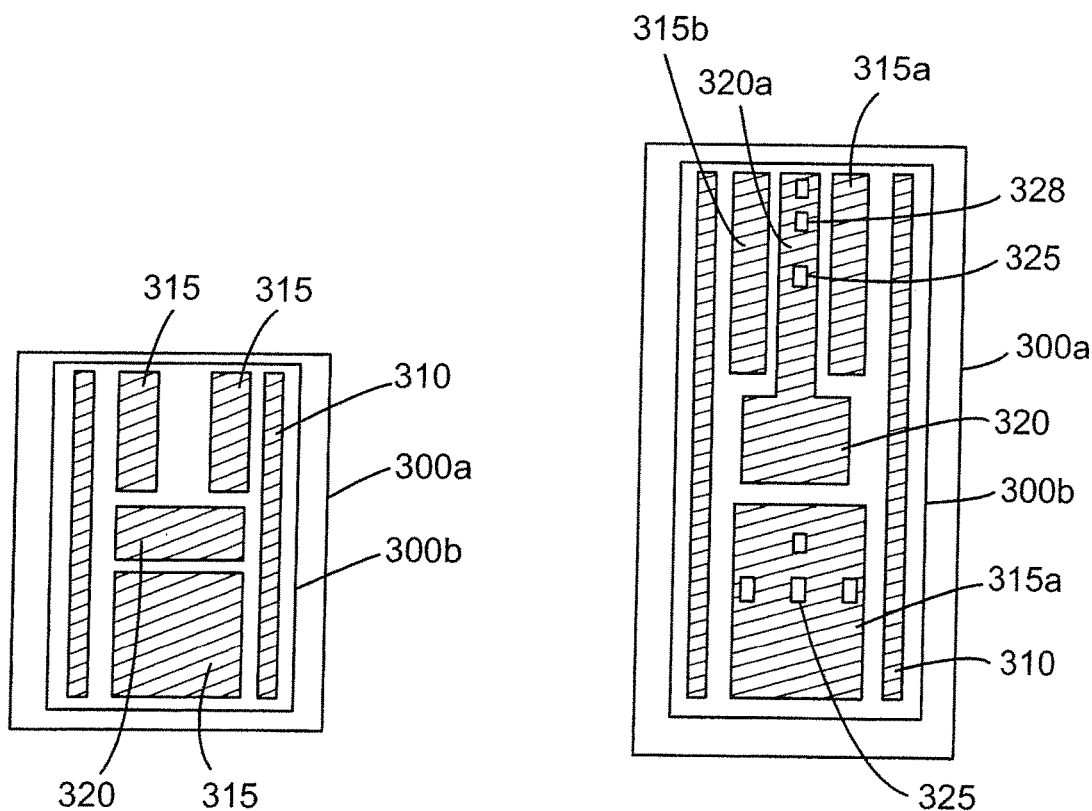
FIG. 24E  FIG. 24F

FIG. 26B SLOT 'S'
FIG. 26C 'TP'
FIG. 26D HOLE 'H' UPPER LOWER

PLANAR CAVITY MEMS AND RELATED STRUCTURES, METHODS OF MANUFACTURE AND DESIGN STRUCTURES

FIELD OF THE INVENTION

The invention relates to semiconductor structures and methods of manufacture and, more particularly, to planar cavity Micro-Electro-Mechanical System (MEMS) structures, methods of manufacture and design structures.

BACKGROUND

Integrated circuit switches used in integrated circuits can be formed from solid state structures (e.g., transistors) or passive wires (MEMS). MEMS switches are typically employed because of their almost ideal isolation, which is a critical requirement for wireless radio applications where they are used for mode switching of power amplifiers (PAs) and their low insertion loss (i.e., resistance) at frequencies of 10 GHz and higher. MEMS switches can be used in a variety of applications, primarily analog and mixed signal applications. One such example is cellular telephone chips containing a power amplifier (PA) and circuitry tuned for each broadcast mode. Integrated switches on the chip would connect the PA to the appropriate circuitry so that one PA per mode is not required.

Depending on the particular application and engineering criteria, MEMS structures can come in many different forms. For example, MEMS can be realized in the form of a cantilever beam structure. In the cantilever structure, a cantilever arm (suspended electrode with one end fixed) is pulled toward a fixed electrode by application of an actuation voltage. The voltage required to pull the suspended electrode to the fixed electrode by electrostatic force is called pull-in voltage, which is dependent on several parameters including the length of the suspended electrode, spacing or gap between the suspended and fixed electrodes, and spring constant of the suspended electrode, which is a function of the materials and their thickness. Alternatively, the MEMS beam could be a bridge structure, where both ends are fixed.

MEMS can be manufactured in a number of ways using a number of different tools. In general, though, the methodologies and tools are used to form small structures with dimensions in the micrometer scale with switch dimensions of approximately 5 microns thick, 100 microns wide, and 200 microns long. Also, many of the methodologies, i.e., technologies, employed to manufacture MEMS have been adopted from integrated circuit (IC) technology. For example, almost all MEMS are built on wafers and are realized in thin films of materials patterned by photolithographic processes on the top of the wafer. In particular, the fabrication of MEMS uses three basic building blocks: (i) deposition of thin films of material on a substrate, (ii) applying a patterned mask on top of the films by photolithographic imaging, and (iii) etching the films selectively to the mask.

For example, in MEMS cantilever type switches the fixed electrodes and suspended electrode are typically manufactured using a series of conventional photolithographic, etching and deposition processes. In one example, after the suspended electrode is formed, a layer of sacrificial material, e.g., the spin-on polymer PMGI made by Microchem, Inc., is deposited under the MEMS structure, to form a cavity, and over the MEMS structure to form a cavity. The cavity over the MEM is used to support the formation of a cap, e.g., SiN dome, to seal the MEMS structure. However, this poses several shortcomings. For example, it is known that MEMS cavities formed with spin-on polymers such as PMGI, are non-planar. Non-planar MEMS cavities, though, introduce issues including, for example, lithographic depth of focus variability and packaging reliability due to dielectric cracking. In addition, MEMS cavities formed with spin-on polymers require processing at low temperatures, to avoid reflowing or damaging the polymer; and the polymer can leave organic (i.e., carbon containing) residues in the cavity post venting.

Accordingly, there exists a need in the art to overcome the deficiencies and limitations described hereinabove.

SUMMARY

In a first aspect of the invention, a method of forming a Micro-Electro-Mechanical System (MEMS) comprises forming a lower electrode on a first insulator layer within a cavity of the MEMS. The method further comprises forming an upper electrode over another insulator material on top of the lower electrode which is at least partially in contact with the lower electrode. The forming of the lower electrode and the upper electrode includes adjusting a metal volume of the lower electrode and the upper electrode to modify beam bending.

In another aspect of the invention, a method of forming a switch comprises forming a lower electrode and an upper electrode on top of the lower electrode. The forming of the lower electrode and the upper electrode includes balancing a metal volume of the lower electrode with respect to the upper electrode.

In another embodiment of the invention, a method comprises forming a moveable beam comprising at least one insulator layer on a conductor layer such that a volume of the conductor is adjusted to modify beam bending characteristics.

In yet another aspect of the invention, a MEMS structure, comprises a moveable beam comprising at least one insulator layer on a conductor layer such that a volume of the conductor is adjusted to modify beam bending characteristics.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of the MEMS, which comprises the structures of the present invention. In still further embodiments, a method in a computer-aided design system is provided for generating a functional design model of the MEMS. The method comprises generating a functional representation of the structural elements of the MEMS.

In particular aspects, the design structure readable by a machine used in design, manufacture, or simulation of an integrated circuit comprises a moveable beam comprising at least one insulator layer on a conductor layer such that a volume of the conductor is adjusted to modify beam bending characteristics.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 24A-24F show top structural views of MEMS devices fabricated using the processes shown in accordance with aspects of the invention;

DETAILED DESCRIPTION

The invention relates to semiconductor structures and methods of manufacture and, more particularly, to planar cavity (e.g., flat or planar surfaces) Micro-Electro-Mechanical System (MEMS) structures, methods of manufacture and design structure. Advantageously, the methods of forming the structures reduce overall stress on the MEMS structure, as well as reduce material variability of the MEMS device. In embodiments, the structures and methods of forming the planar (e.g., flat or planar surfaces) MEMS devices use a sacrificial layer to form a cavity adjacent to the MEMS beams. In further embodiments, a two level MEMS cavity is formed using a reverse damascene process to form a planar (e.g., flat or planar surface) structure. The MEMS structures of the present invention can be used, for example, as a single or dual wire beam contact switch, dual wire beam capacitor switch, or single dual wire beam air gap inductor, amongst other devices.

Figure 1:
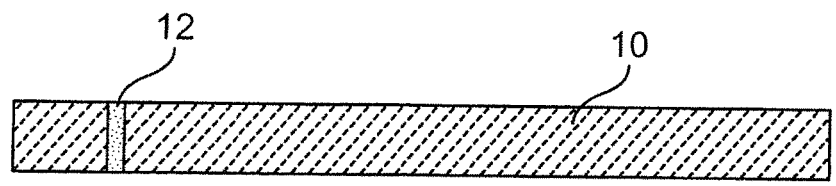
FIGS. 1-23C and 26A-33 show various structures and related processing steps in accordance with the invention.

FIG. 1 shows a beginning structure and related processing steps in accordance with aspects of the invention. The structure disclosed in the next several set of paragraphs is a MEMS capacitor switch, although the methods and structures are also applicable to other MEMS switches, such as ohmic contact switches, which would not use a MEMS capacitor dielectric; MEMS accelerometers; etc. The structure includes, for example, a substrate 10. The substrate 10, in embodiments, can be any layer of a device. In embodiments, the substrate 10 is a silicon wafer coated with silicon dioxide or other insulator material known to those of skill in the art. An interconnect 12 is provided within the substrate 10. The interconnect 12 can be, for example, a tungsten or copper stud formed in a conventionally formed via. For example, the interconnect 12 can be formed using any conventional lithographic, etching and deposition process, known to those of skill in the art for forming studs, such as damascene. The interconnect 12 could contact other wiring levels, CMOS transistors or other active devices, passive devices, etc. as known in the art.

Figure 2:
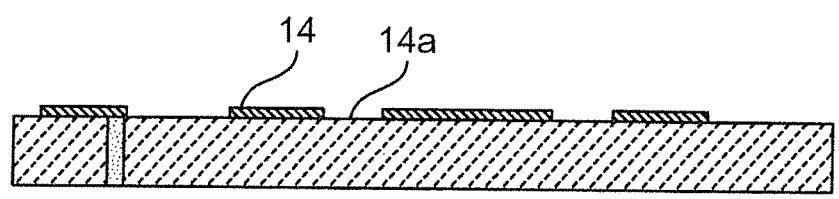

In FIG. 2, a wiring layer is formed on the substrate 10 to form multiple wires 14 using conventional deposition and patterning processes. For example, the wiring layer can be deposited on the substrate to a depth of about 0.05 to 4 microns; although other dimensions are also contemplated by the present invention. In embodiments, the wiring layer 14 is deposited to a depth of 0.25 microns. Thereafter, the wiring layer is patterned to form the wires (lower electrodes) 14 having a wire spacing (gap) 14a therebetween. In embodiments, the wire space aspect ratio, which is determined by the ratio of the height of the wire 14 to the wire spacing 14a, may affect material variability, (e.g., topography) as discussed in more detail with reference to FIG. 25. For example, a low aspect ratio of 1:20 could be formed from a 50 nm tall wire 14 with a 1000 nm space 14a; and a high aspect ratio of 1:1 could be formed from a 500 nm tall wire with a 500 nm space. These aspect ratio values are for reference only and, as will be discussed herein, the conformality of a sacrificial film 18 (FIG. 3) determines what wire space aspect ratio is required.

At least one of the wires 14 is in contact (direct electrical contact) with the interconnect 12. In embodiments, the wires 14 can be formed from aluminum or an aluminum alloy such as AlCu, AlSi, or AlCuSi; although other wiring materials are also contemplated by the present invention. For example, the wires 14 can be a refractory metal such as Ti, TiN, TiN, Ta, TaN, and W, or AlCu, amongst other wiring materials. In embodiments, the wires 14 can be doped with Si, e.g., 1%, to prevent the metal, e.g., Al, from reacting with an upper cavity layer material, e.g., silicon. In embodiments the aluminum portion of the wire can be doped with Cu, e.g. 0.5%, to increase the electromigration resistance of the wire. In embodiments, the wires could be formed from pure refractory metals, such as TiN, W, Ta, etc.

The surface morphology of wire 14 is determined by the atomic surface roughness as well as the presence of metal hillocks. Metal hillocks are bumps in the metal, typically about 10 nm-1000 nm wide and 10 nm-1000 nm tall. For aluminum wiring cladded in TiN below and above, for example 200 nm AlCu cladded with 10/20 nm Ti/TiN below and 30 nm TiN above, a typical metal hillock could be 50 nm wide and 100 nm tall. For MEMS capacitors, where the wire 14 is coated with dielectric and is used as the lower capacitor plate, the presence of hillocks or a high value of atomic surface roughness decreases the capacitance density because the upper capacitor plate, which is formed from the MEMS beam, cannot closely contact the lower capacitor plate, which is formed from wire 14.

Surface roughness can be measured using an atomic force microscope (AFM) or an optical profiler, and several known methods exist for measuring and quantifying the width and height of hillocks. In embodiments, hillocks are quantified by measuring the minimum to maximum height using an AFM of wire areas typically ranging from 1 to 10,000 square microns, and the surface roughness by calculating the root mean square (RMS) roughness in areas with or without hillocks. In one embodiment, surface roughness is the RMS roughness of a 2 $\mu m^2$ area without visible hillocks.

Table 1 summarizes metal hillock and surface roughness data for a variety of wire materials measured using an AFM. The root mean square (RMS) roughness was measured in areas without visible metal hillocks in an approximate 2 $\mu m^2$ area. The maximum peak-to-valley hillock value was measured in an approximate 10,000 $\mu m^2$ area. The purely refractory metal wire options had by far the lowest roughness and hillocks but the highest resistance. Wires with AlCu have much lower resistance but much higher roughness and hillocks than purely refractory metal wires. Adding sufficient Ti under and over the AlCu and annealing the wafers at 350° C. to 450° C. for sufficient time to form the $TiAl_3$ silicide, i.e., 400° C. for 1 hour, either before or after patterning, dramatically reduces the hillock minimum to maximum height while slightly increasing the RMS surface roughness, due to reduced aluminum volume. In exemplary embodiments, the wires 14 are annealed after patterning and etched to reduce $TiAl_3$-induced metal etch problems. Thinner Ti, e.g., 5 nm under and over the AlCu, had minimal or no effect on hillock reduction; whereas, 10 nm and 15 nm of Ti dramatically reduced the hillocks and were equivalent. When the Ti reacts with aluminum to form $TiAl_3$, the aluminum (e.g., AlCu) thickness is reduced in approximately a 3:1 fashion; i.e., for each 10 nm of Ti, 30 nm of aluminum is consumed to form $TiAl_3$; and, to always leave some unreacted AlCu in the wire, the Ti:AlCu thickness ratio, where the Ti thickness comprises the layers under and over the AlCu, needs to be less than 1:3. This means that, for optimal hillock reduction and wire resistance taking into account the Ti and AlCu as deposited thickness variability, the as-deposited Ti thickness range should be greater than 5% and less than 25% of the as-deposited AlCu thickness.

TABLE 1

| Process (TiN = 32 nm for each layer) | AlCu Ta/TiN or Ta thickness (nm) | Lower and upper Ti thickness (nm) | RMS roughness (nm) | Maximum Peak-Valley hillock (nm) | Resistance (Ω/SQ) |
|---|---|---|---|---|---|
| TiN/AlCu/TiN | 200 | NA | 4.6 | 148 | 0.18 |
| Ti/AlCu/Ti/TiN | 200 | 5 | 6.8 | 119 | 0.24 |
| Ti/AlCu/Ti/TiN | 200 | 10 | 6.4 | 43 | 0.32 |
| Ti/AlCu/Ti/TiN | 200 | 15 | 6.2 | 46 | 0.42 |
| TiN | 32 | NA | 2.3 | 27 | 100 |
| Ta/TiN | 200/32 | NA | 2.4 | 29 | 2 |

Figure 26A:
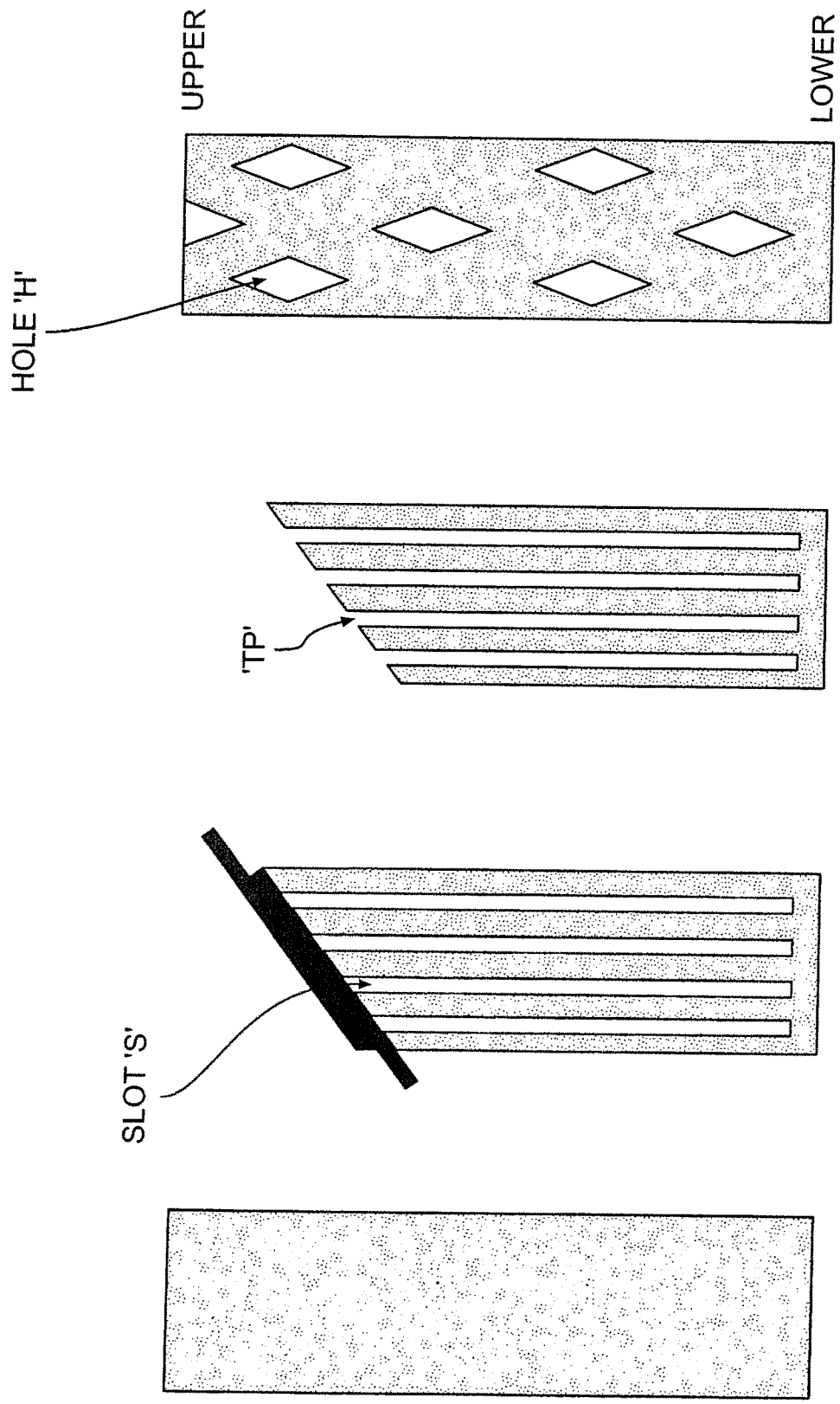

Metal hillock formation can also be induced by the layout of the wires. For example, a solid layout (FIG. 26A) will tend to have both a greater number of metal hillocks and taller hillocks, than a layout broken up into narrow lines using slots 'S' (FIGS. 26B and 26C) or holes 'H' (FIG. 26D).

More specifically, FIGS. 26A-26D show top view layouts of the MEMS capacitor plates with solid (FIG. 26A), slotted "S" (FIGS. 26B and 26C), and holed "H" (FIG. 26D) layouts. The holed (FIG. 26D) layout "H" could use diamonds (shown), octagons, circles, ovals, squares, plus-shaped, or any shapes cut out from the layout all represented by reference "H". The slotted and holed layouts are designed both to minimize hillock formation and to not significantly increase the effective wire resistance or decrease the capacitor plate area, due to the removal of the metal. If a slotted layout "S" is used (FIG. 26B) then the slot width is typically minimized so as to not decrease the capacitor plate area or increase the effective wire resistance. For example, a slot width of 1 μm and the slots placed on a 6 μm pitch could be used; or a similar ratio of these values (i.e., 0.4 μm slot width and 2.4 μm pitch). For the holed version in FIG. 26D, the volume of metal removed by the holes would be kept to around 20% or less, so as not to substantially increase the effective wire resistance or reduce the capacitance. For example, 1 $μm^2$ area holes taking up 20% of the overall wire area could be used.

The volume of metal removed by slotting or holing the wires is also determined by the tendency to form hillocks. For example, refractory metals are not sensitive to forming hillocks and may not need to be slotted or holed. The tendency to form hillocks in aluminum or aluminum alloys increases as the wire thickness increases and the capping refractory metal (i.e., $TiAl_3$/TiN, TiN, etc.) thickness decreases. For taller wires, e.g., >=1 μm, the volume of metal needed to be removed by slotting or holing may be higher; wherein for shorter wires, e.g., <0.2 μm, the volume of metal needed to be removed by slotting or holing may be lower. The pitch is defined as the repeating wire width+ space. For a 5 μm pitch with 1 um space, the wire width would be 4 μm.

Figure 26E:
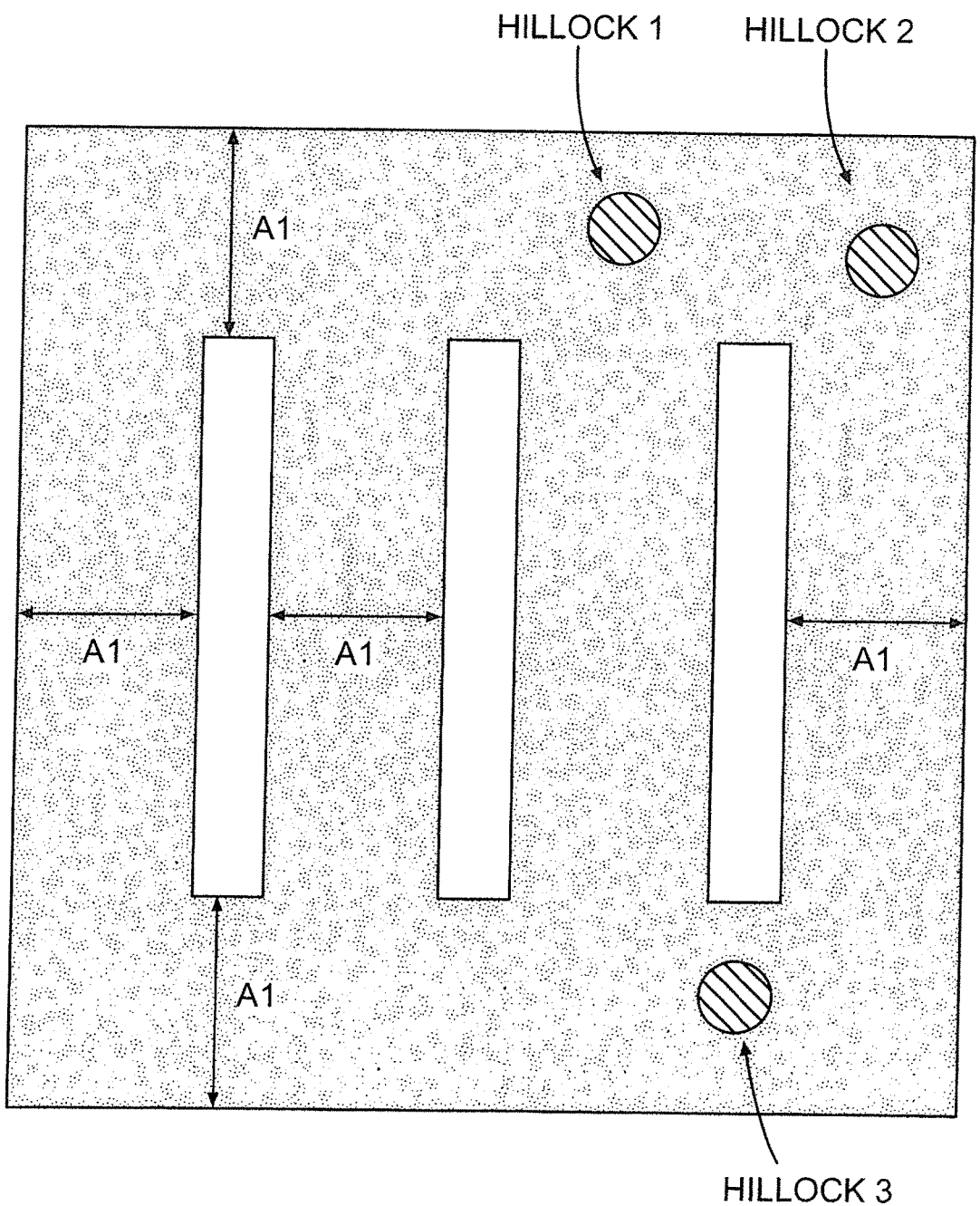
Figure 26F:
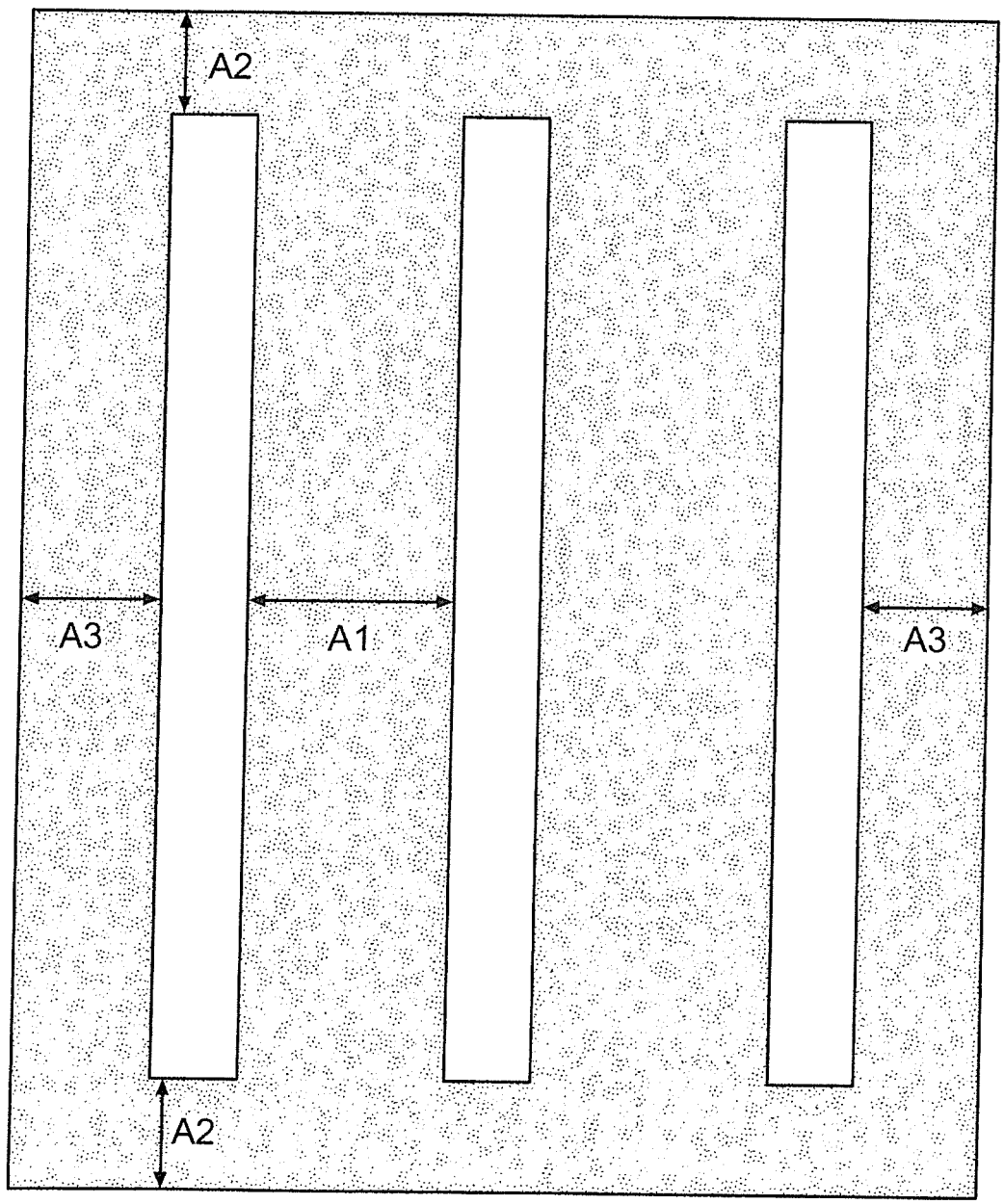

For embodiments, the wire width between the slots would be 4 μm and spacing from the vertical end of the wires to the edge of the wire shape would also be 4 μm. Layouts using the slot algorithm where the ends of the slots are closed, shown in FIG. 26B, are subject to hillock formation at the end of the slots, due to increased local area or other geometry-induced effects. This is shown in FIG. 26E, which shows a closed slot layout with equal spacing both between the slots and between the slots and the ends of the wire shapes A1. To reduce or eliminate the tendency to form hillocks in this location, the spacing between the vertical end of the slots and the end of the wire shape can be reduced to less than the slotted wire width, as shown in FIG. 26F, which shows a wire width of A1 and slot spacings to the wire edge or slot edge of A2 and A3, which are both less than A1. This applies to orthogonal slots (i.e., slots ending in a perpendicular 90 degree angle fashion) as well as angled slots (i.e., slots ending at 45 degrees or another angle), as shown in FIG. 26. Another potential problem caused by slotting wires is the formation of a triple point in the subsequent silicon deposition above an uncapped slot. When the slots or holes are not capped, as shown in FIG. 26C or the upper portion of FIG. 26D, the subsequent silicon deposition can form a triple point, labeled "TP" in FIG. 26C, over the end of the uncapped slot, resulting in a defect in the silicon surface which can propagate up to subsequent wiring or other levels. To avoid this defect, the slotted ends can, optionally, be capped or closed, as shown in FIG. 26B. A similar triple point defect can occur for a holed design, again which can be eliminated to closing the hole. Open and closed holes are shown in the upper and lower portions of FIG. 26D.

Depending on the patterning of the wiring, voids or seams can form in the sacrificial material, e.g. silicon, between and above the spaces between the wires during later processing steps as described below. A seam is a region in the silicon in a gap between the underlying wires or other topography which is created as a byproduct of the silicon deposition profile. These seams can contain impurities, such as oxygen, and can cause subsequent problems due to either the presence of oxidized silicon or the seam opening up due to CMP, wet chemical, RIE, or other downstream processes. That is, if the aspect ratio of the spacing to the height of the wires 14 is high, voids or seams can form in upper layers during subsequent deposition processes. These voids or seams can affect the topography of the material, e.g. silicon, especially if there is a under or over polishing during a subsequent process step; or if the voids oxidize during deposition of the subsequent film. Alternatively, if a damascene or reverse damascene process is employed for wiring level 14, then the surface will be substantially planer and subsequent layers will not be sensitive to forming voids. A reverse damascene process is one where the wires would be deposited and patterned, followed by a dielectric deposition and planarization step such that the wire surfaces were exposed but there was planer dielectric between the wires.

Figure 3:
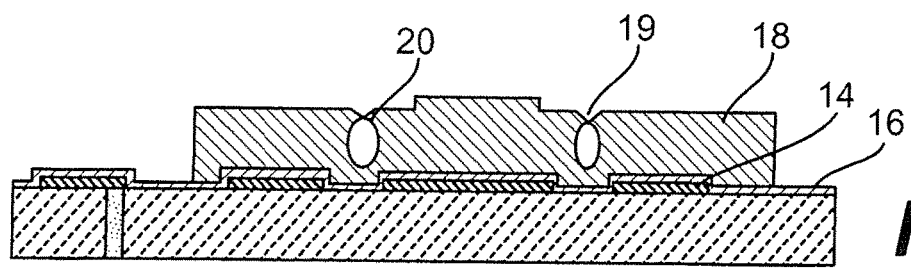

In FIG. 3, an insulator layer (dielectric layer) 16 is formed on the multiple wires 14 and exposed portions of the substrate 10. In embodiments, the insulator layer 16 is an oxide deposited to about 80 nm; although other dimensions are also contemplated by the present invention. The combined thickness of lower MEMS capacitor insulator layer 16 and the subsequent upper MEMS capacitor insulator layer 34 shown in FIG. 11, determine the breakdown voltage and time dependent dielectric breakdown properties of the MEMS capacitor. For MEMS operation at 50V, the breakdown voltage needs to be greater than 50V, typically greater than 100V, to ensure high MEMS capacitor reliability. A combined MEMS capacitor insulator thickness of 160 nm is sufficient to be highly reliable for 50V MEMS operation. This insulator layer 16, which is only required if a MEMS capacitor is being fabricated, will form the lower capacitor plate dielectric. The insulator layer 16 also acts as a barrier between the metal in wire 14, e.g., aluminum, and the subsequent material 18, i.e., silicon. Silicon and aluminum will react to form an intermetallic which is difficult to remove and, if formed, can block MEMS beam activation by blocking the beam from fully collapsing during actuation. The formation of this intermetallic can be prevented by a robust insulator layer 16. Note that insulator layer 16 needs to be deposited at temperatures compatible with aluminum wiring, e.g., under about 420° C. and preferably under about 400° C., which precludes using highly conformal dielectrics such as liquid phase chemical deposition (LPCVD) $SiO_2$, which is deposited at temperatures much greater than about 420° C. Deposition options for insulator layer 16 include one or more of plasma-enhanced CVD (PECVD), sub-atmospheric CVD (SACVD), atmospheric pressure CVD (APCVD), high density plasma CVD (HDPCVD), physical vapor deposition (PVD), or atomic layer deposition (ALD). This layer will be discussed in more detail with regard to FIGS. 27A-C.

A layer of sacrificial cavity material 18 such as, for example, silicon, tungsten, tantalum, germanium, or any material which can subsequently be selectively removed using, for example $XeF_2$ gas, to the insulator layer 16 or the wire 14 if the insulator layer 16 is absent, is deposited on the insulator layer 16; or on layer 14 if the insulator layer 16 is not present. In embodiments, silicon is used for layer 18. The layer 18 can be deposited using any conventional plasma vapor deposition (PVD), PECVD, rapid thermal CVD (RTCVD), or LPCVD which operates at temperatures compatible with the wiring 14, e.g., <420° C. In embodiments, the layer 18 is deposited to a height of about 0.1 to 10 microns which is determined by the MEMS gap requirement, and is patterned using conventional lithographic and reactive ion etching (RIE) steps. One example would use a silicon thickness of about 2.3 microns.

A common RIE etch gas for silicon is $SF_6$ where the $SF_6$ is diluted with other gases such as $CF_4$, nitrogen, or argon. The silicon deposition process used to deposit silicon layer 18 can generate seams between wires and at the edges of wires, as discussed above. If these seams are oxidized or have other impurities in them, then they are difficult to etch during the silicon layer 18 etch step or during the final silicon cavity venting etch. To avoid leaving oxidized seams on the wafer after silicon layer 18 etch, a combination of argon dilution with rf bias power applied to the wafer to simultaneously sputter and RIE etch the surface can be used. Voids 20 can form over the spaces 14a between wires 14, due to poor step coverage or conformality of the layer 18. The width of the void 20, spacing from the substrate 10, and spacing from the surface of the silicon 20a, is determined by the aspect ratio of the wire 14, the conformality of the silicon deposition and the shape of the insulator layer 16.

Figure 27A:
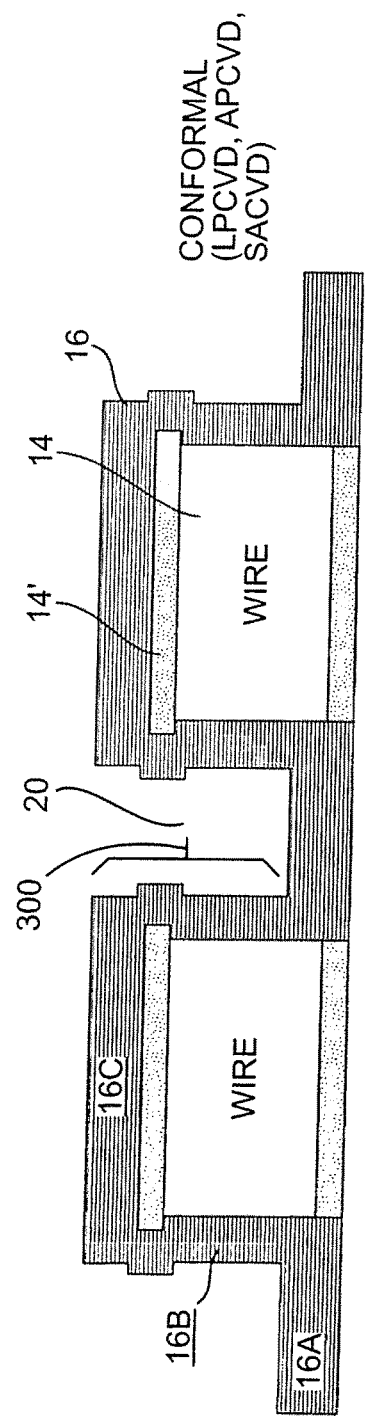
Figure 27B:
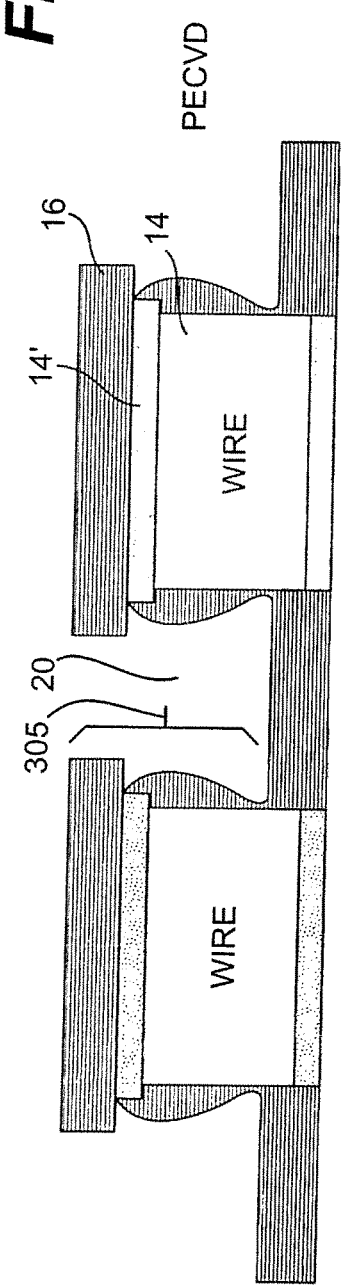
Figure 27C:
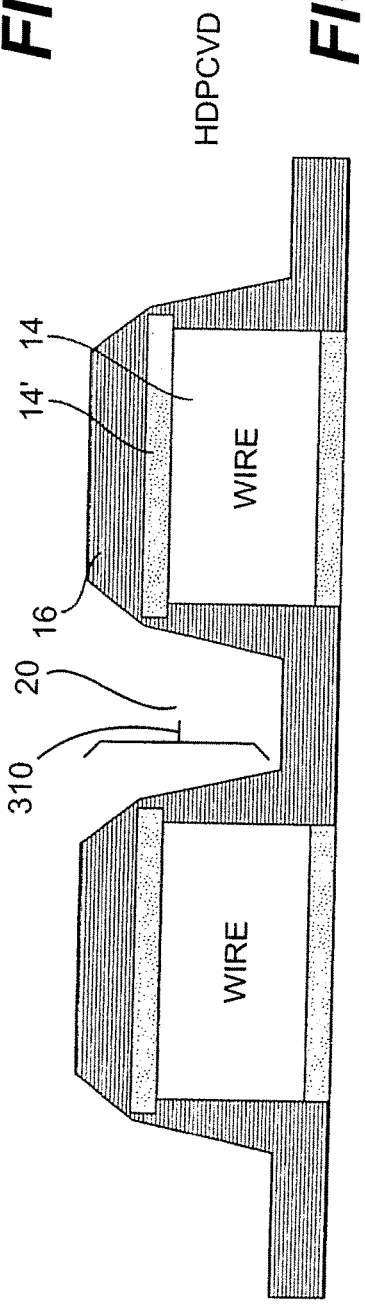

FIGS. 27A-27C show several insulator layer 16 shapes over the wires 14. The wires 14 shown in FIG. 27A are drawn with an undercut of the AlCu under the upper TiN/$TiAl_3$ layer 14'. This undercut often occurs during metal RIE processing and, if present, increases the difficulty of obtaining good wire 14 sidewall coverage of insulator layer(s) 16. FIG. 27A shows the formation of the insulator layer 16 using conformal processes such as, for example, LPCVD, APCVD or SACVD. These conformal deposition processes provide nearly uniform insulator thickness on the top, side, and bottom surfaces 16A, 16B, and 16C. These conformal deposition processes, when operated at temperatures compatible with aluminum or copper-based wiring, e.g. under 420 C, may have poor capacitor dielectric properties, for example, high leakage current, low voltage breakdown, or poor TDDB reliability. This profile provides a step formation 300 in the void 20. FIG. 27B shows the formation of the insulator layer 16 using PECVD or PVD. This profile provides a "bread loafed" or "double tapered" profile formation 305 in the void 20. Although these "bread loafed" films are not conformal, they may have excellent capacitor dielectric properties due to their plasma deposition. To reduce or eliminate the void 20, it is desirable to have a tapered profile, as shown in FIG. 27C, which improves the layer 18 step coverage and reduces or eliminates the void 20.

Divots 19 (see, e.g., FIG. 8 or 9A) may form over the voids or seams 20, on the layer 18 surface, between the wires 14. The voids 20 and divots 19 form due to the spacing between the wires 14, and they can vary depending on the height of the layer 18, as well as the spacing and/or height of the wires 14. These divots 19 can deepen during subsequent processing, such as chemical mechanical processing, as discussed below in regards to FIG. 8. These divots 19 and seams can oxidize during subsequent processing such as exposure to humid air, an oxidizing ambient photoresist strip, or a plasma oxide deposition and these oxidized silicon regions will not be removed during the final silicon venting or removal step. If this happens, then these oxidized silicon residuals, which are under the MEMS beam, can block the MEMS beam from contacting the lower electrode (wire) 14, resulting in poor actuation. (See, e.g., element 19a in FIG. 33.) Tapering the insulator layer 16 profile (FIG. 27C) reduces or eliminates this effect by eliminating the void and divot, as does eliminating the void by improving the silicon deposition gapfill. The profile can be tapered (FIG. 27C) by depositing a high density plasma CVD oxide as part or all of the insulator layer 16. Alternatively, an insulator deposition and one or more sputter etch back and subsequent insulator deposition(s) could produce the same tapered profile of the insulator layer 16. Alternatively, as discussed below, the silicon deposition can be modified to taper the silicon profile to 45 degrees by in-situ sputtering the silicon film in the PVD silicon deposition chamber.

The insulator layer 16 over wire 14 also acts to block reaction, alloying, or interdiffusion of the wire 14 material and the layer (cavity material) 18. For example, if wire 14 contains aluminum, then the aluminum can react with the silicon to form an aluminum silicide, which is difficult or impossible to remove during the subsequent layer 18 (sacrificial layer) venting or removal step. This aluminum silicide formation can occur in the upper wire corners, for example, because the insulator layer 16 has a retrograde deposition profile (FIG. 27B) or has little coverage in the upper wire corner (FIG. 27C), resulting in exposed aluminum to the layer 18 deposition. Although this problem can be reduced or eliminated by increasing the thickness of the insulator layer, increasing the thickness is not always possible because of the associated reduction in capacitance of the MEMS capacitor formed using wire 14 as a bottom plate. In addition, wire surface or corner defects (not shown) could block the insulator layer 16 from fully coating the aluminum. This aluminum-silicon reaction can result in protruding aluminum silicide whisker-like features that can block or partially block the MEMS beam from actuating. To prevent this layer 16 and 18 reaction, a conformal barrier, such ALD $Al_2O_3$ (alumina), ALD $Ta_2O_5$ (tantalum pentaoxide), or a combination of both can be deposited. In one exemplary embodiment, layer 16 consists of 80 nm of HDPCVD oxide followed by 15 nm of ALD alumina. ALD films have extremely slow deposition rates and, although they could be used solely as the MEMS capacitor dielectric, it may be impractical because of the long deposition times and high manufacturing costs. One ALD alumina film has a deposition rate of 1 nm per minute, which means that it would take 80 minutes to deposit a 80 nm film. Thus using a combination of fast deposition $SiO_2$ and slow deposition alumina is optimal. Note that the ALD alumina or similar film can be used under the 80 nm of oxide; and also can be used under the upper MEMS electrode 38 to block silicon reaction with the upper MEMS electrode.

Figure 3A:
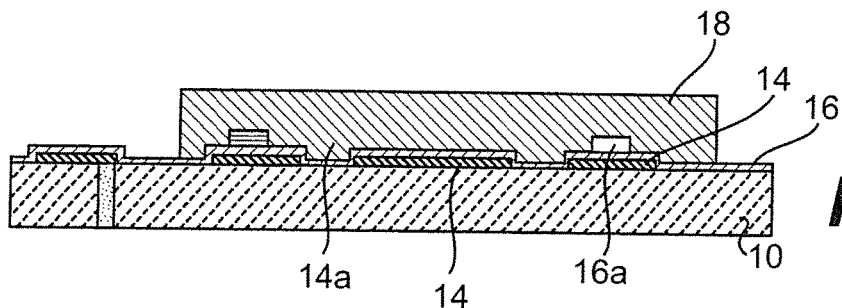

In FIG. 3A, an optional processing step of forming a dielectric peg 16a, (e.g., oxide peg) is shown in accordance with aspects of the invention. In this optional step, the oxide peg 16a can be formed prior to the formation of the deposition insulator layer 16. For example, the oxide peg 16a can be a deposited PECVD $SiO_2$ film, which is patterned and etched on the wires 14 using conventional lithographic and etching processes. With this option, the oxide peg 16a could be patterned and etched first, followed by the wire 14 patterning and etching; or the wire 14 could be patterned and etched first followed by the oxide peg 16a deposition and etching. Patterning and etching the oxide peg 16a prior to the wire 14 patterning and etching avoids increasing the aspect ratio 14a incoming to insulator layer 16 deposition because the oxide between wires 14 is not etched during etching of the oxide peg 16a. In addition, if the oxide peg 16a is patterned and etched after the wires 14 are patterned and etched, then the perfluorocarbon-based RIE chemistry used to etch the oxide peg 16a could also etch the top TiN layer of the wire 14, resulting in a degraded surface and degraded MEMS capacitor electrical yield or reliability. The oxide peg 16a, when placed over the MEMS actuators in regions away from the MEMS capacitor or contact head, forms a protective layer during MEMS operation, which can prevent the conductor in the MEMS beam from electrically arcing to the lower actuator electrode in areas that the MEMS beam does not need to closely contact the lower electrode. Since the preferred process patterns and etches the oxide peg prior to patterning and etching the wire 14, it is desirable to avoid having the spaces 14a between the wires 14 intersect the oxide peg. After formation of the oxide peg 16a, the insulator layer 16 and layer 18 can be formed as described above.

Figure 4A:
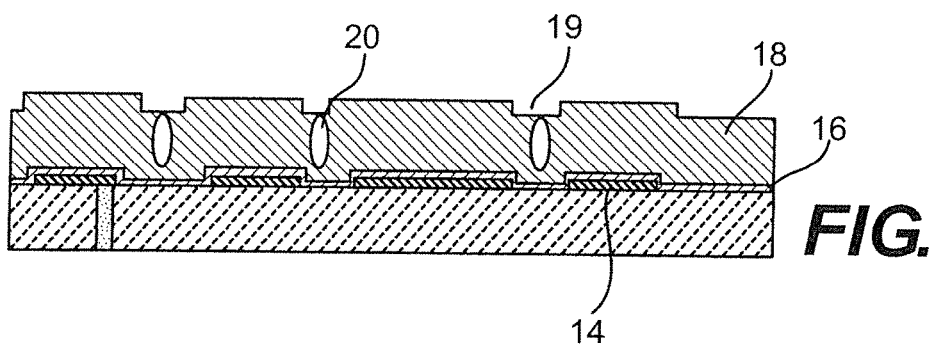
Figure 4B:
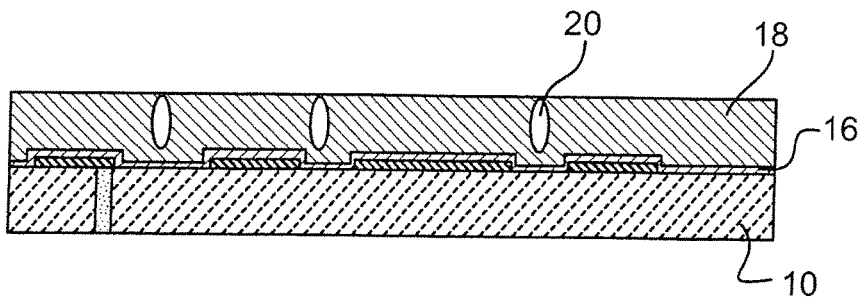
Figure 4C:
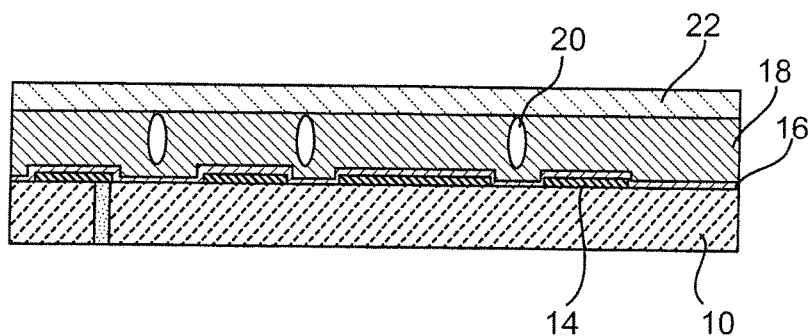
Figure 4D:
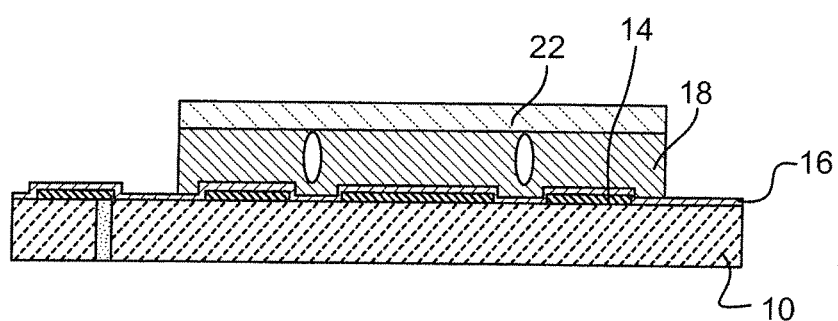

As optional processing steps, the layer 18 can be planarized using, for example, a chemical mechanical polishing (CMP) and then, optionally, additional material (silicon) can be deposited on the polished layer 18 to provide a seamless silicon layer on the surface of the lower silicon MEMS cavity. Note that conventional CMP and subsequent cleaning processes, such as brush cleans, dilute hydrofluoric acid (DHF), buffered hydrofluoric acid (BHF), cryogenic cleans, etc. would be performed after any CMP step to remove the native oxide formed on the silicon surface. For example, referring to FIG. 4A, the layer 18 is deposited on the insulator layer 16 using a conventional deposition process such as, for example, PVD. As shown in FIG. 4A, voids 20 can be formed in the layer 18, between the wires 14, with the divots 19 formed over the voids 20. As shown in FIG. 4B, the layer 18 is planarized using, for example, a CMP process. In FIG. 4C, a second layer of material 22, e.g., silicon, is deposited on the planarized layer 18. In FIG. 4D, the silicon layers 18 and 22 (which form now a single layer (hereinafter referred to as layer 18) are patterned using conventional lithographic and reactive ion etching (RIE) steps. This silicon deposition, CMP, and second deposition process eliminates the divots 19 in the silicon surface, eliminates the chance of oxidizing the seam 20, and partially or completely planarizes the topography on the silicon surface due to the incoming wire 14 and wire space 14a topography.

One set of example thicknesses would be a 250 nm tall wire 14, a 500 nm space 14a between wires 14, a 2 micron initial silicon 18 deposition thickness, a 400 nm silicon CMP removal over the wires 14 to planarize the 250 nm step over wires 14, and a subsequent silicon deposition 22 thick enough to partially remain on the wafer during the subsequent reverse oxide planarization processes shown in FIGS. 5-8. In one exemplary embodiment, 200 nm of silicon is removed from the regions above wires 14 and substantially less than 50 nm in the spaces between wires 14a, which partially planarizes the regions over the wires 14 and spaces 14a.

Silicon CMP is commonly performed to form deep trench DRAM capacitors, as known in the art. With this type of silicon CMP, the CMP process is optimized to maximize the selectivity to the pad insulator (e.g. $SiO_2$ or oxide) films on the wafer surface, i.e., the silicon CMP rate is maximized and the oxide CMP rate is minimized such that the selectivity of silicon to oxide is 50:1. This type of silicon CMP process is optimal for silicon films deposited using CVD but can cause problems for silicon films deposited using PVD. PVD silicon films polished with conventional selective silicon CMP processes may have problems with defects in the PVD silicon film which can cause the local polish rate to be reduced. These PVD silicon defects, which may be due to oxidized silicon, other impurities, or the silicon grain structure, can cause the selective silicon CMP process to leave underpolished point defects on the polished silicon surface.

To avoid these point defects during silicon CMP, a less selective or non-selective silicon polish process can be used, e.g., using a $SiO_2$ polish chemistry and process instead of a silicon CMP polish chemistry and process. The use of a less selective silicon polish process eliminates these point surface defects post polish. An example of a selective silicon polish is a basic media, such as TMAH with silica abrasive with a ph high enough to dissolve silicon, i.e., >12, which has a silicon:$SiO_2$ selectivity of 50:1; an example of a non-selective silicon polish is basic media, such as KOH, with a ph<12, which is too low to dissolve the silicon, using a silica abrasive. This non-selective silicon CMP process would have silicon:$SiO_2$ selectivities of less than 50:1 and, in one exemplary embodiment, would be in the range of 2:1 to 1:2.

To avoid polishing into the void 20, it is desirable for the first silicon deposition to be thick enough to bury the void below the surface. Silicon is opaque to optical wave lengths of light. If the subsequent lithographic process used to pattern the silicon uses optical wave lengths, then the silicon CMP process should not fully planarize either alignment structures using the wire level topography; or partially filled alignment structures using the damascene level 12. If the subsequent lithographic processes use infrared light or other methods that can detect features under the silicon, then these precautions are not needed.

A thin native oxide (e.g., $SiO_2$) forms on any silicon surface exposed to air or oxygen, even at room temperature. When the silicon is etched or vented during subsequent processing, the presence of this native oxide can either block the etch or venting, or can remain on the wafer as a few monolayer SiO$_2$ film. To avoid this, either the silicon surface should be hydrogen passivated by exposing the silicon to vapor, plasma, or liquid hydrofluoric acid (HF), or a preclean using, for example, a rf biased argon sputter preclean, should be performed immediately prior to depositing the second silicon layer 22, without exposing the wafer to air or oxygen.

Figure 5:
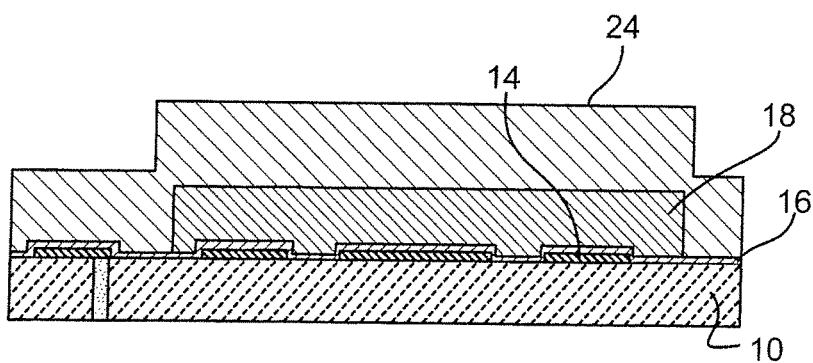
Figure 7:
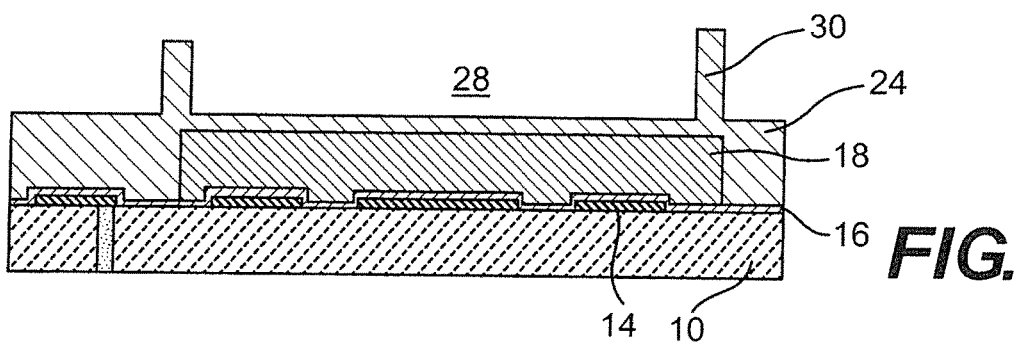

Referring to FIG. 5, an insulator material (e.g., oxide) 24 is deposited on the layer 18. The oxide deposition can be, for example, a conventional conformal deposition process, depositing the oxide layer 24 to a depth of about approximately the same as the silicon 18 height, e.g., about 2.3 μm for a 2.3 micron thick layer 18. For example, the deposition process can be a 400° C. PECVD oxide deposited using TEOS or silane as a silicon source and oxygen or N$_2$O as an oxygen source, as known in the art. If the oxide layer 24 thickness is intentionally thinner than the height of the silicon layer 18, then the subsequent oxide CMP process shown in FIG. 8 will overpolish and planarize the surface of the silicon layer 18. Conversely, if the oxide layer 24 thickness is intentionally thicker than the height of the silicon layer 18, then the subsequent oxide CMP process shown in FIG. 8 will underpolish the surface of the silicon layer 18 and leave it buried below the oxide surface. Both process options can be desirable, depending on how important minimizing the silicon surface 18 overpolish is vs. planarizing the oxide layer 24 or silicon 18 surface topography from wiring levels 14. In one exemplary embodiment, silicon 18 layer is about 2.3 microns, the oxide layer 24 is about 2.1 microns, and the optional oxide etchback step shown in FIG. 7 is targeted at a full oxide removal, i.e., >2.1 microns. This results in the subsequent oxide polish process further planarizing the silicon layer 18.

Figure 6:
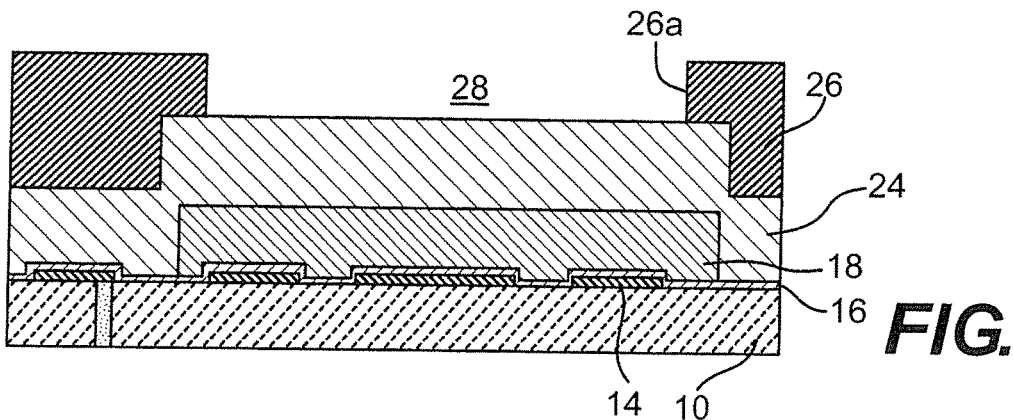

In FIG. 6, an optional reverse etch (reverse damascene process) is performed in accordance with aspects of the invention. More specifically, a resist 26 is deposited on the oxide layer 24 and is patterned to form an opening 28, with the resist edges 26a overlapping with edges of the underlying layer 18. That is, the resist 26 will slightly mask the underlying layer 18. The overlap needs to be greater than 0 and can be, for example, 3 microns and is minimized to reduce the oxide layer 24 left to be planarized during the subsequent CMP process. If the overlap is negative, then the subsequent RIE etch will etch into the lower portion of oxide layer 24, resulting in a deep trench adjacent to the silicon layer 18, which could cause problems such as residual metal from the subsequent wiring level inside the deep trench, resulting in electrical wire shorting at subsequent levels, and which should be avoided. As shown, the opening is a reverse image of the patterned layer 18.

As shown in FIG. 7, the oxide material 24 is etched using conventional RIE processes. In embodiments, as shown in FIG. 7, the etching process results in a "picture frame" 30, which surrounds the underlying layer 18. If the oxide material 24 is etched completely down to the surface of layer 18, then the oxide overpolish in regions away from the layer 18 will be minimized. This can be desirable to minimize the overpolish of layer 18, to reduce its thickness tolerance; and to eliminate the possibility of leaving residual oxide over the silicon in the MEMS capacitor or contact area. Alternatively, some oxide can be left over layer 18, as shown in FIG. 7.

Figure 8:
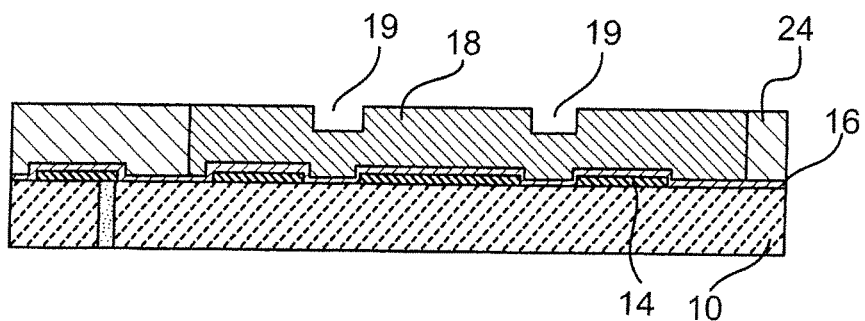

In FIG. 8, the oxide material 24 is planarized, e.g., to be planar (e.g., a nearly flat or planar surface) with the underlying layer 18. In embodiments, this process will also planarize the underlying silicon layer 18, which will advantageously result in a planar cavity structure (e.g., having flat or planar surfaces) in subsequent processing steps. The planarization process can be, for example, a CMP process. Unexpectedly, and as discussed in more detail with reference to FIG. 25, the oxide CMP can minimize the variability of the underlying layer 18; for example, depending on the wiring spacing, the polishing of the oxide material 24 can minimize divots between the wires 14 (e.g., over the space 14a formed between the wires 14).

Figure 25:
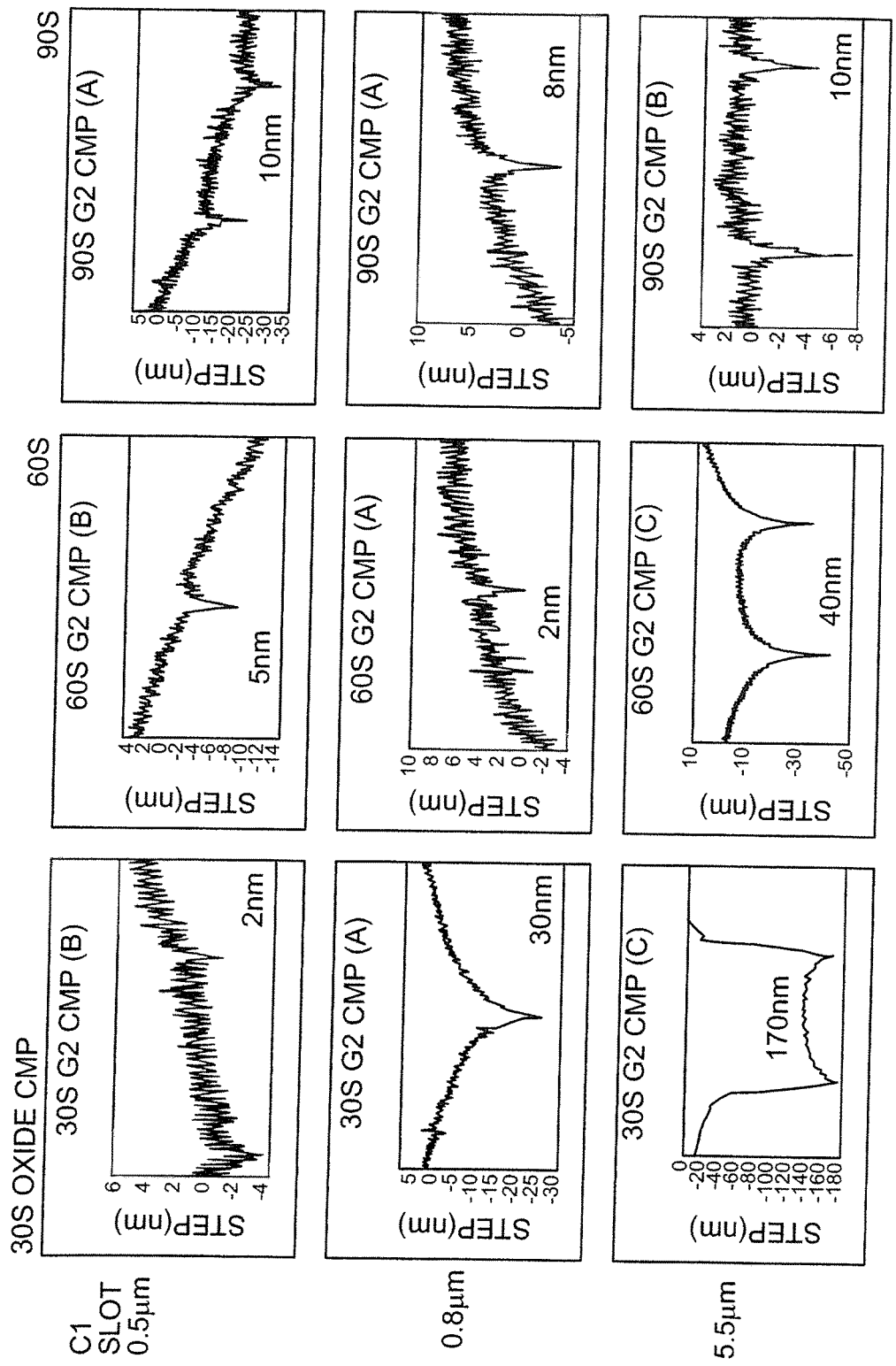
FIG. 25 shows several topography graphs (i.e., atomic force microscopy data) showing data for silicon divot depth vs. oxide polish.

FIG. 25 shows several topography graphs (i.e., atomic force microscopy data) for silicon divot depth vs. oxide polish of the surface of layer 18 shown in FIG. 8. These graphs are related to the polishing of the oxide layer 24 shown, for example, in FIG. 8. In this example, the divot 19 in the layer 18 (See, e.g., FIGS. 3 and 8) can be as tall as 250 nm (0.25 μm), which is the thickness of the wires 14.

The graphs of FIG. 25 show CMP of the oxide layer 24 for 30 seconds, 60 seconds and 90 seconds, with different wiring spacing 14a of 0.5 μm, 0.8 μm and 5.5 μm. These graphs show the unexpected importance of the wiring spacing 14a of the wires 14, in order to minimize topography variability of the layer 18. For example, a slot (spacing) of 0.5 μm and a CMP of the oxide for 30 seconds shows a 2 nm divot depth in the layer 18, compared to 5 nm and 10 nm for a CMP of the oxide for 60 seconds and 90 seconds, respectively. Also, a slot of 0.8 μm with a CMP of the oxide for 30 seconds shows a 30 nm divot depth of the layer 18, compared to 2 nm and 8 nm for a CMP of oxide for 60 seconds and 90 seconds, respectively. Additionally, a slot of 5.5 μm with a CMP of the oxide for 30 seconds shows a 170 nm divot depth, compared to 40 nm and 10 nm for a CMP of 60 seconds and 90 seconds, respectively. These results were not expected, as a increasing CMP time of the oxide would have been expected to show an optimization, i.e., reduction of the divot depth, of the topography of the layer 18. These divots in layer 18 will replicate under the MEMS beam, resulting in MEMS beam underside topography. In addition, the MEMS beam underside topography, which will consist of both deposited oxide as well as potentially an oxidized seam under the divot, can have poor adhesion to the MEMS beam with resultant flaking during MEMS operation. This flaking can cause catastrophic MEMS capacitor yield or reliability degradation, due to the presence of flaking oxide in the MEMS cavity under or over the MEMS beam.

Figure 33:
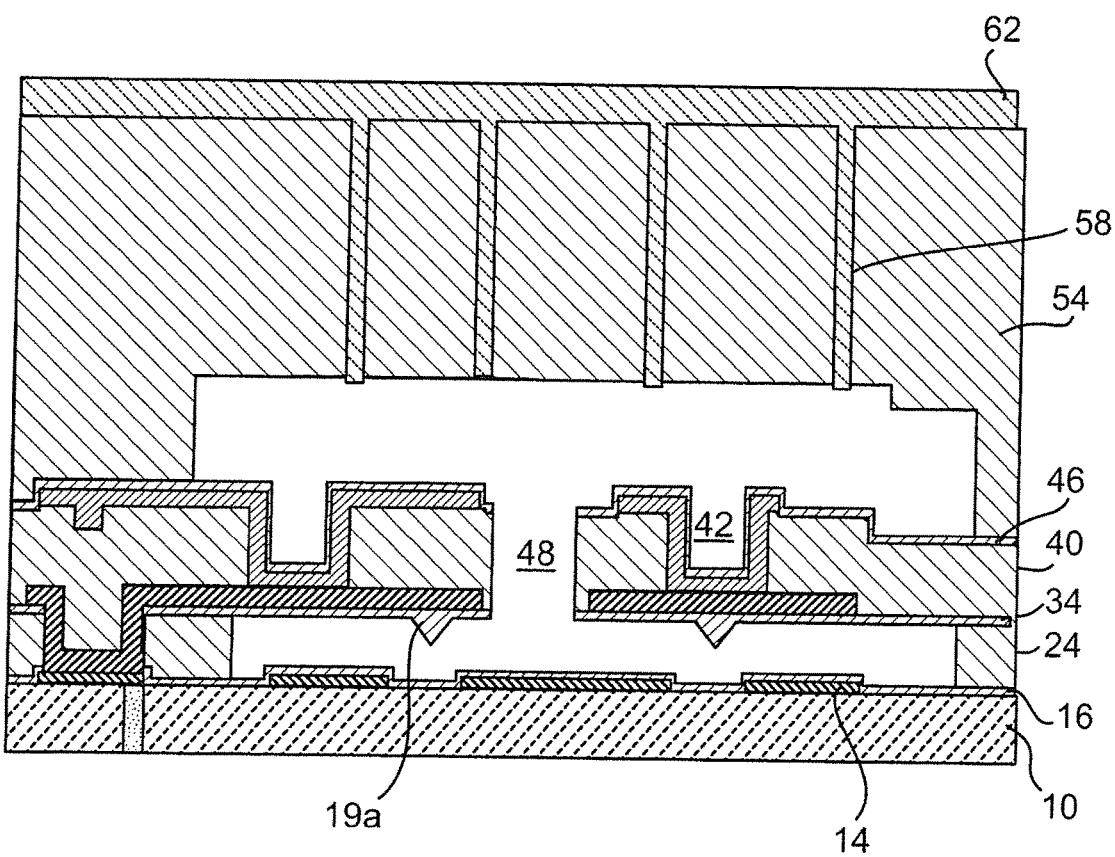

Accordingly, a method of reducing a divot depth or the variability of the silicon layer used for a MEMS structure includes determining a spacing between wires formed on the silicon layer. The method further includes etching an oxide layer for a predetermined amount in order to minimize variability of the silicon layer. The etching for a predetermined amount of time, for each spacing, will result in an optimal structure, e.g., reduce any variability in the silicon layer. The divots over layer 18, which form over seams or voids in the silicon due to underlying topography induced by the gap 14a in layer 14, can be the source of residual oxide under the MEMS beam post venting or release. For example, the oxide layers 24 or 34 can be deposited using a PECVD process which contains an oxidizing plasma and, optionally, at about 350° C. or 400° C., resulting in oxidization of the divot or seam. This oxidized divot or seam CC, as shown in FIG. 33, can remain on the underside of the MEMS beam post silicon venting, resulting in topography under the MEMS beam, which can either partially block the MEMS beam from contacting the lower capacitor electrode (wire) 14, or disintegrate or fall off during MEMS beam actuation or operation, resulting in dielectric damage of the MEMS capacitor. The optional embodiment described in FIGS. 4B, 4C, and 4D, where the layer 18 is polished and capped with a second silicon layer 22, eliminates this problem.

Figure 9A:
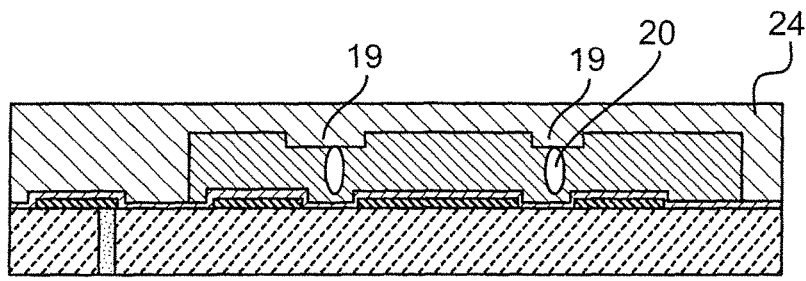
Figure 9B:
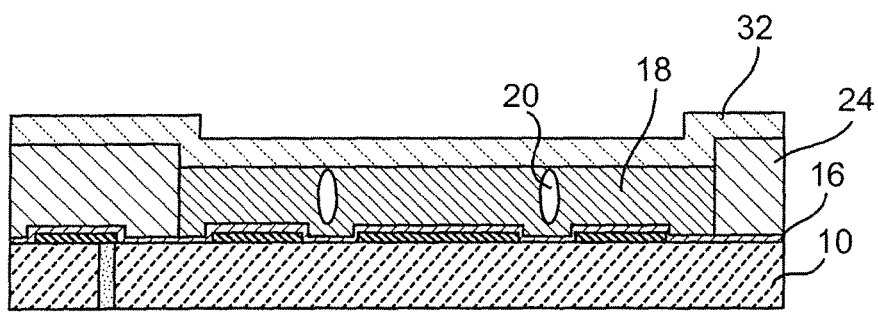

As an optional step shown in FIG. 9A, the oxide material 24 can be deposited to a thickness of about 3.3 μm, compared to the 2.3 μm shown in FIG. 5. For this embodiment, the oxide etch depth is similar to the one described in FIG. 7, but would be approximately 1 um deeper and would need to expose the surface of the underlying silicon layer 18. The divot 19, e.g., may be formed over the voids 20 shown in the layer 18, between the wires 14. As shown in FIG. 9A, the thick oxide material 24 is deposited on the sides of the layer 18, patterned and etched, and polished using CMP. In FIG. 9B, a silicon layer 32, for example, is deposited on the thick oxide material 24 and the layer 18. As mentioned, previously, a native (or any) oxide should be avoided on the surface of layer 18 prior to the deposition of subsequent silicon layer 32 shown in FIG. 9C.

Figure 9C:
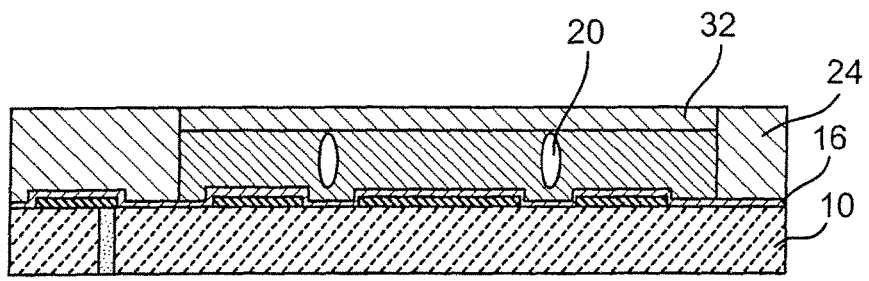

In FIG. 9C, the silicon layer 32 (and portions of the oxide material 24) is planarized using conventional processes such as, for example, CMP, which may eliminate or minimize the divots. In embodiments, this process will advantageously result in a planar cavity structure (e.g., flat or planar surfaces) in subsequent processing steps. These added steps, i.e., silicon deposition, CMP, deposition (FIG. 4A-4C; FIG. 9A-9C) and the reverse damascene oxide CMP overpolish (FIG. 6-8) or non-reverse damascene oxide CMP overpolish (FIGS. 5 and 8) determine both the micro and macro MEMS beam topography. Micro MEMS beam topography due to divots above the silicon voids are further discussed below in relation to FIG. 25.

Figure 9D:
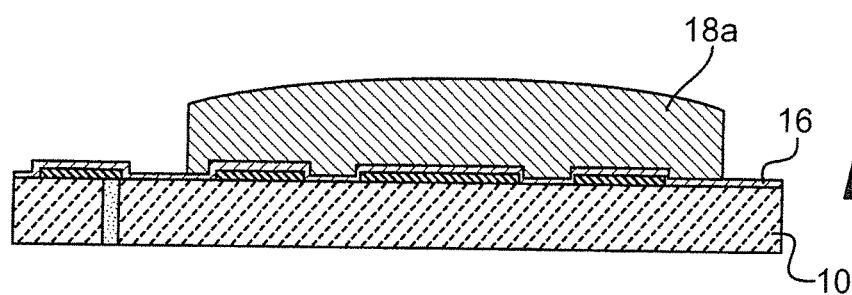
Figure 9E:
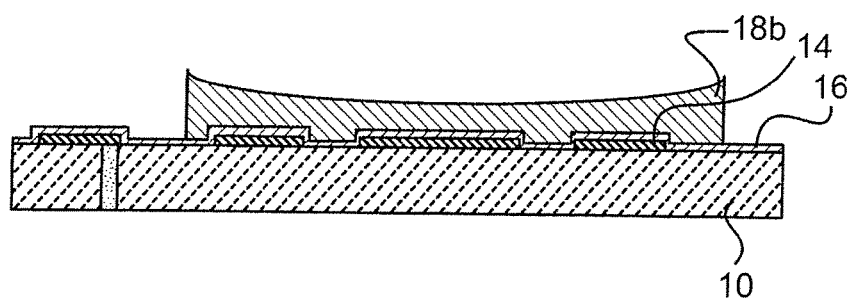

An example of undesirable macro topography are curved silicon surfaces 18a and 18b shown in FIGS. 9D and 9E. FIG. 9D shows the silicon surface curvature 18a due to non-optimized planarization, and more specifically shows an example of undesirable macro topography. This macro topography convex 18a or concave 18b curvature in the lower sacrificial cavity material 18 can cause released MEMS beam 'frozen-in' curvature and poor MEMS actuation, i.e., the MEMS beam can be curved around the sacrificial cavity 18 material, resulting in high post beam release curvature and poor MEMS beam actuation or contact area. The curvature of the silicon surface can be defined by the radius of curvature ROC. A silicon ROC of less than 1 cm is desirable and ROC values greater than 5 cm will result in approximately 50% reduction of MEMS capacitor capacitance due to reduced MEMS capacitor surface contact area and a larger spacing between the two MEMS capacitor plates.

Figure 10A:
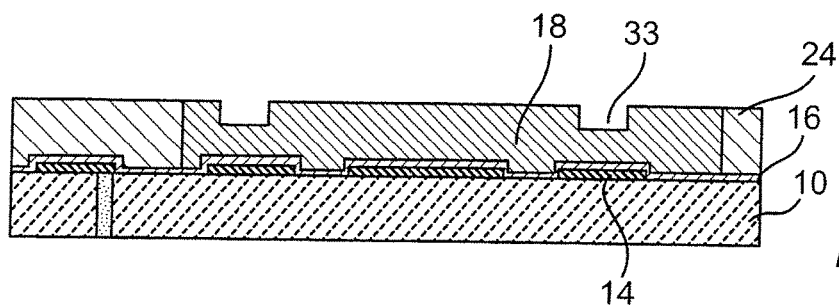

In FIG. 10A, starting from the structure of either FIG. 8 or FIG. 9C, optional trenches 33 can be formed in the silicon layer 18, over wirings 14. To ensure that the silicon is uniformly etched, an optional oxide RIE process can be performed on the resist patterned wafers prior to silicon etch. In addition, with or without the optional oxide RIE process, a HF clean with photoresist on the wafer can be performed to hydrogen passivate the silicon surface prior to etching the silicon. In embodiments, the trenches 33 are formed to a depth of about 0.3 μm into 2 micron tall layer 18 (e.g., sacrificial cavity material 18); although other dimensions are contemplated by the invention depending on the design parameters and, more particularly, the height of the layer 18.

Figure 10B:
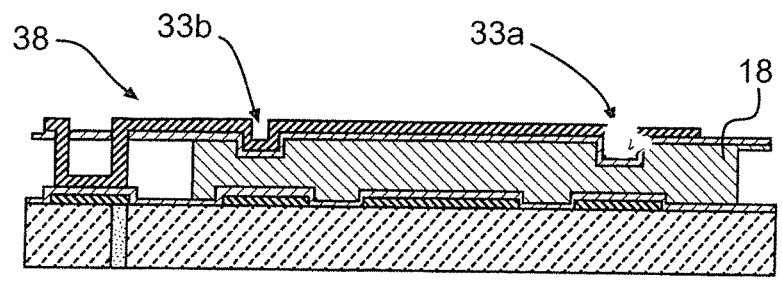
Figure 10C:
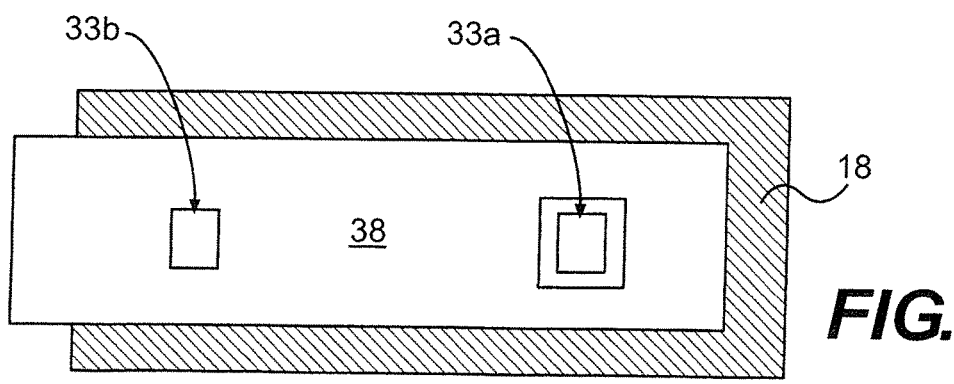

As with the oxide pegs 16a discussed in FIG. 3A, the purpose of these damascene oxide pegs or trenches 33 is to place a dielectric bumper between the MEMS beam and the lower wire level 14, to prevent electrical arcing due to the close proximity of wires in the MEMS beam and the wire 14 during MEMS operation. Arcing could occur when a high dc voltage, i.e., 5-100V, is applied to the MEMS actuator in, for example, the wire 14. To avoid the potential for electrical arcing, the subsequent MEMS beam metal layer in close contact to the bottom of trench 33 could be removed, as shown in FIGS. 10B and 10C. Oxide peg 33a has had the subsequent MEMS beam metal layer 38 taken out of the design while oxide peg 33b has metal layer 38 left in the design.

The subsequent metal layer 38, which is used to form the MEMS beam lower electrode, can be patterned either to cover the oxide peg 33 or to leave it uncovered. If it is uncovered, then the likelihood of arcing or other dielectric damage between the actuator plates is reduced; if it is covered, i.e. metal extends down into oxide peg 33, then the effectiveness of the oxide peg to reduce actuator arcing or dielectric damage may be reduced. If the oxide peg 33 is not covered by metal layer 38 and there is a step down into the peg due to process method chosen, then there may be a thin metal spacer left along the sidewall of the oxide peg. Since this metal spacer does not contact the electrode 38, it is unimportant.

A nearly 90 degree or rounded bottom corner of the oxide peg can be used. To round the peg bottom, which is desirable if the subsequent MEMS beam metal 38 is present over the peg, the rf bias power on the wafer can be reduced or eliminated during the argon-SF$_6$-base silicon etch process and the argon flow can be reduced. The oxide peg 33 can be patterned and etched either before or after the reverse cavity planarization process. If it is done after, then its depth variability is controlled solely by the silicon etch depth variability and not by the reverse cavity oxide CMP planarization step. Alternatively, if it is done before the reverse cavity oxide planarization oxide deposition step, then it will have an added component of height variability, due to CMP removal variability, but it will be filled or partially filled with planarized oxide, which will increase the separation or spacing of subsequent metal level 38 from the actuator metal level 14 if the oxide peg is covered by the metal.

Figure 11:
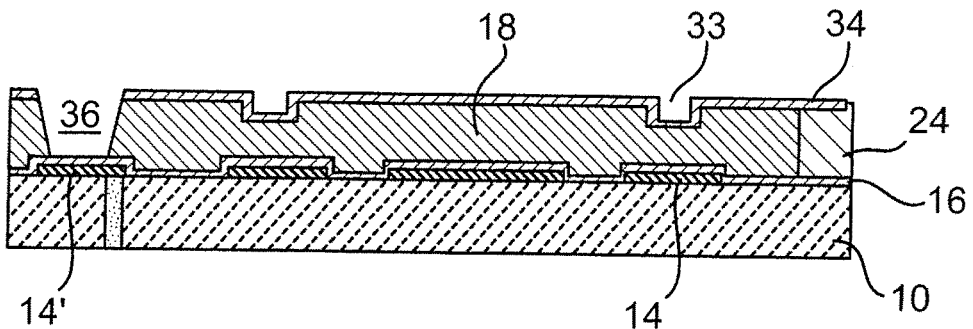

In FIG. 11, an upper capacitor dielectric or oxide deposition is performed on the structure of FIG. 10A. More specifically, in this deposition step, oxide material 34 can be deposited to a height of about 80 nm; although other dimensions are contemplated by the present invention as discussed previously. The MEMS capacitor dielectric, when the MEMS beam is actuated, comprise dielectric layers 16 and 34, which are separated by a small gap, due to the surface roughness and hillocks of the MEMS capacitor electrodes. A tapered via 36 can be formed in the oxide materials 24 and 34 to the underlying wire 14'. The tapered via 36 can be formed using conventional lithographic, etching, and cleaning processes, known to those of skill in the art. Care should be taken with the tapered via not to overly oxidize the underlying TiN, TiAl$_3$, or AlCu surface, which can cause high via resistance. Optionally, the post via RIE photoresist strip can be performed at low temperature, i.e., 100° C., to minimize oxidization. Alternatively, a damascene tungsten stud via could be fabricated, as is known in the art. The use of a tapered via 36 reduces the CMP exposure of the silicon surface, resulting in less silicon 18 thickness variability, avoiding polishing or damaging the upper MEMS capacitor insulator 34, as well as a lower chance of forming a deep divot. Since the silicon layer 18 thickness determines the pull-in voltage of the MEMS device, minimizing its variability is desirable. Note that the tapered via 36 should be used outside of the silicon cavity area, because the oxide etch used to fabricate it would be blocked by the silicon layer 18 if it was placed inside the silicon cavity. If the subsequent metal deposition process used for wire 38 has poor conformality or side wall coverage, than the aspect ratio of tapered via 36 needs to be low, e.g., 0.5:1. For a 2 micron thick insulator 24, a 4 micron wide tapered via 36 could be used. Alternatively, if a conformal aluminum process, i.e. a hot reflow PVD or CVD process, was used, than a higher aspect ratio could be used for tapered via 36.

Figure 12:
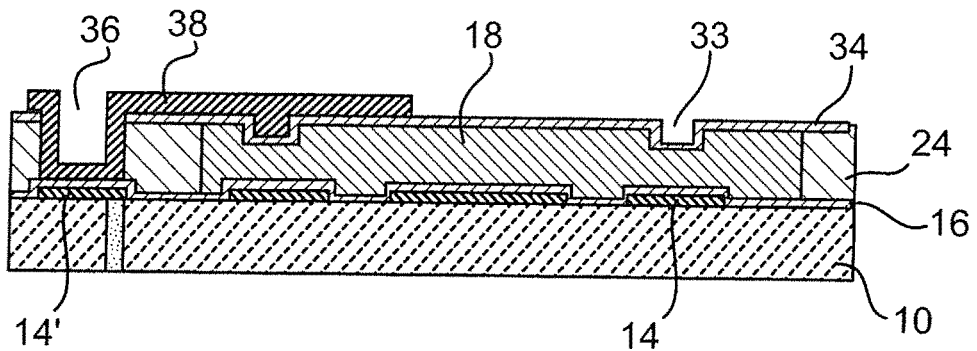

In FIG. 12, a wire of electrode 38 is formed and patterned over the oxide material 34, and also deposited within the via 36 to contact the underlying wire 14'. The electrode 38 can also be deposited in the trenches 33; however, for illustrative purposes the electrode is not shown in the trench 33 of FIG. 12 (although electrode 38 is shown formed in trench in subsequent figures). In embodiments, the electrode 38 can be, for example, AlCu; although other materials are also contemplated by the invention. In embodiments, for example, the electrode 38 can be TiN, TiN or W, Ru, Pt, Ir, amongst other materials. The thicknesses of this and other electrodes and/or wires can vary depending on the specific design parameters. For example, Ti/AlCu/Ti/TiN layers could be used with 10 nm, 480 nm, 10 nm, and 32 nm thickness, respectively, which would form $TiAl_3$ under and over the AlCu after 400C annealing. To minimize any hillocks, in embodiments, an optional Ti layer may be deposited and/or formed in direct contact with A1, as discussed previously. In this case, the hillocks should be suppressed on the lower surface of the wire (electrode) 38, as opposed to the upper surface. Alternatively, the electrode 38 could be formed from a noble metal, such as Au; or a refractory metal, such as W or Ta; or without a Ti—AlCu interface, e.g., Ti/TiN/AlCu/TiN.

Figure 13:
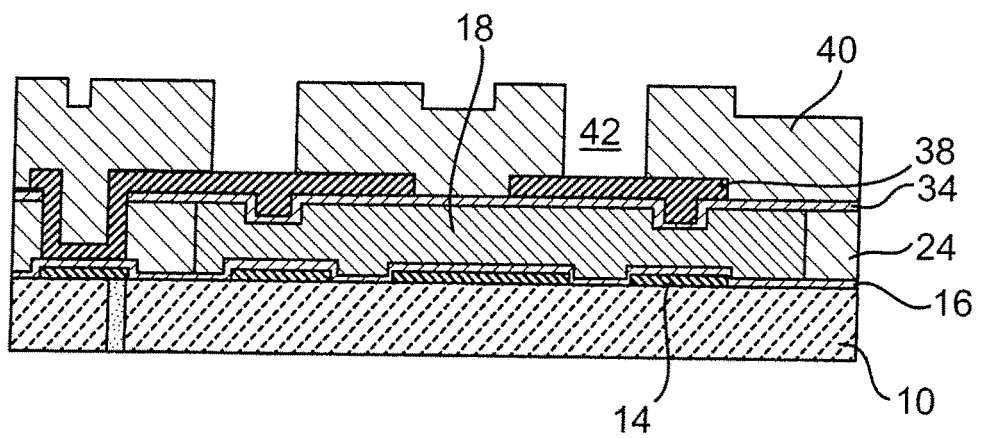

In FIG. 13, an insulator material 40 is conformally deposited over the electrode 38. In embodiments, the insulator material 40 is a deposited oxide using any of the methods discussed above that is deposited to a height of about 0.5 to 5 µm, depending on the beam spring constant and oxide to metal thickness ratio requirements. In one exemplary embodiment, insulator material is 400° C. PECVD 2 µm oxide and has a well controlled residual stress and thickness. In embodiments, tapered vias 42 are formed in the insulator material 40, to expose portions of the underlying electrode 38 in a fashion similar to the vias 36 formed previously. Alternatively, tungsten stud vias could be fabricated, at the price of degrading the thickness variability of layer 40 due to variable CMP erosion of the insulator layer 40. Variation in the insulator layer 40 thickness or residual stress results in spring constant and stress gradient variability in the overall MEMS beam, which can negatively affect the beam curvature and bending.

Figure 14:
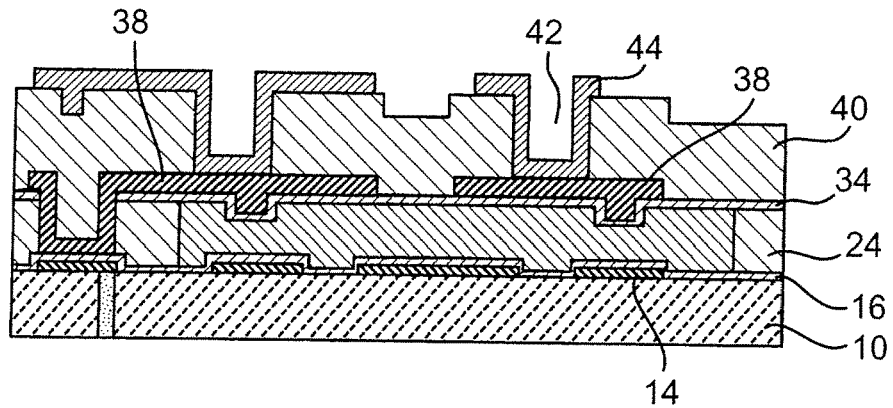

As shown in FIG. 14, an upper electrode 44 is formed and patterned over the insulator layer 40, and also deposited within the vias 42 to contact the lower electrode 38. In embodiments, the upper electrode 44 is formed from the same materials as the lower electrode 38; in one exemplary embodiment, uppers electrode 38 and 44 are composed of Ti/AlCu/Ti/TiN. For tungsten stud vias, the prior art teaches that the uppermost TiN layer should be left on the wires post via etch. For the tapered vias used with these MEMS structures, it may be desirable to fully remove the TiN layer prior to depositing the electrode 38 and 44 metal, i.e., Ti/AlCu/Ti/TiN, by either etching it using a TiN RIE chemistry, sputter it using an argon sputter, or a combination of both to eliminate the potential for via resistance high flyers. In embodiments, the metal volume of the electrodes 38 and 44 should be the same or substantially the same in order to balance the overall volume and stress of the device, and hence not place undue stresses on the beams of the MEM structures. The metal volume is determined by both the metal thickness and the layout. If identical layouts are used for electrodes 38 and 44, then they would have the same volume if their thicknesses were the same. If a slotted or holed layout was used for the lower electrode 38, then the upper electrode would need to be thinned to match the metal volume. In embodiments, the thickness of the lower or upper electrode 44 can be increased or decreased to intentionally place a stress gradient into the beam, which can cause the beam to deflect up or down post release; or to change the beam bending induced by changing temperature, as discussed below. The preceding discussion assumes that the electrodes 38 and 44 are composed of a single, identical metal film. In reality, as discussed above, the electrodes are composed of multiple layers of metal, each with different thermal expansion coefficient (CTE) and other mechanical properties and, if the layout or thickness is varied, it is nearly impossible to exactly match their mechanical properties. If the AlCu portion of the electrodes 38 and 44 is much thicker than the refractory and other metal components, then, to first order, the CTE and other mechanical properties can be approximated by those of the AlCu film.

Figure 28:
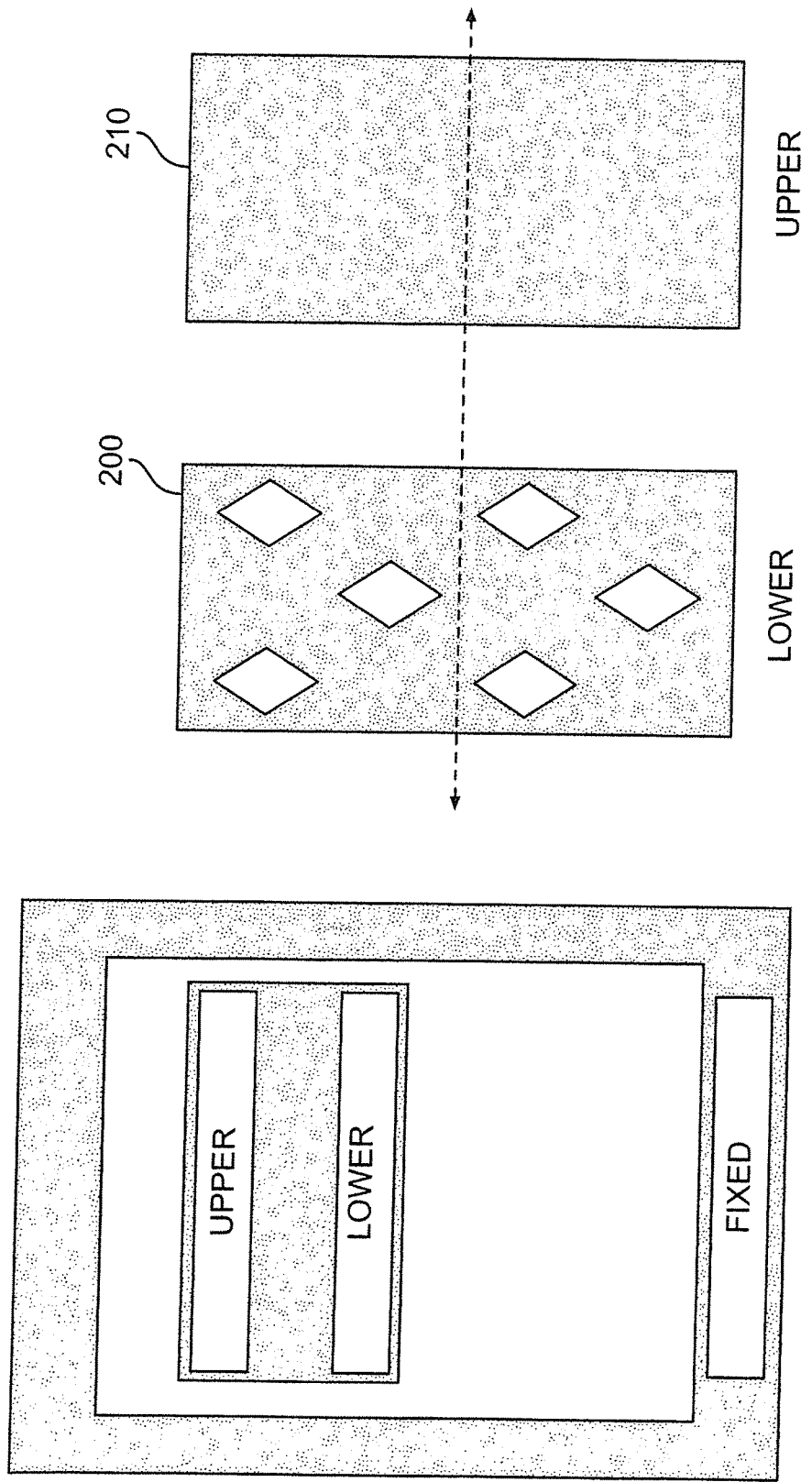

Alternatively, if the layout of the upper and lower electrodes 38 and 44 are asymmetric or different, then the thickness of the electrode with a lower pattern factor (i.e., less metal) could be thickened to balance the metal volume. One example of an asymmetric upper and lower electrode is shown in FIG. 28. In this representation, there are diamond (or other patterned shapes) shaped shapes removed from the lower MEMS electrode 200, which are placed to decrease the likelihood of metal hillocks forming. Because the area of lower MEMS electrode 200 is less than the area of upper MEMS electrode 210, the volume of metal in each electrode would be out of balance if the metal thickness for electrodes 200 and 210 were identical. Balancing the metal volume of the lower and upper electrodes is important for both cantilever and bridge MEMS beams because the coefficient of thermal expansion (CTE) of the beam metal, e.g., aluminum, is much greater than the CTE of $SiO_2$.

In embodiments, MEMS electrodes with different areas could be partially balanced. For example, if the lower MEMS beam electrode had 80% less area than the upper MEMS beam electrode, the lower electrode could be thickened by 10% to partially rebalance the metal volume in the two electrodes. Intentionally unbalancing the metal volume in the two MEMS electrodes can cause MEMS beam bending post release or venting which acts to bend the beam up or down into a desirable position; or can minimize the MEMS beam bending over operational use temperature, e.g., −55° C. to 125° C. or any normal range of packaged chip operational temperatures, as discussed below. The MEMS cavity actuation gap is increased or decreased as the MEMS beam bends up or down; and the curvature of the beam, which can reduce the contact area and decrease the capacitance, can change as the MEMS beam expands or contracts with changing temperature. Minimizing the MEMS beam bending over operational chip temperatures is desirable because the actuation voltage is inverse proportional to the MEMS cavity gap.

Figure 31:
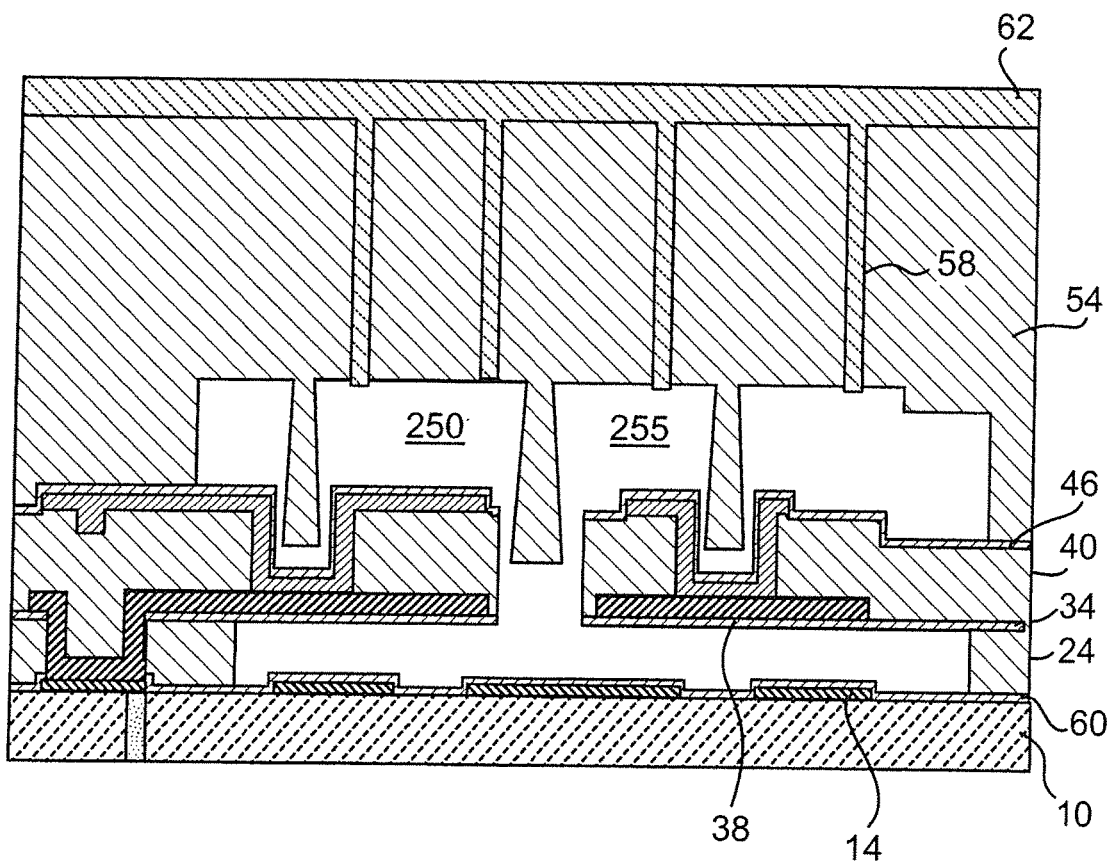
Figure 32:
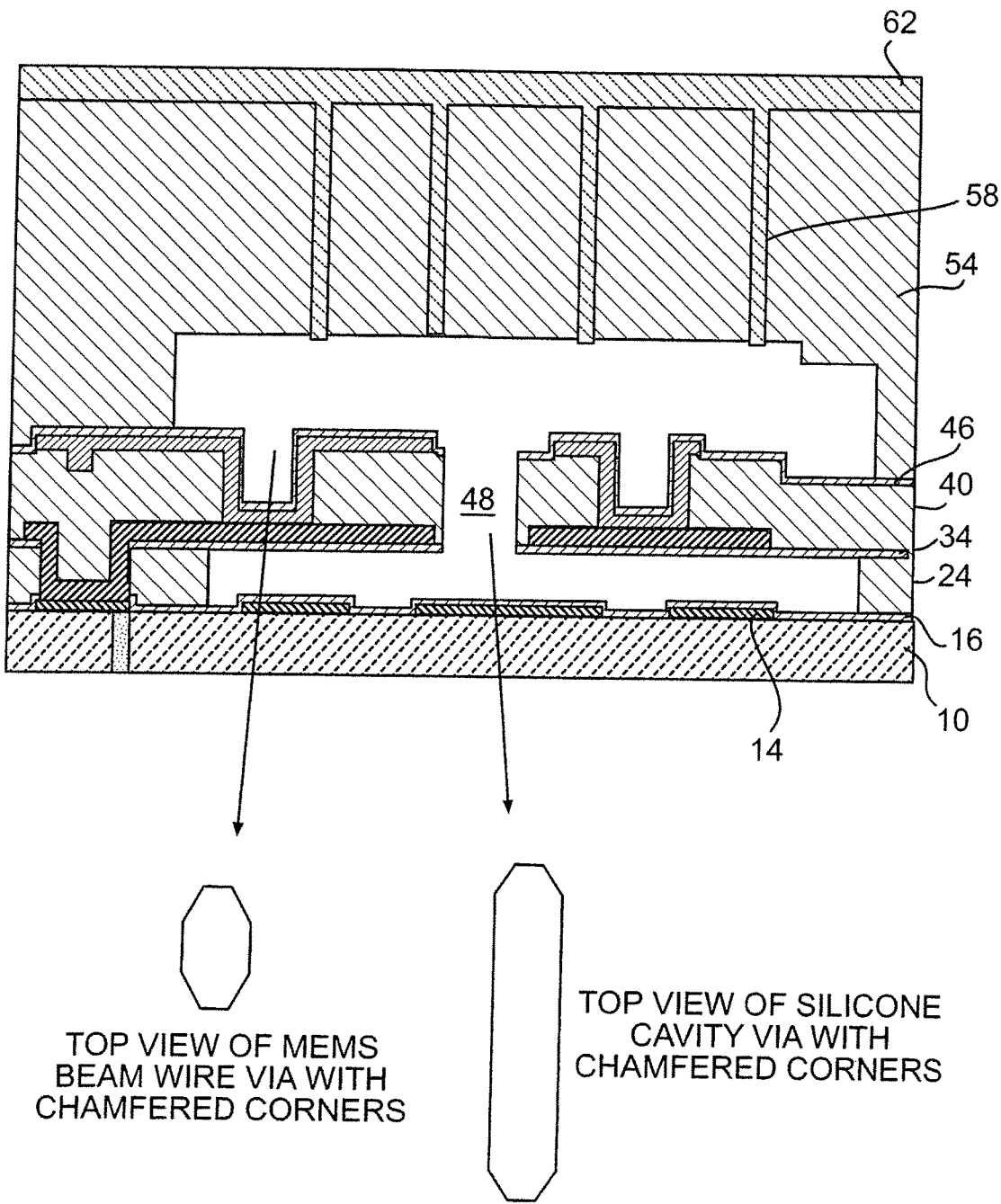
Figure 35A:
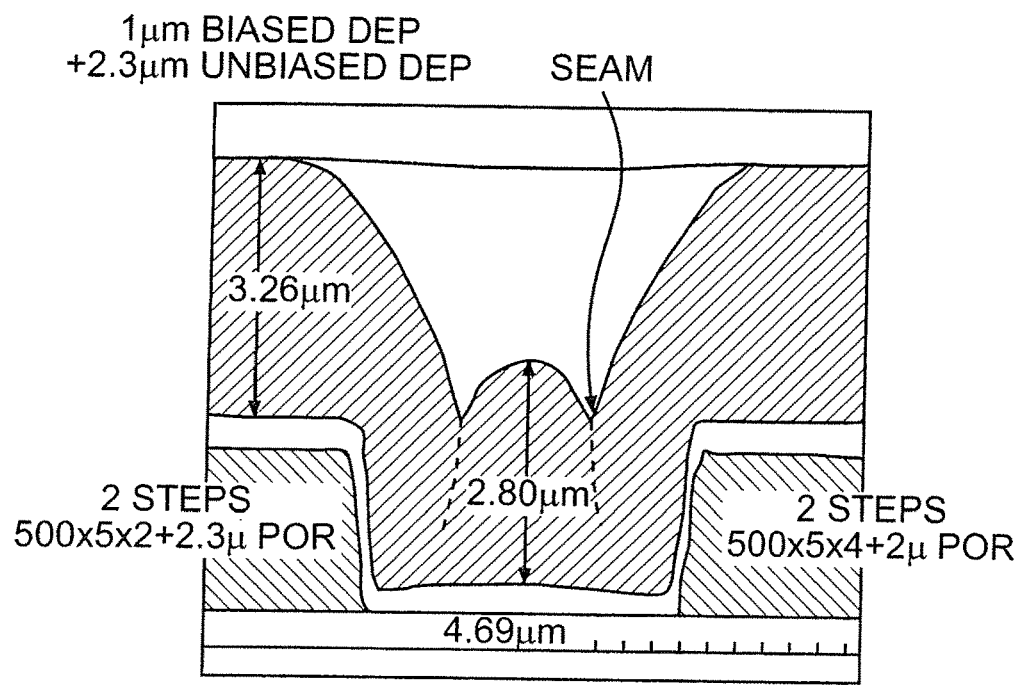
FIG. 35A shows a structure and process which reduces or eliminates an oxide seam in deposited silicon due to incoming topography, in accordance with aspects of the invention (compared to FIG. 35B which shows the oxide seam).
Figure 35B:
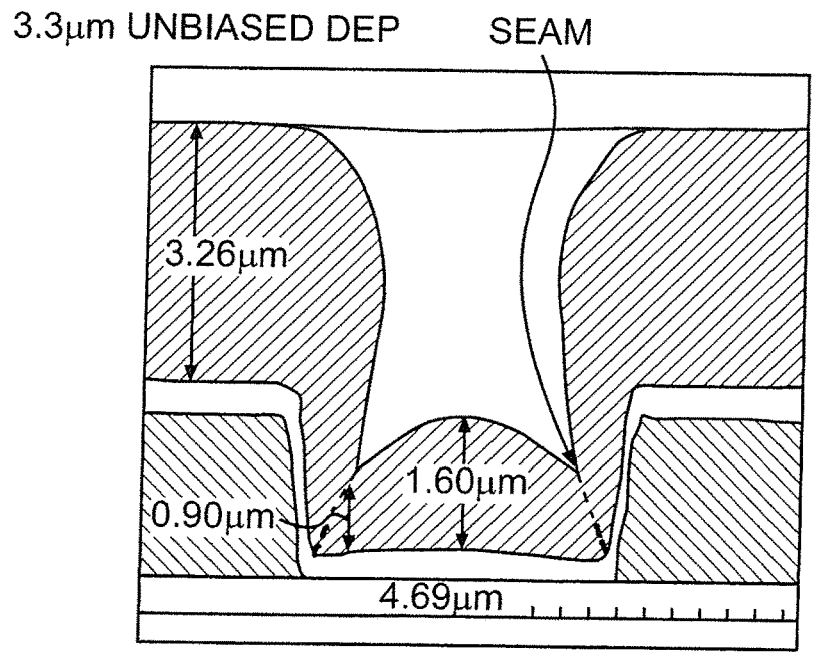

When the vented MEMS beam movement is constrained by the lid, either because of the lid rivet AA or because the lid is bonded to the lid BB (see, FIG. 31), the MEMS beam will not actuate as expected and will be partially or completely non-functional. The regressive lid oxide profile shown in FIG. 16 has the largest regressive extent in the corners of the vias 42 and 48. To reduce this, the vias inside the MEMS cavity 42 and 48 corners can be rounded or chamfered, as shown in FIG. 32, which reduces the likelihood that the lid oxide will pin the MEMS beam. FIG. 30E shows a non-regressive silicon deposition with tapered side wall profiles for the upper silicon cavity. This conformal silicon deposition process can be obtained, for example, by performing multiple PVD silicon deposition and rf biased wafer etchback steps preferably in-site, i.e. in the same chamber, or ex-situ, i.e., transferring between a deposition and etch back chamber, during the silicon deposition to achieve an approximate 45 degree angled silicon deposition profile. Once the 45 degree angle is achieved, e.g., after about 0.3 μm of net deposition over a 0.3 μm tall feature (FIG. 3) or after about 1 μm of net deposition over a much deep feature (FIG. 16), the balance of the deposition can consist either of a normal, unbiased, silicon film or a combination of thicker unbiased silicon films with less frequent etch back steps, which may be needed to eliminate an oxidized seam in the silicon due to underlying topography. The goal of these silicon deposition/etch back processes is to both eliminate a regressive overhang structure and also to reduce or eliminate a seam in the deposited silicon due to incoming topography (FIG. 35A). (This is compared to FIG. 35B which shows an oxide seam to the corner of the MEMs structure.) This non-regressive PVD silicon deposition process combines lower chamber pressure deposition for bottom and sidewall deposition, and uses higher chamber pressure etching, where a rf bias is applied to the wafer, to maximize top surface and corner etching. These steps of low pressure deposition and high pressure etchback are repeated sequentially until a desired thickness is achieved. In one exemplary embodiment, the lower pressure deposition, e.g., <6 MTorr, and high pressure, e.g. >10 mTorr, etchback step thickness values are on the order of 10-50 nm for deposition and 5-25 nm for etching, e.g., the etchbacked silicon removal is less than the deposited thickness, and, as mentioned below, the first silicon layer thickness may be increased to, for example, 50 or 100 nm, to avoid sputtering into the corners of features. In addition, this sequence allows for increased film density on the sidewall and tapered surfaces. The surface area of the Si is then minimized, reducing the amount of surface oxidation. Alternatively, a simultaneous PVD silicon deposition and etchback process could be employed, where the sputtering target is biased to sputter the silicon and the wafer is biased to create 45 degree sidewall angles. This is critical to achieve stable venting performance of the Si as any oxidation reduces the venting rate of the Si cavity.

The desired 45 degree corner angle is obtained by the repeated argon sputter etch back step and, after it is obtained, the silicon deposition process could revert back to a normal deposition process without argon sputter steps. This biased silicon deposition process could also be applied to the lower silicon cavity layer 18 to eliminate voids and seams in the silicon. Care should be taken when sputter etching the silicon during the initial film deposition step to avoid sputtering insulator or other materials from the corners of features. The corner 405 in FIG. 30E could be chamfered to 45 degrees by this in-situ or ex-situ sputtering method, resulting in redeposition of oxide layer 46 into the silicon with resultant difficulty in silicon venting due to the presence of $SiO_2$ in the silicon. To avoid sputtering the exposed corners during the initial silicon deposition, an initial unbiased silicon layer, e.g. 50 or 100 nm, can be deposited.

Figure 29:
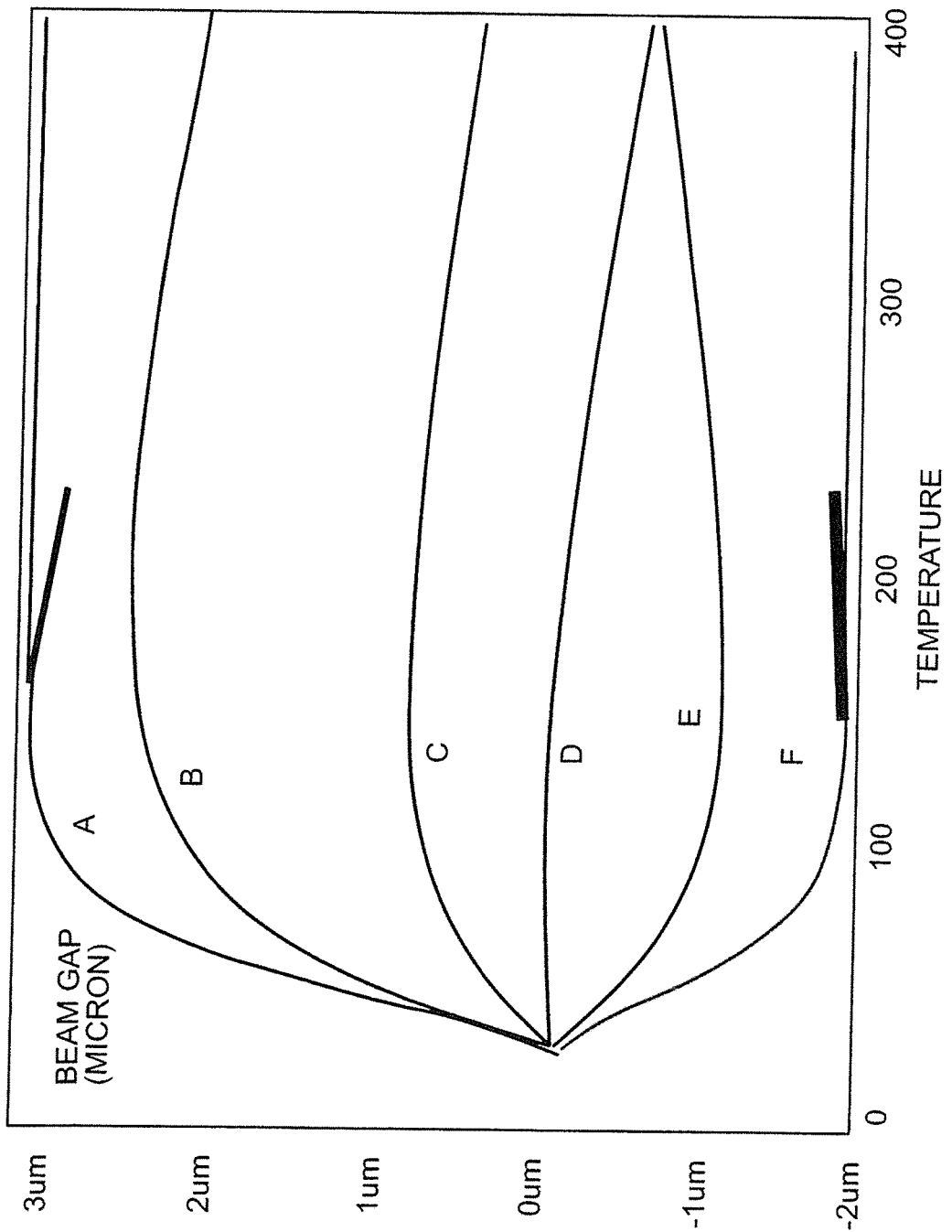

As the released MEMS beam is heated or cooled, it will bend upwards or downwards due to the electrode with the greater volume of metal expanding or contracting more than the electrode with the lesser volume of metal. FIG. 29 and Table 2 quantitatively show MEMS bridge beam bending versus temperature for beams using the layout shown in FIG. 28. As mentioned above, the MEMS beam bends because of the CTE mismatch between the oxide and metal in the beam. The dominant metal in the beam, e.g. aluminum, has a yield stress temperature of 150-250° C. The yield stress temperature occurs when the residual stress in the aluminum no longer changes with temperature, as known in the art. At the yield stress temperature, the bending can either flatten out or, more typically, reverse direction (FIG. 29 curve B or E). MEMS bridge beams with balanced metal volume have minimal bending vs. temperature; beams with more upper electrode volume bend upwards with increasing temperature; beams with greater lower electrode volume bend downwards vs. temperature. Note that, if the MEMS bridge beam bending is large enough, the beam will be constrained by the lid over the MEMS beam or the fixed electrode under the MEMS beam (FIG. 29 curves A or F). The most desirable MEMS beam bending vs. temperature behavior is one where the total bending is minimized, for reasons discussed above. This may be achieved using MEMS beam thicknesses such that the MEMS bending profile initially bends upwards and then bends downwards over the temperature range of interest, i.e. FIG. 29 curve C; or vica versa. Achieving a MEMS beam bending curve like this may require intentionally unbalancing the lower and upper electrode volume.

In one exemplary embodiment, the ratio of the lower electrode 38 to upper electrode 44 pattern factor is 0.8:1; the beam oxide is 2 μm thick, the lower electrode has total thickness of 0.56 μm with unreacted AlCu thickness of 450 nm, and the lower electrode has total thickness of 0.48 μm with unreacted AlCu thickness of 370 nm. This combination results in electrodes 38 and 44 with unbalanced volume, i.e., the volume ratio of electrodes 38 and 44 is 0.93:1 and minimized beam bending vs. temperature, over the temperature range of interest qualitatively similar to curve C in FIG. 29.

TABLE 2

| Curve | Lower:Upper electrode thickness ratio (lower electrode is 20% less than upper electrode layout area) | Bending at metal yield stress point | Comment |
| --- | --- | --- | --- |
| A | 1:1.5 | +3 um | Upwards bending constrained by lid |
| B | 1:1 | +2.2 um | |
| C | 1:0.9 | +0.8 um | |
| D | 1:0.8 | −0.1 um | |
| E | 1:0.7 | −1.0 um | |
| F | 1:0.5 | −2 um | Lower bending constrained by lower fixed electrode |

This MEMS beam bending post release can cause two problems, as mentioned above:

a. during normal chip operation, e.g., from about −55° C. to 125° C., MEMS beam bending will increase or decrease the actuation gap resulting in a corresponding change in the actuation voltage; and b. if the released MEMS beam is heated to high temperatures (e.g., >150° C., e.g. 400° C.), which is likely due to normal processing after the sacrificial material is vented or removed, then the released MEMS beam will bend upwards, downwards, or both due to thermal expansion mismatch between the upper and lower MEMS beam electrodes and the beam oxide and, if the bending is large enough, be constrained by the lid over the MEMS beam or the fixed electrode under the MEMS beam. Constraining the MEMS beam during annealing can 'freeze in' an undesirable curvature, resulting in a MEMS beam that is curved (i.e., not flat). A curved MEMS beam will have reduced contact area, resulting in reduced capacitance. Additionally, if the force exerted by the MEMS beam pressing against either the fixed electrode under the beam or the lid over the beam is too high, then either the MEMS beam or the lid can crack, resulting in catastrophic failure of the MEMS device.

Figure 15:
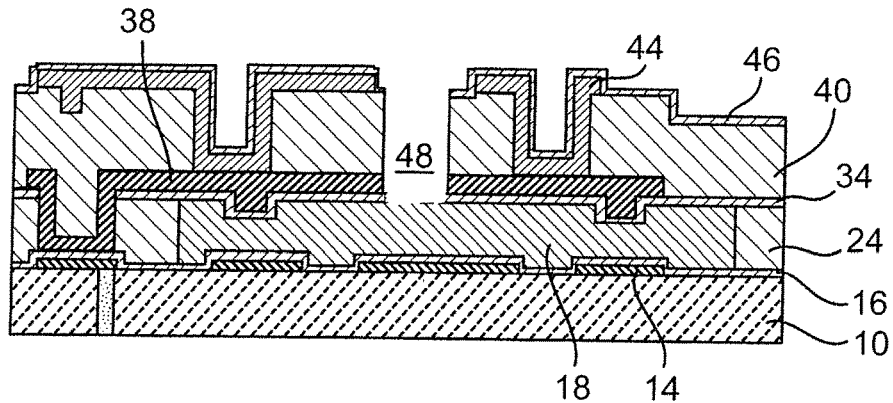

In FIG. 15, an insulator material 46 is deposited on the upper electrode 44 and exposed portions of the insulator material 40. In embodiments, the insulator material 46 is deposited to a thickness of about 80 nm; although other dimensions are also contemplated by the present invention. To balance the MEMS beam, insulator material 46 over the MEMS beam should be substantially the same thickness as insulator material 34 under the MEMS beam. This thickness balancing of layers 34 and 46 should include any additional dielectric deposition on layer 46 that occurs during the subsequent vent hole dielectric deposition sealing step. A cavity via 48 is formed through the insulator materials, 34, 40 and 46 to the underlying layer 18 by patterning and etching through the insulators. In embodiments, any unwanted oxide, such as a native oxide which is formed by exposing the silicon 18 to air, on the silicon can be cleaned using, for example, an HF acid, prior to the subsequent silicon deposition. It is desirable but not required that the sidewall angle of the cavity via 48 be tapered, to improve the subsequent silicon deposition sidewall coverage and reduce the seam or void in the silicon.

Figure 16:
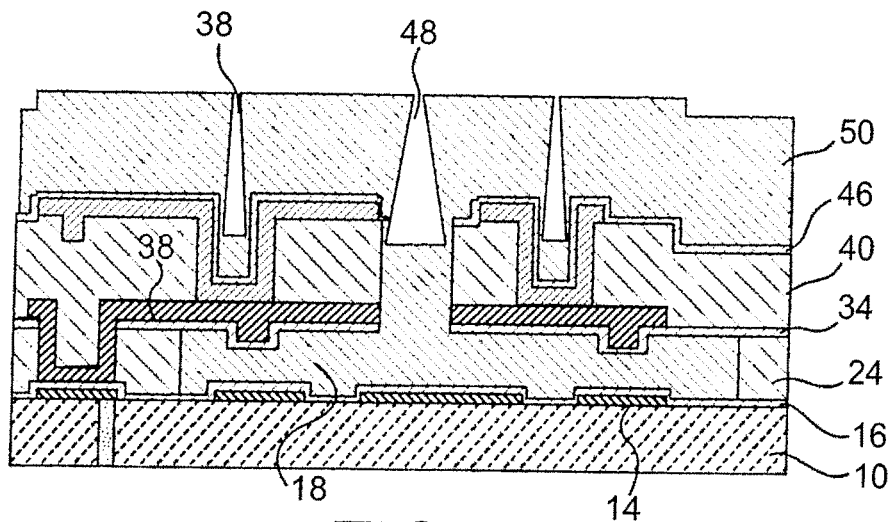

In FIG. 16, silicon layer 50 is deposited on the structure of FIG. 15. In embodiments, the silicon layer 50 can be deposited to a thickness of about 4 μm; although other dimensions are also contemplated by the present invention. As shown in FIG. 16, the silicon layer 50 is deposited such that the topography of the silicon layer 50 changes in accordance with the underlying features. The silicon layer 50 can leave a regressive profile over the vias 42 and 48. During the subsequent oxide deposition, the oxide can fill the regressive structures in a rivet-like fashion so that there is a rivet-shaped oxide peg over the vias 42 and 48. This riveted-shaped oxide feature in the lid can pin the MEMS beam post release. To avoid this MEMS beam pinning, either the silicon layer 50 deposition process needs to be optimized to avoid this shape (FIG. 30E); or a thick enough silicon 50 layer to pinch off or partially pinch off the via 42 and 48 openings is needed (FIG. 30D); a silicon deposition, CMP, and subsequent silicon deposition is needed similar to the one discussed for silicon layer 18 previously, or a combination of the above. Also, as shown in FIG. 16, the silicon layer 50 makes contact with the underlying layer 18 through the via 48. In embodiments, due to the HF acid cleaning, there will be no oxide between the two layers of silicon (e.g., layer 18 and layer 50). In optional embodiments, the silicon layer 50 has a 3 micron initial thickness, undergoes a 1 micron CMP removal, and has a second silicon deposition to achieve the 4 μm thickness.

Figure 17:
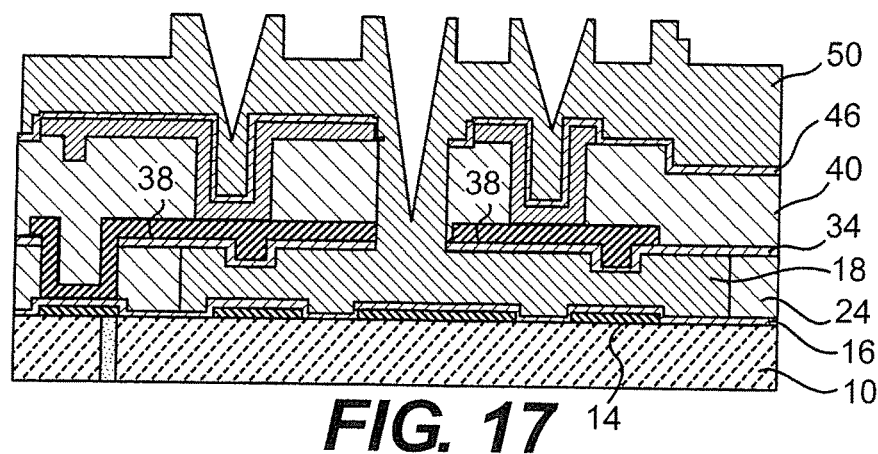

In an optional embodiment shown in FIG. 17, the silicon layer 50 can undergo an optional lithographic and RIE process using a reverse mask, similar to that discussed above. This reverse mask would place photoresist over the vias 42 and 48 so that, when the silicon 50 was etched back using a RIE or wet chemical silicon etch process and subsequent resist stripping and cleaning, the topography would be reduced incoming to a subsequent CMP step. The reverse mask shapes need to fully cover the vias 42 and 48 openings, so that trenches would not be etched along their sidewalls, as previously discussed regarding FIG. 6.

Figure 18A:
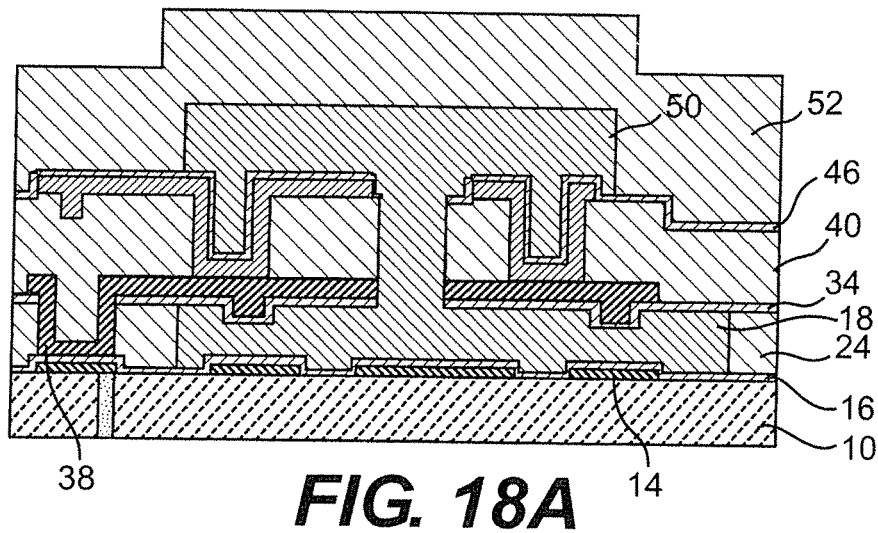
Figure 18B:
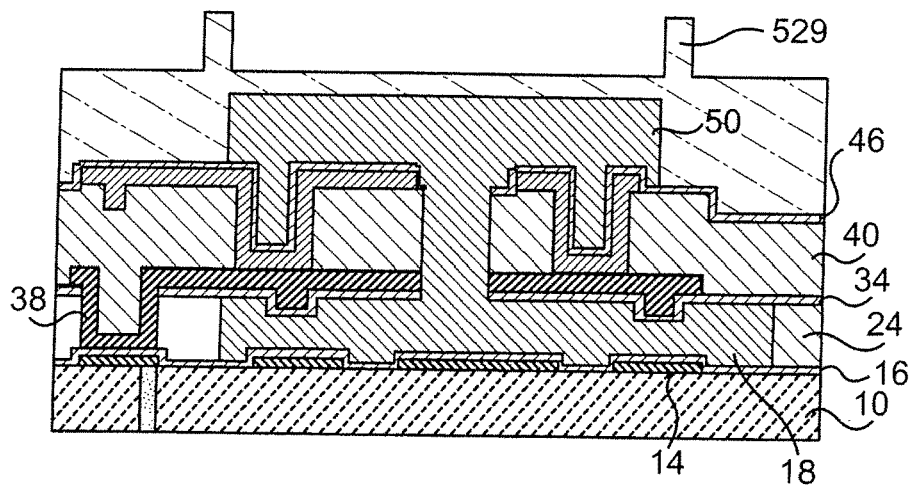

FIG. 18A shows the patterning and etching of the silicon layer 50 using methods similar to those discussed previously in regards to FIG. 3. In FIG. 18A, the silicon layer 50 undergoes a CMP process to planarize or partially planarize the silicon surface, and thereafter a cleaning. As mentioned previously, any silicon polish process can be used and, if a process with low or no selectivity to SiO2 is used, then the likelihood of point defects on the silicon surface is eliminated. In this embodiment, the silicon layer 50 will be patterned such that the silicon layer 50 remains within the previously formed via 48 and formed trenches 46. In embodiments, the silicon layer 50 can be planarized using a conventional CMP process with or without a reverse mask patterning and etching process. For either the CMP-only or reverse mask etchback followed by CMP, an optional second silicon deposition, preceded by a HF clean, could be performed. Alternatively, the silicon layer 50 deposition can be optimized so that it conformally fills the vias 42 and 48; or it pinches off the vias 42 and 48, as discussed above and below. This will ensure that the subsequent lid layer, 54, will not extend into a rivet-like feature formed over vias 42 and 48, which can potentially cause rubbing against a MEMS beam, as discussed above. Also, in embodiments, this process will also advantageously result in a planar or substantially planer cavity structure (e.g., flat or planar surfaces) in subsequent processing steps.

The optional step of FIG. 17 can assist with the subsequent etching/planarization of the silicon layer 50. Note that any CMP or other planarization of the silicon layer 50 cannot completely planarize all features on the wafer if an optical wavelength is used for subsequent lithographic alignment. To avoid complete planarization, the vias 42 and 48 could be stacked in areas outside the functional integrated circuit so that, even if the silicon was planarized over the vias 42 and 48, it would not be planarized over stacked 42 and 48 via structures.

Figure 19A:
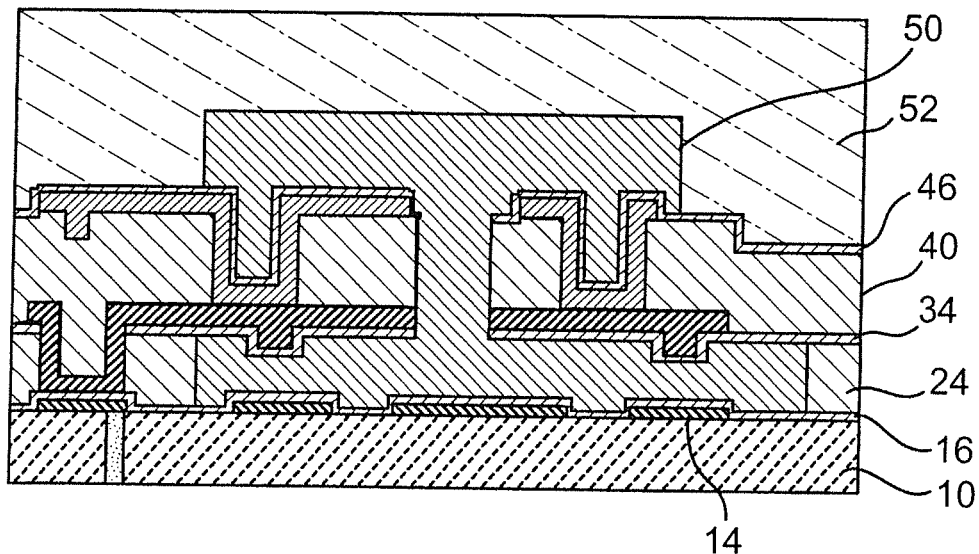
Figure 19B:
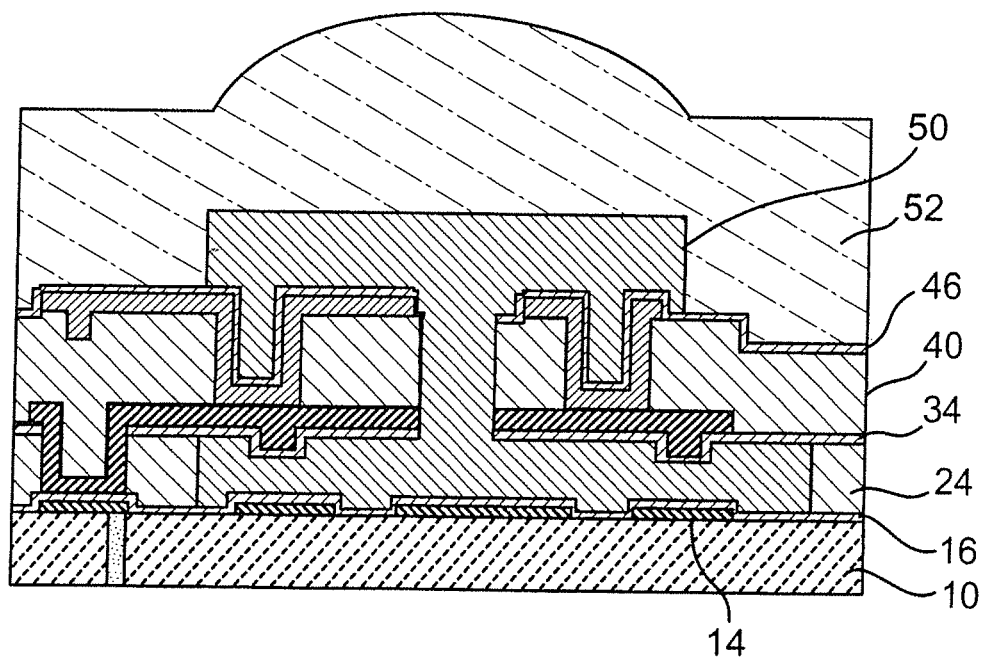

As shown in FIG. 19A, the oxide material 52 can be planarized such that oxide is left over silicon layer 50 (FIG. 19A), or can be planar with the underlying silicon layer 50, similar to what was previously shown in FIG. 8. Whether or not the oxide layer 52 is planarized back to the surface of silicon layer 50, additional dielectric may need to be deposited to form the required oxide lid thickness over the MEMS cavity, as discussed below. Alternatively, the oxide layer 52 can be partially planarized, as shown in FIG. 19B; or left unplanarized. As an optional step much like shown in FIG. 9A, the oxide material can be deposited to a thickness of about 5 μm, compared to the 2.3 μm, with a Si layer, for example, deposited on the thick oxide material. The Si layer (and portions of the oxide material 52) are planarized using conventional processes such as, for example, CMP. The oxide material 52 deposition process should sufficiently fill the wire level 44 spaces such that voids in the oxide do not intersect the CMP planarized oxide surface by, for example, deposition the initial oxide film with HDPCVD oxide to fill the spaces, deposition/etch/deposition oxide, or PECVD TEOS-based oxide, either for the initial oxide deposition or the entire film. With all of these embodiments, the reverse pattern etch back step shown in FIG. 18A is optional.

Figure 19C:
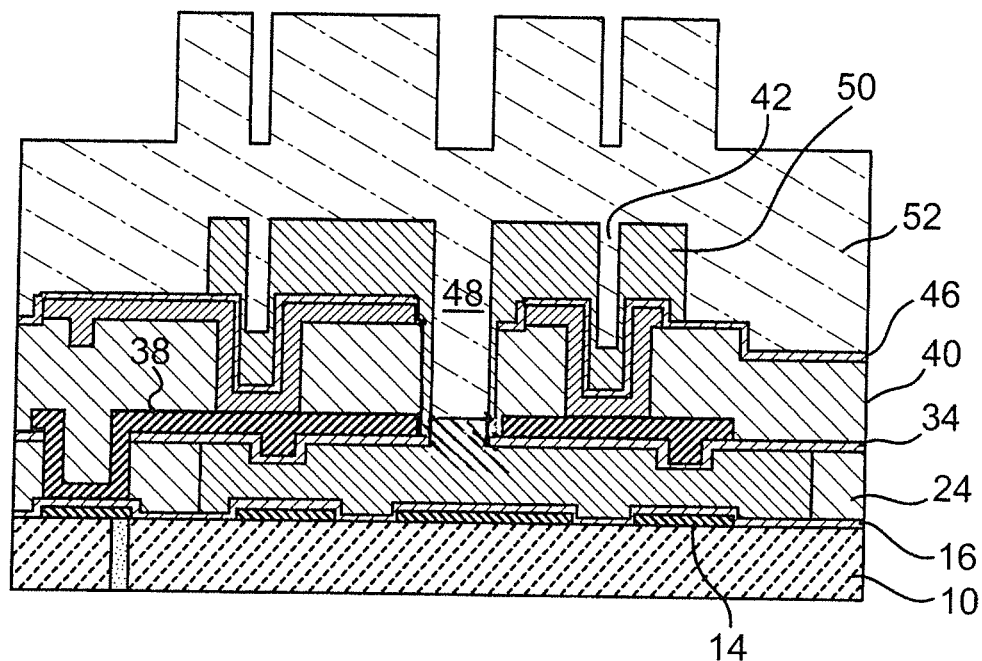
Figure 19D:
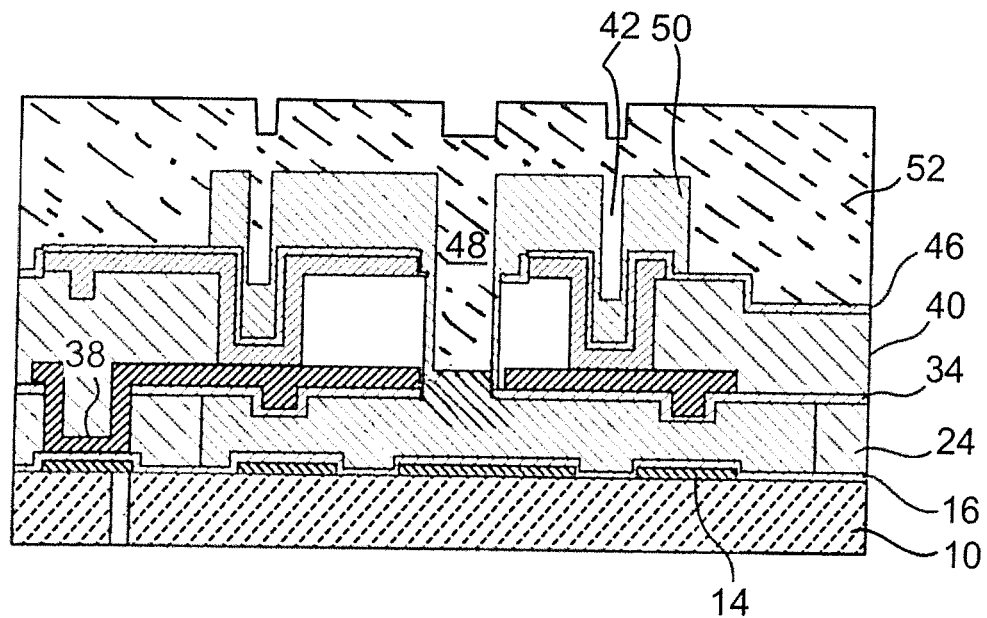

If silicon layer 50 was not fully planarized, as shown in FIG. 16, then the oxide layer 52 surface will follow the surface topography of silicon layer 50, as shown in FIG. 19c. With the incoming topography shown in FIG. 19C, the oxide CMP step, with or without the reverse damascene etch back step, could not fully planarize the surface of oxide layer 52 due to the presence of vias 42 and 48, with a resulting profile shown in FIG. 19D. Note that the surface profile shown in FIG. 19D could also have the global profile shown in FIG. 19B superimposed on it.

Alternatively, if the optional oxide etch back step etched down to the silicon surface of silicon layer 50, then the oxide over the vias 42 and 48 would extend below the surface of silicon layer 50. This topography over vias 42 and 48 could result in trenches in the final diced wafer surface, which could cause chip reliability problems due, for example, to water collection in the trenches during humidity-pressure stressing of the packaged chips. To avoid this problem, the oxide layer 52 could be deposited to a thickness such that the openings over vias 42 and 48 pinch off; or the oxide layer 52 could be planarized such that the final surface is planer as in FIG. 19A.

Figure 19E:
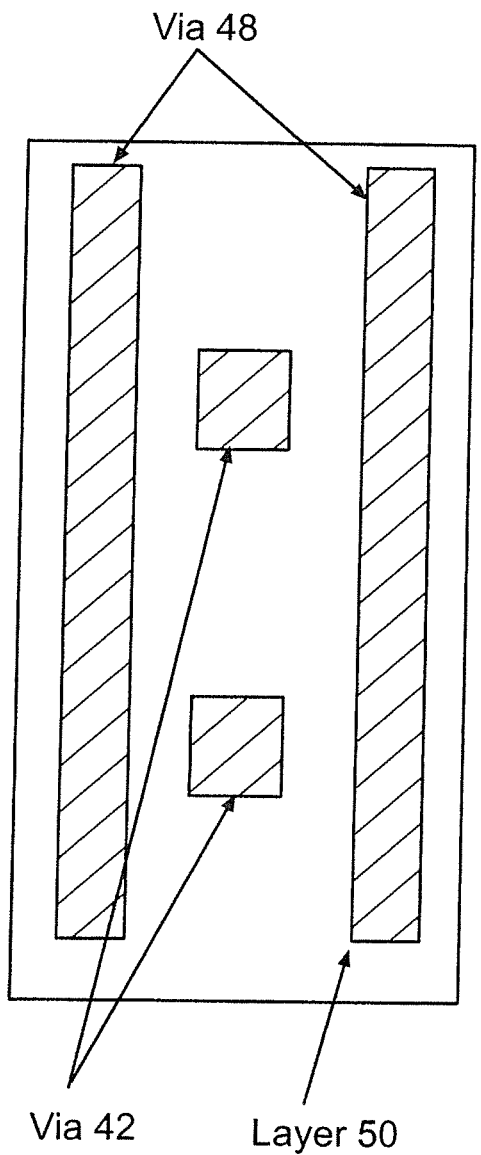
Figure 19F:
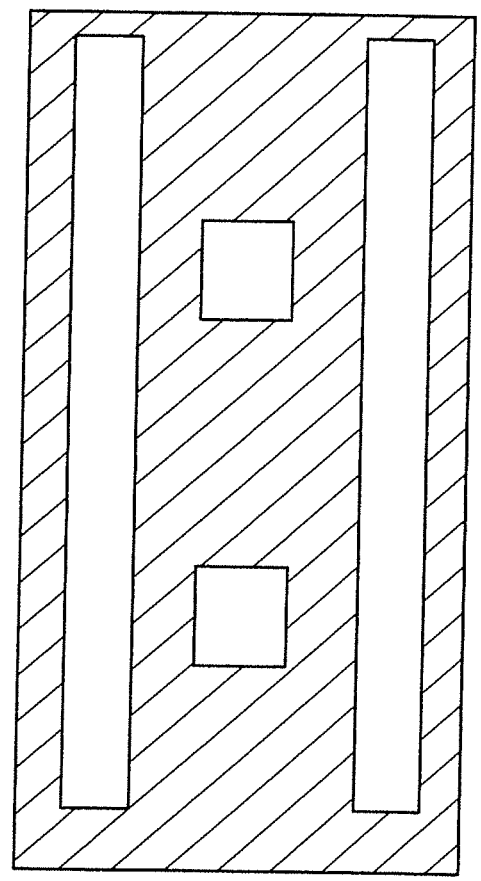
Figure 19G:
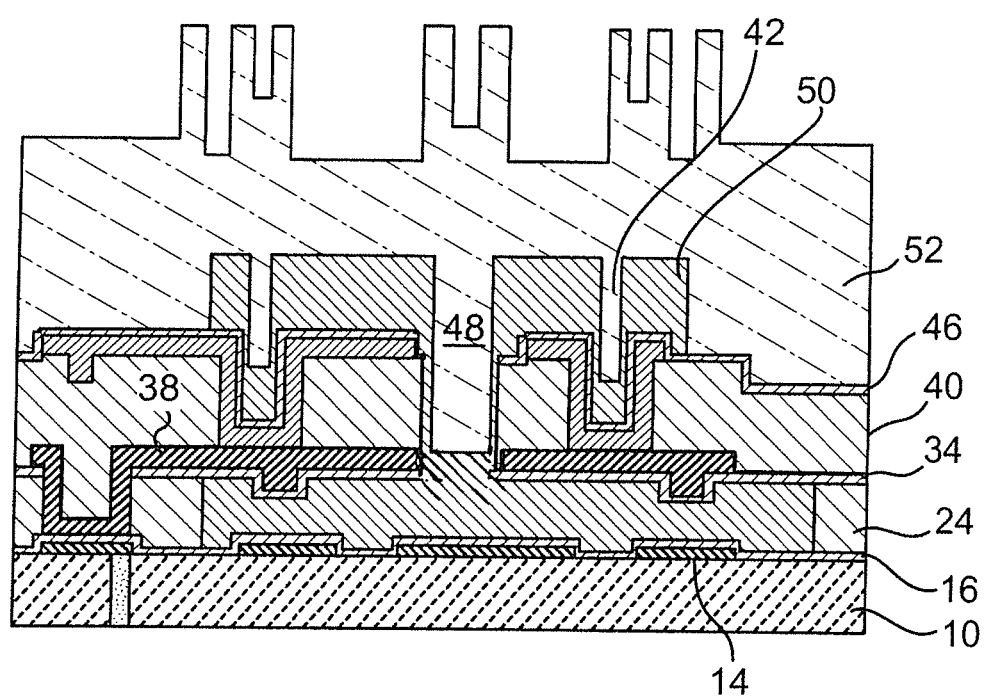
Figure 19H:
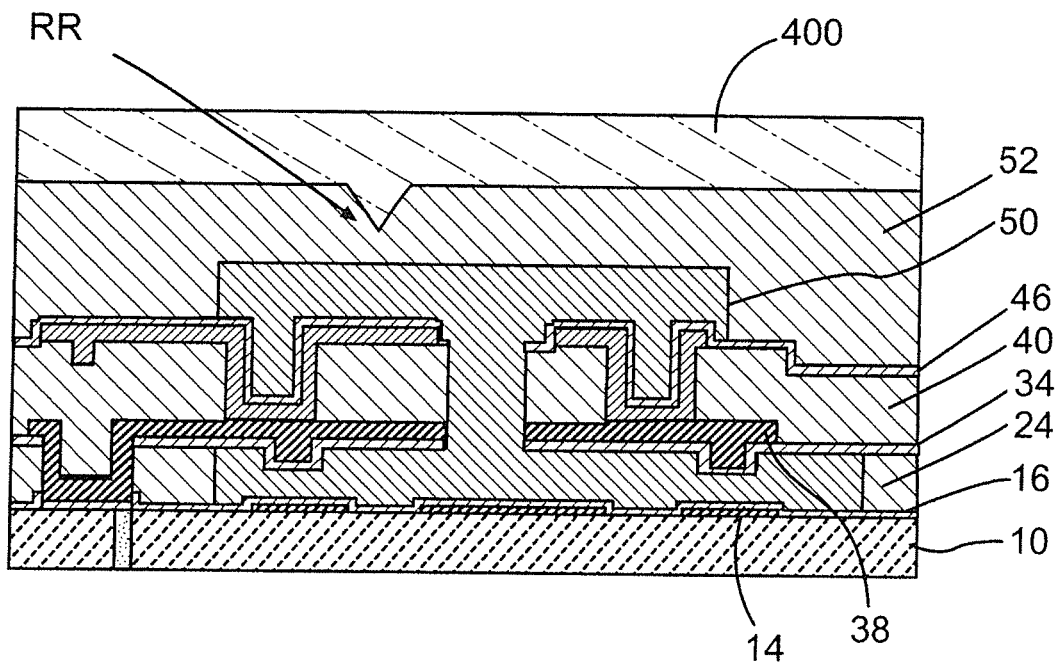

Alternatively, the reverse pattern etchback mask could be modified such that mask openings are removed in areas around the vias 42 and 48. FIG. 19E shows a top view of cavity 50, via 42, and via 48. If a reverse pattern etchback process was used with the vias 42 and 48 blocked (FIG. 19F), then the oxide would not be etched around vias 42 and 48 (FIG. 19G) and it would be easier to planarize or substantially planarize the surface of the oxide layer 52. The optional oxide CMP processes used to planarize or partially planarize oxide layer 52 can scratch the surface. An example of a surface scratch RR is shown in FIG. 19H. These surface scratches can act as crack nucleation points after the MEMS sacrificial cavity layers 18 and 50 are vented or removed. To eliminate this problem, an optional second dielectric or oxide deposition is performed, to deposit the layer 400 shown in FIG. 19H.

Figure 20:
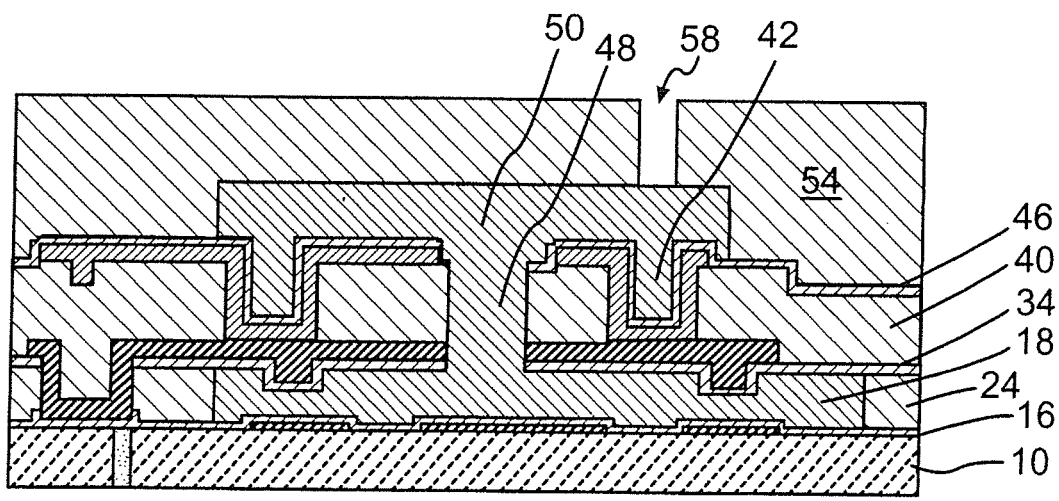

In FIG. 20, an oxide material 54, which determines the lid thickness before silicon venting, is shown on the surface. The oxide material 54 can have a thickness before venting of about 3 µm, for example. If the oxide layer 52 had not been removed or fully removed over silicon layer 50, then the total oxide thickness of layers 52 and 54 would determine the lid thickness before silicon venting. In embodiments, a vent hole 58 is patterned, and opened in the oxide lid, exposing a portion of the underlying silicon layer 50. It should be understood that more than one vent hole 58 can be formed in the oxide material 54. The vent hole 58 can be formed using conventional lithographic and etching processes known to those of skill in the art. All of the patterned features discussed in this disclosure are patterned using conventional, e.g. steppers or proximity, lithographic tooling using photomasks, as known in the art. With conventional lithography, extra features on the masks are included to measure feature size, i.e. line width, as well as registration or overlay between the feature currently being imaged and prior level features on the wafer. These extra features are commonly placed in the dicing channel between the active chips, although they can also be placed inside the chips; or active chip features can be used. To match the printed feature to active features inside the active chip, it is important but not required that the prior level features are duplicated. For example, for the vent hole 58, if a structure outside of the active chip is used for measuring feature size or overlay, it should be stacked over the upper silicon cavity 50 and, optionally, the other wires inside the cavity, so that the height off of the wafer and the optical properties (i.e. reflection) of the measured feature are the same as inside the active chip. This is especially important for the vent hole 58 because it has a relatively small width and, depending on the processing used to planarize the upper cavity, the upper cavity can extend 1 µm or more above the surrounding wafer surface, which can cause problems with resist scumming of vent hole 58 printed over the cavity if the vent hole resist width is measured outside of the cavity.

The width and height of the vent hole 58 determines the amount of material that should be deposited after silicon venting to pinch off the vent hole. In general, the amount of material that should be deposited to pinch off the vent hole 58 decreases as the vent hole width decreases; and as the vent hole aspect ratio, which is the ratio of the vent hole height to width, increases. In embodiments, a 3 µm thick pre venting lid would have a 1 µm diameter. In embodiments, the structure, and in particular, the exposed underlying silicon layer 50, can be cleaned with an HF solution prior to venting the silicon. If the vent holes 58 have too high of an aspect ratio or if there are too few vent holes, then it is difficult to vent out the sacrificial cavity material 18 and 50. The vent hole may be circular or nearly circular, to minimize the amount of subsequent material needed to pinch it off. In one exemplary embodiment, the vent hold is shaped in an octagon, which minimized the computational requirement as discussed above.

If the lid is too thin with respect to the MEMS cavity area, either post venting or during any subsequent film deposition, the lid over the evacuated or vented cavities can crack or delaminate due to high film stresses or due to MEMS beam bending up against the lid during annealing. For example, a silicon cavity 500 µm by 500 µm capped with a 1 µm oxide lid would be susceptible to cracking or delaminating after venting or after the subsequent sealing film depositions due to the residual stress of the lid oxide or the sealing films; or because the released MEMS beam pushes up against the lid during annealing. In one exemplary embodiment, approximately 1 micron of oxide lid is required per 10,000 µm$^2$ of cavity area to avoid lid cracking after venting.

In FIG. 21A, the silicon layers 50 and 18 are vented or stripped by way of the vent hole 58. In embodiments, the stripping (e.g., etching) can be performed using a XeF$_2$ etchant through the vent hole 58. The etching will strip all of the material (silicon), forming an upper cavity or chamber 60a and a lower cavity or chamber 60b, and is selective to many other materials, including SiO$_2$. As shown in this representation, the upper cavity 60a and the lower cavity 60b have planar or nearly planer walls, due to the previous etching steps of the silicon layers 18, 50. An optional HF clean can be performed to remove the native oxide and hydrogen passive the exposed silicon surface prior to venting the silicon.

Figure 21D:
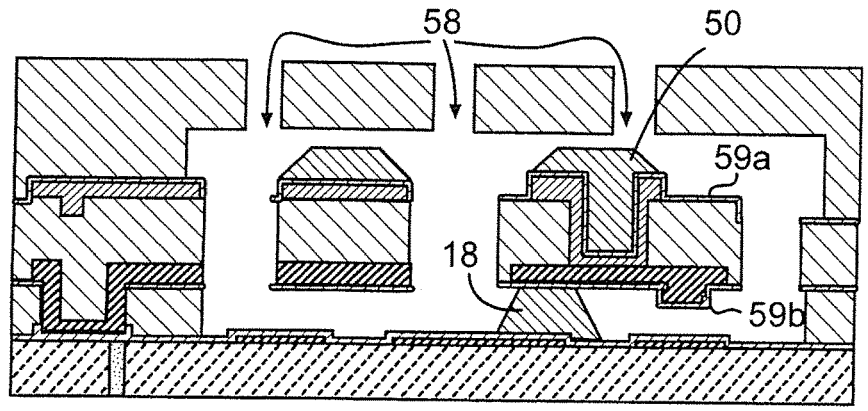

As shown in FIGS. 21B and 21C, the vent holes 58 can be formed at several locations, to portions (expose portions) of the upper silicon layer 50, the lower layer 18 or both the upper and lower silicon layer 50, 18. For example, as shown in FIG. 21B, the vent holes are formed both inside and outside the cavity vias 48. The vent holes 58 should be either round or nearly round, to minimize the amount of insulator needed to pinch them off post venting. Octagon shapes can be used instead of circles to draw the vent vias, to minimize the computational workload need to process the design data, as discussed above. In this embodiment, the etch rate of the silicon layer 50 in the upper portion 59a will etch faster than the silicon layer 18 in the lower portion 59b, thus ensuring that no undue stress is placed on the lower portion 59b, as shown in FIG. 21d. (The upper portion 59a and lower portion 59b will form the upper cavity and lower cavity of the MEMS structure.)

Figure 21E:
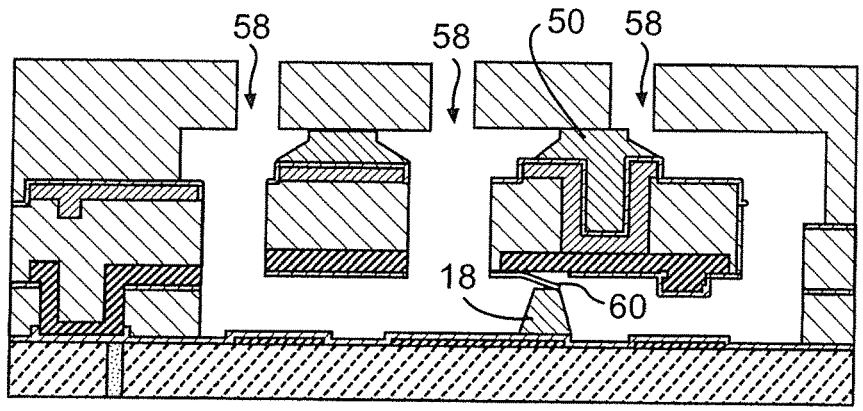

FIGS. 21D and 21E show more detailed cross sectional views of FIGS. 21B and 21C. As shown in FIG. 21D, the vent holes 58 are formed to portions of both the upper and lower silicon layers 50, 18. In this embodiment, as seen in FIG. 21D, the lower layer 18 will actually support the upper portion 59a, since it etches at a slower rate. In FIG. 21E, the vent holes 58 can be formed at several locations, but mainly to (expose) the layer 18. In this embodiment, the etch rate of the layer 18 in the lower portion 59b is faster than the silicon layer 50 in the upper portion 59b, resulting in the possibility of added stress on a MEMS beam 60 (e.g., the MEMS beam 60 may partially or wholly rip or tear out).

If the vent hole layout is such that the lower cavity 18 vents faster than upper cavity 50, for example by placing the vent holes outside of the vias (cavity vias) 48 as shown in FIG. 21C, then the lower cavity may vent before the upper cavity. This can cause stress-related cracking problems, as shown in FIG. 21C. When the lower cavity layer 18 is almost fully vented but still extends the full height of the cavity and the upper cavity silicon layer 50 is not fully vented and does extend to the full height of the upper cavity, then stress due to lid and beam upwards bending can rip out oxide 60 from the lower cavity as shown in FIG. 21C. For these reasons, it is desirable to place vent holes over the upper cavity such that the upper cavity vents before the lower cavity.

Figure 21F:
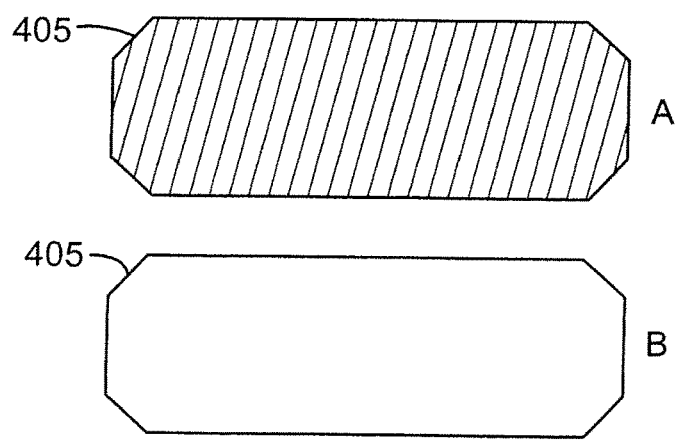

A chamfered lower cavity A and upper B cavity corner 405 is shown in FIG. 21F (also see, e.g., FIG. 21B). Chamfering the cavity corner can reduce the stress after silicon venting, resulting in reduced chance of dielectric film cracking due to temperature cycling or other stresses. A 45 degree chamfer 405 is shown; although any chamfer angle is envisioned, including a rounded corner (also represented by reference numeral 405). As mentioned previously, chamfering as opposed to rounding corners reduces the computational complexity associated with verifying that the layout does not violate the minimum line and space rules. The vias 42 and 48 inside the cavity can also be chamfered, as discussed below. In FIG. 21C, the vent holes 58 can be formed at several locations, exposing the lower layer 18. In this embodiment, the etch rate of the layer 18 in the lower portion 59b will be faster than the silicon layer 50 in the upper portion 59b. The corner of any of the wire levels can also be chamfered, 14, 38, 44, as shown in FIG. 22 to reduce overall stress.

Figure 22:
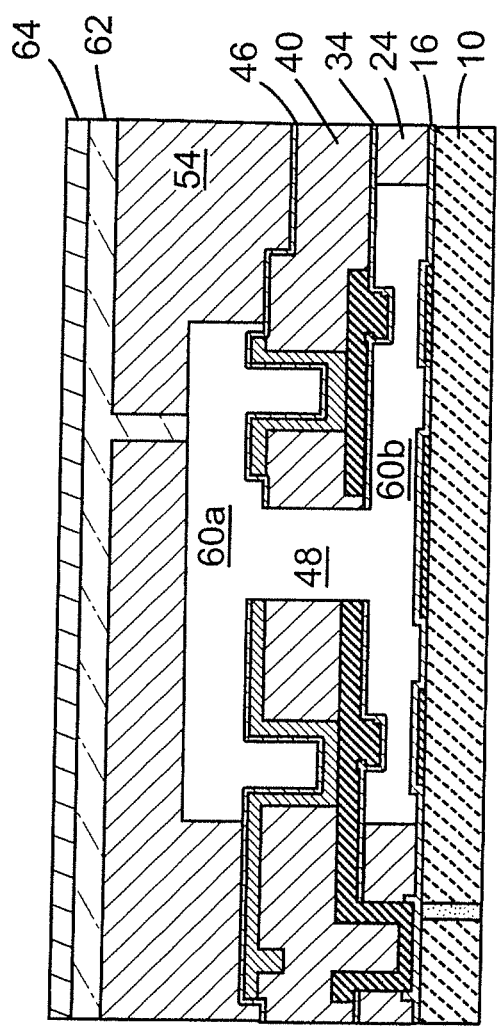

As shown in FIG. 22, the vent hole 58 can be sealed with a material 62, such as a dielectric or metal. If the sealing material 62 deposits a film inside the cavity on the beam, than it can potentially unbalance the stress of the MEMS beam, and also bond the lid to the beam in regions around vias, as discussed herein and shown by 250 in FIG. 31. To avoid this problem, in embodiments in which the vent sealing material deposits inside the cavity, the vent holes should be placed far enough away from the vias, e.g., greater than 1 micron or, in an exemplary embodiment, greater than 5 microns, so that released MEMS beam is not bonded to the lid by the vent sealing deposition. Alternatively, the vent holes can be placed in cavity areas away from the MEMS beam, so that no vent hole sealing material is deposited on the released MEMS beam. Optional layer 64 is deposited next to provide a hermetic seal. The layer 64 could be, for example, a 500 nm PECVD silicon nitride film or other films known to provide a hermetic seal over oxide layer 62.

Figure 23A:
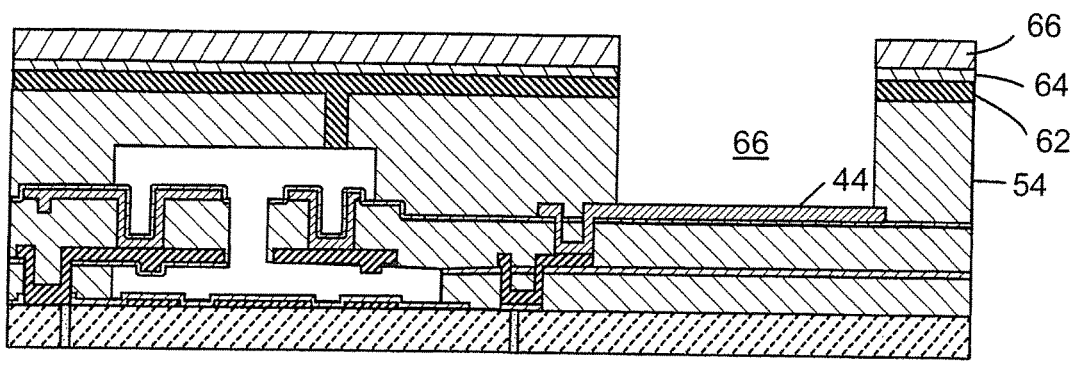

In FIG. 23A, a final via 66 is opened in the structure of FIG. 22. In embodiments, the via 66 exposes the underlying electrode 44. In embodiments, the via 66 is formed using conventional lithographic and etching processes. In further embodiments, prior to forming the via, an optional polyimide layer 68, for example, can be deposited on the nitride capping layer 64. A problem with forming this final via is its height, which can be in the range of 6-12 μm, due to the planarization of the upper silicon cavity. Long dielectric RIE steps cause problems for RIE tools, due to chamber over heating or other issues; or simply because they have low parts per hour process times and are expensive.

Figure 23B:
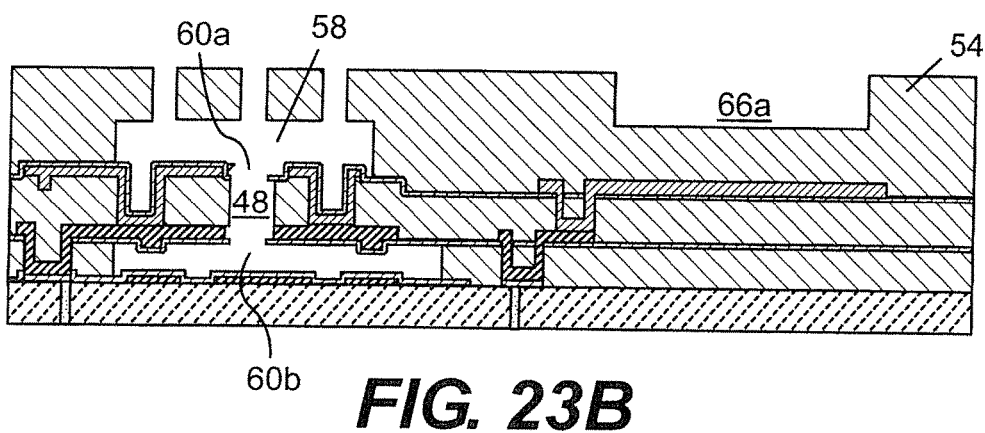
Figure 23C:
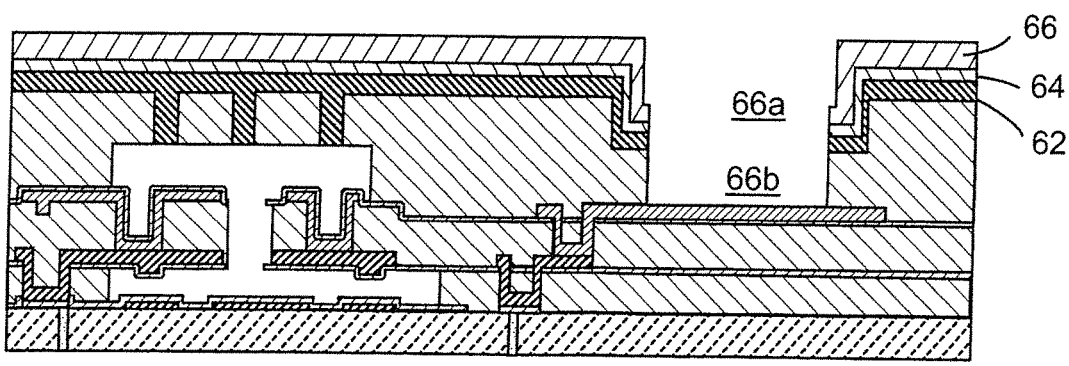

FIGS. 23B and 23C show alternative processes for forming the via. For example, a partial via 66a can be formed at the same time as the vent hole 58. After formation of the vent hole 58 (and subsequent cleaning of the of the silicon layer 50, 18) the vent hole 58 can be sealed with a dielectric material 62 and a nitride cap 64. This option, in which the final via 66 is formed by using two separate patterning and etching steps, reduces the amount of total etch time needed to fabricate the MEMS device and also tapers the angle of the final via, thus improving the Pb-free bumping gap fill. In embodiments, an optional polyimide or other polymer coating as known in the art material 68 can be deposited on the nitride cap 64. The dielectric material, 62, nitride cap 64 and polyimide material 68 would also be formed in the partial via 66a. The remaining portion of the via 66b can then be formed by etching through the dielectric material, 62, nitride cap 64 and optional polyimide material 68 to the underlying electrode 44. As noted in this representation, the partial via 66a has a larger cross section than the via 66b. For example, the via 66a can be about 60 microns across (e.g., diameter); whereas, the via 66b has a smaller dimension, e.g., 54 microns. Also, the total height of the via (formed from via 66a and 66b) can be about 9 microns. In embodiments, the optional polyimide is opening is smaller than the oxide opening, e.g., 48 microns, to cover the corners of the oxide/nitride interface at the wire corner.

Figure 24A:
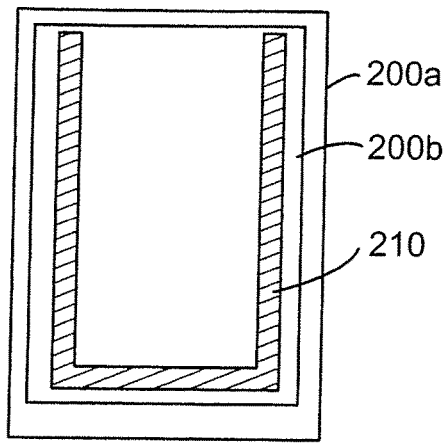
Figure 24B:
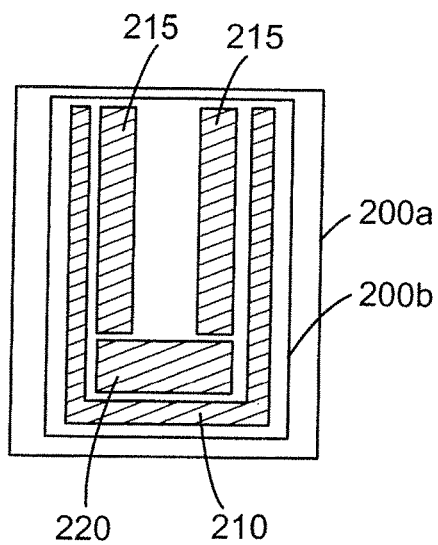
Figure 24C:
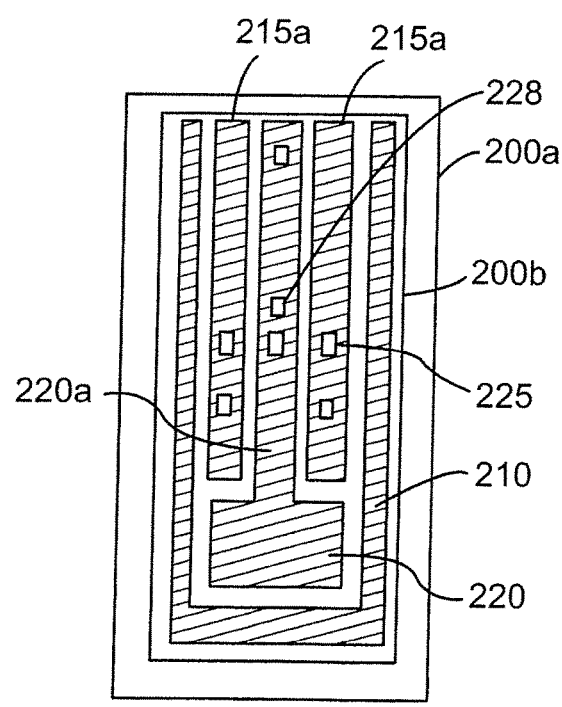

FIGS. 24A-24F show various top views of the structures fabricated in accordance with the invention. FIGS. 24A-24C show different cross sectional views of a first structure in accordance with the invention; whereas, FIGS. 24D-24F shows different cross sectional views of a second structure in accordance with the invention. More specifically, FIG. 24A shows a top view of cantilever beam structure having an upper cavity 200a and a lower cavity 200b. A cavity via 210 extends between the upper cavity 200a and the lower cavity 200b. In embodiments, the cavity via 210 is a "U" or "‖" shaped via, although other shapes are also contemplated by the present invention. The width of the cavity via 210 can be, for example, about 0.1 to 100 microns, whereas, a length of the via is about 1 to 1000 microns. In one exemplary embodiment, the cavity via 210 is 4 microns wide and 100 microns long. As discussed, a narrow cavity via, e.g. 2 μm wide, will pinch off during the upper silicon cavity deposition if it is thick enough, e.g. 5 μm, which reduces the extension of the lid oxide into the via.

Upper and lower cavities 200a and 200b, as previously described herein, can either be the same size or different sizes. The CMP processing used to form the planer lower cavity, show as 200b, can cause surface curvature on the cavity edge. To avoid this surface curvature from curving the bottom of the MEMS beam, the cavity via 48 should be placed so that the inside edge is beyond the curvature and is over the flat portion of the lower cavity.

FIG. 24B also shows the cavity via 210 extending between the upper cavity 200a and the lower cavity 200b. In addition, FIG. 24B shows first and second actuators 215, in parallel. A capacitor head 220 is provided in relation to the first and second actuators 215, which may be a lower fixed capacitor plate in accordance with aspects of the invention.

These wires, i.e., 215 and 220, are formed with layer 14 as shown in FIG. 22. Those of skill in the art should recognize that the first and second actuators (electrodes) 215 can be the electrical wires, described above. The first and second actuators (electrodes) 215 upon actuation, i.e., application of sufficient dc voltage, will cause bending of a MEMS beam.

FIG. 24C shows the cavity via 210 extending between the upper cavity 200a and the lower cavity 200b. In addition, FIG. 24C shows first and second actuators 215a, in parallel. A capacitor arm and head 220a is provided in relation to the first and second actuators 215a, which may be a lower fixed capacitor plate in accordance with aspects of the invention. The capacitor arm and head 220a extends from the edge of the cavity to the capacitor head, between the first and second actuators 215a. The MEMS capacitor is formed where element 220, in FIG. 24B, intersects element 220a, in FIG. 24C. Actuators 215a and capacitor arm and head 220a in FIG. 24C are composed of the wires 38 and 44 in FIG. 22, and, as shown, are connected by the vias 228 discussed below.

In addition, FIG. 24C shows electrical vias 228, which are connected to the lower and upper wire of the cantilever beam. The electrical vias 228 can also be connected to the capacitor arm 220a, extending between the actuators 215a. These vias are shown as 42 in FIG. 22.

Oxide pegs 225 are provided under the beam, and can extend to the capacitor arm 220a, as well as the actuators 215a. These oxide pegs 225 could also be above the actuators 215 in FIG. 21B. FIG. 24C also shows oxide pegs 225 under the beam. These oxide pegs are element 33 in FIG. 22. In operation, electrodes 215a upon actuation, will cause bending of a MEMS beam. In normal MEMS operation, an actuation voltage is applied between actuators 215 and 215a. For example, actuator 215 could be grounded and 50V could be applied to actuator 215a; −25V could be applied to actuator 215 and 25V could be applied to actuator 215a; 50V could be applied to actuator 215 and actuator 215a could be grounded; etc. These MEMS layouts have four separate inputs: lower capacitor input, upper capacitor output, lower actuator, and upper actuator. These four electrodes could be combined, as known in the art. For example, the upper actuator 215a and capacitor 220a could consist of a single connected wire; the lower actuator 215 and lower capacitor 220 electrode could consist of a single wire; or both. For these simpler 2 or 3 input devices, ac signal and dc actuation would need to be decoupled by, for example, using inductors wired to ground or dc voltages on the electrodes.

FIGS. 24D-24F show different cross sectional views of a second structure in accordance with the invention. More specifically, FIG. 24D shows a top view of cantilever beam structure having an upper cavity 300a and a lower cavity 300b. A cavity via 310 extends between the upper cavity 300a and the lower cavity 300b. In embodiments, the cavity via 310 comprises parallel strips, although other shapes are also contemplated by the present invention. The width of the cavity via 310 can be, for example, about 0.1 to 100 microns, whereas, a length of the via is about 1 to 1000 microns. In one exemplary embodiment, the via 310 is 4 microns wide and 100 microns long.

FIG. 24E also shows the cavity via 310 extending between the upper cavity 300a and the lower cavity 300b. In addition, FIG. 24E shows first, second and third actuators 315. In embodiments, the first and second actuators are in parallel and the third actuator is a lower actuator. A capacitor head 320 is between the first and second actuators, and the third (lower) actuator. The capacitor head 320 may be a lower fixed capacitor plate in accordance with aspects of the invention. These wires, i.e., 315 and 320, are formed with layer 14 as shown in FIG. 22. Those of skill in the art should recognize that the first, second and third actuators (electrodes) 315 can be the electrical wires, described above. The first, second and third actuators 315, upon actuation, will cause bending of a MEMS beam.

FIG. 24F shows the cavity via 310 extending between the upper cavity 300a and the lower cavity 300b. In addition, FIG. 24F shows first, second and third actuators (electrodes) 315a. A is provided in relation to the first, second and third actuators (electrodes) 315a. The capacitor head and arm 320a extends between the first and second actuators 315a. Actuators 315a and capacitor arm and head 320a in FIG. 24F are composed of the wires 38 and 44 in FIG. 22.

In addition, FIG. 24F shows electrical vias 328, which are connected to the lower and upper wire of the cantilever beam. The electrical vias 328 can also be connected to the capacitor arm 320a. Oxide pegs 325 are provided under the beam, and can extend to the capacitor arm 320a, as well as the lower actuator 315c. In operation, the first, second and third actuators (electrodes) 315, upon actuation, will cause bending of a MEMS beam. More specifically, the lower actuator will apply the voltage to the actuators (electrodes).

In both cases the MEMS beam includes metal/insulator/metal with an added thin insulator layer under and over the stack if the MEMS device is a capacitor. One exemplary embodiment would use 0.5 micron lower and upper metal thickness and 2 micron insulator thickness with 80 nm insulator layer over and under the beam if the device was a capacitor. In addition, the actuators 215, (FIGS. 24A-24C) or actuators 315 (FIGS. 24D-24F) would be connected to ground, so that, when the actuation voltage is applied to the actuators, the MEMS beam would actuate and bend down, as known in the art. Alternatively, the actuation voltage could be applied to the actuation electrodes in FIGS. 24C and 24F and the actuators in FIGS. 24B and 24C would be grounded. In another embodiment, the actuators and capacitor would be connected together and would need to be grounded using a dc ground, such as an inductor.

Figure 30A:
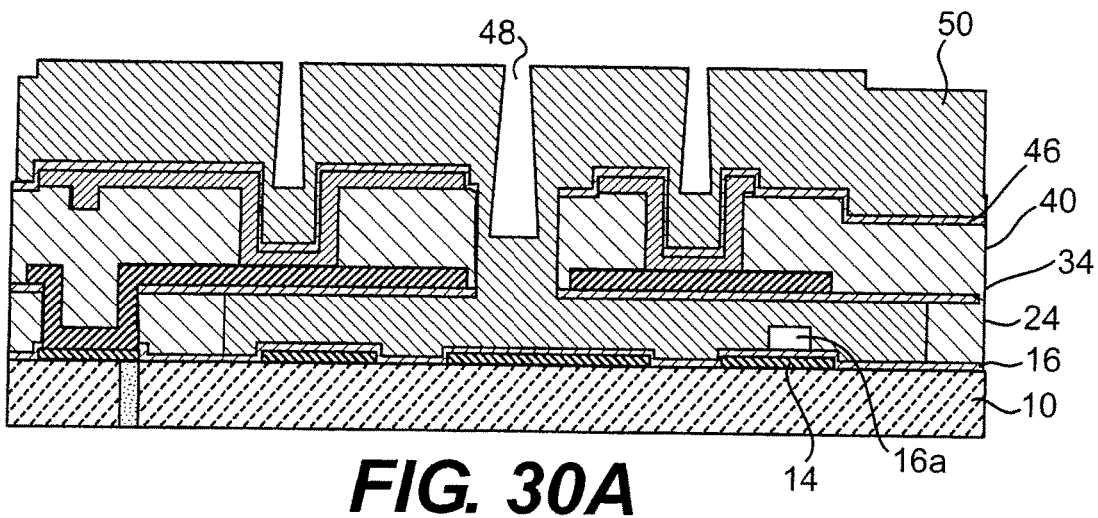
Figure 30B:
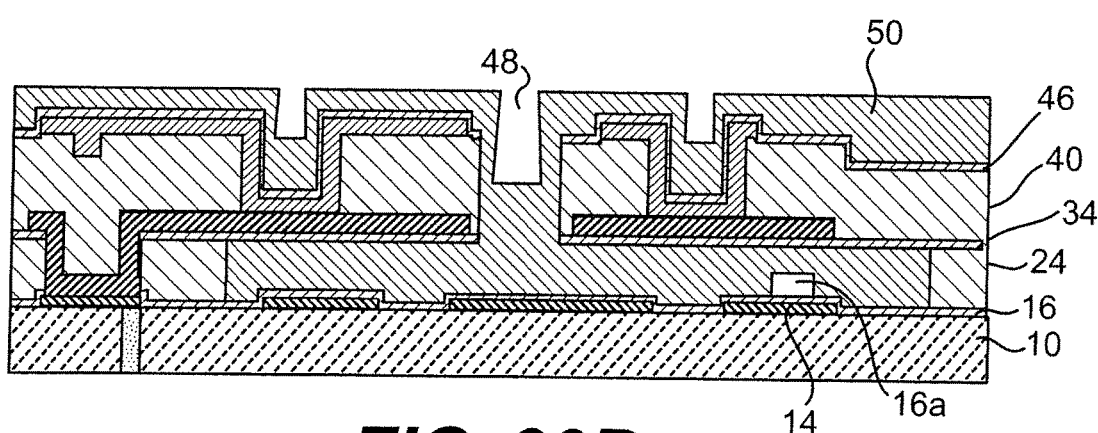
Figure 30C:
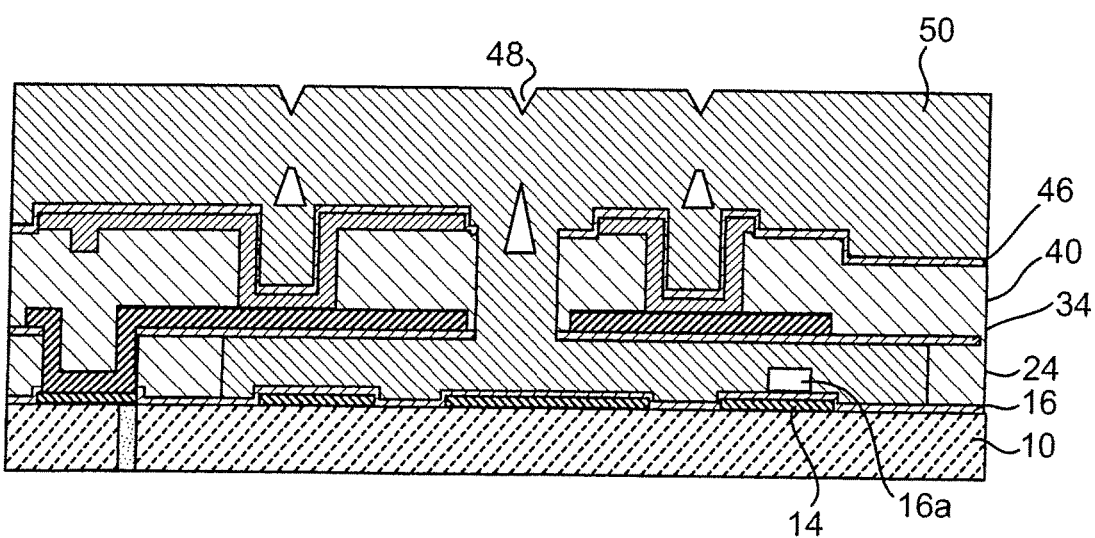
Figure 30D:
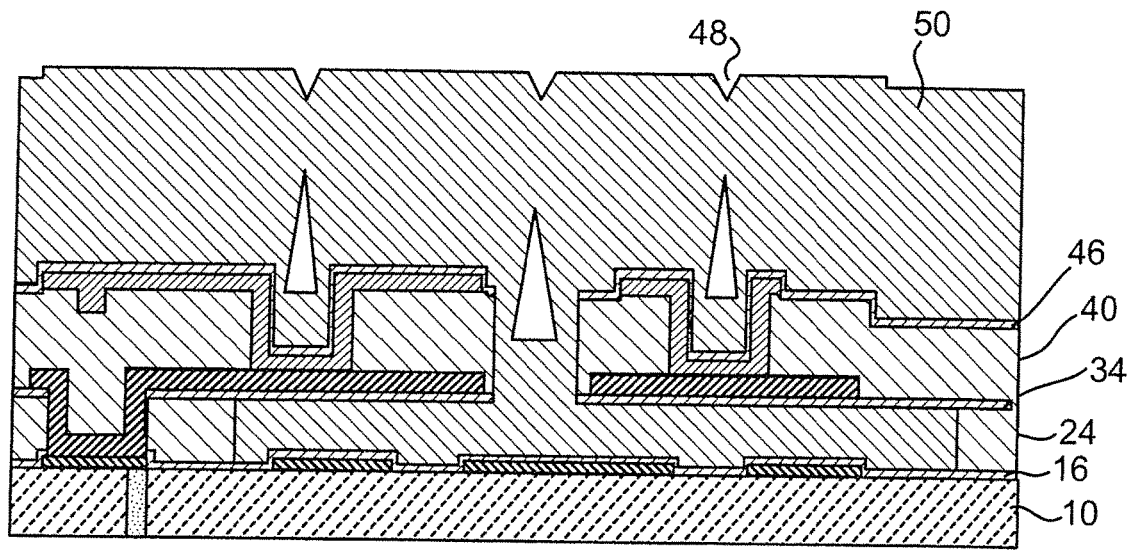
Figure 30E:
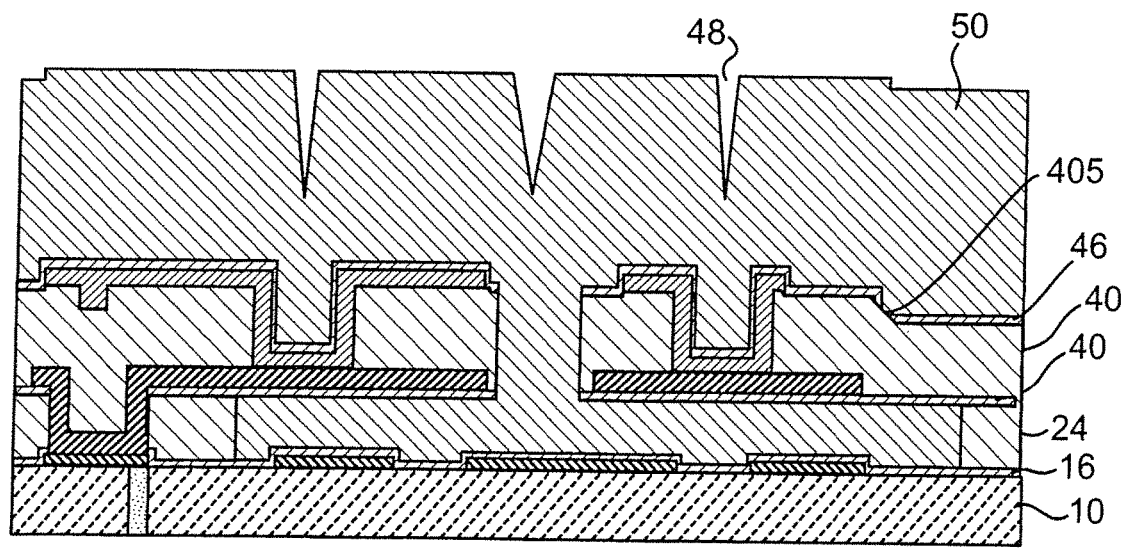

FIGS. 30A-30E show the upper cavity silicon 50 surface topography after a non-conformal silicon deposition step has been performed that has not pinched off the openings due to the electrical via 42 and cavity via 48. An unbiased PVD silicon deposition would form a 'bread loaf' profile, as shown in FIG. 30A, as known in the art. FIGS. 30A-30E also show the oxide pegs 16a. The silicon layer 50 regressively, i.e., with an undercut, covers the sidewalls of the vias and, when a MEMS cavity lid material, such as $SiO_2$ is deposited, the lid material will fill the regressive opening above the vias 42 and 48, as discussed previously. This regressive lid formation, which is shown after the lid formation, silicon venting, and cavity sealing steps in FIG. 16, can pin the lid to the beam in a rivot-like fashion if the beam bends upwards after venting where the rivet-shaped feature (250) in the lid rubs against the beam and/or bond the rivet-like lid structure to the beam (255) (See, e.g., FIG. 31.)

In FIGS. 31-33 and 35 an oxide material 54, which determines the lid thickness before silicon venting, is shown on the surface. In embodiments, vent holes 58 are opened in the oxide lid, exposing a portion of the underlying silicon layer 50. It should be understood that more than one vent hole 58 can be formed in the oxide material 54. The vent holes 58 can be formed using conventional lithographic and etching processes known to those of skill in the art. The width and height of the vent holes 58 determine the amount of material that should be deposited after silicon venting to pinch off the vent hole, as discussed in more detail below.

The vent holes 58 can be sealed with a material 62, such as a dielectric or metal, as discussed above.

Figure 34:
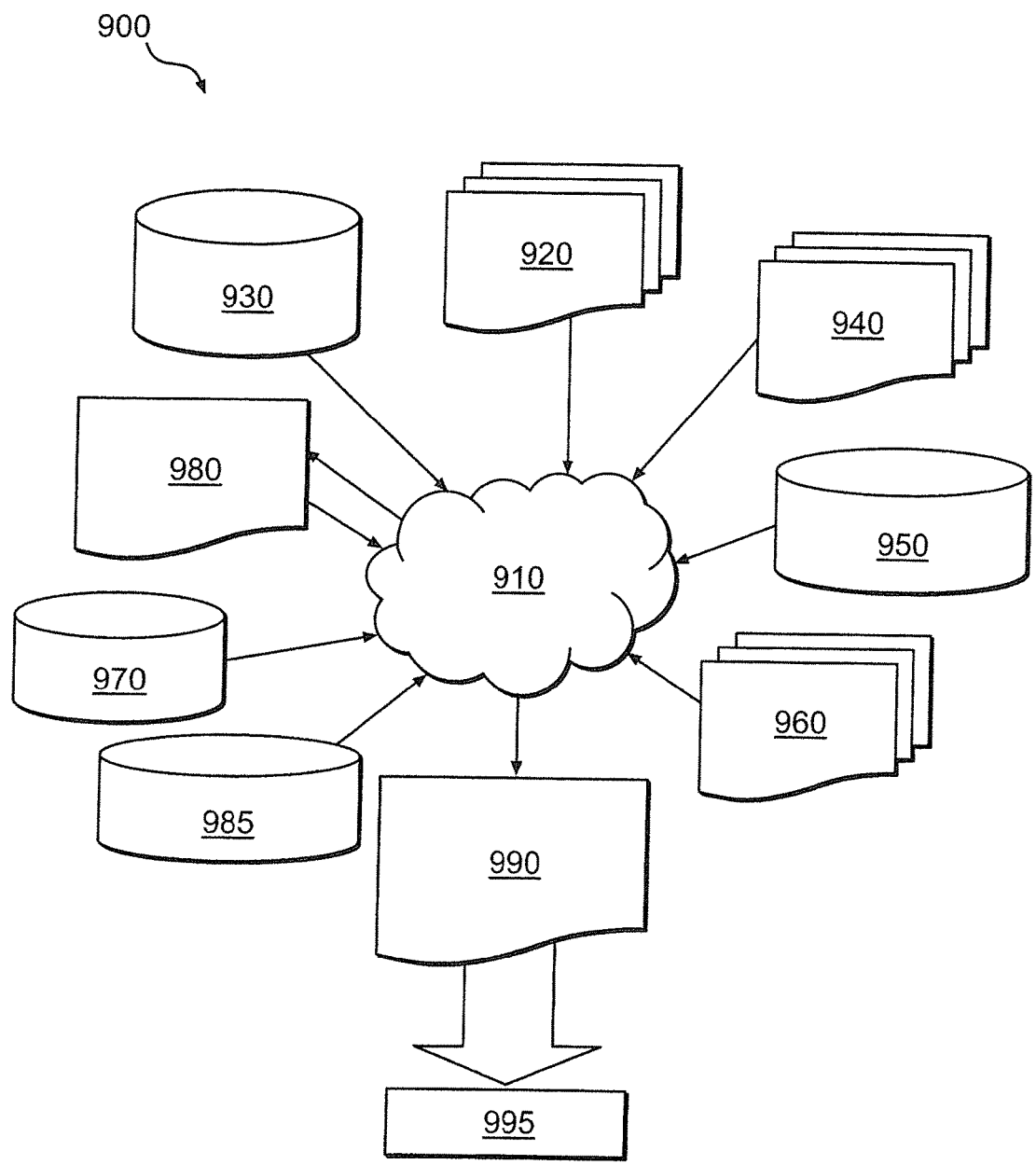
FIG. 34 is a flow diagram of a design process used in semiconductor design, manufacture, and/or test.

FIG. 34 is a flow diagram of a design process used in semiconductor design, manufacture, and/or test. FIG. 34 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1-24F, 26A-28, 30A-33, 35A, and 35B. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 34 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-24F, 26A-28, 30A-33, 35A, and 35B. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-24F, 26A-28, 30A-33, 35A, and 35B to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-24F, 26A-28, 30A-33, 35A, and 35B. In one embodiment, design structure 990 may comprise a compiled, executable HDL simulation model that functionally simulates the devices shown in FIGS. 1-24F, 26A-28, 30A-33, 35A, and 35B.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-24F, 26A-28, 30A-33, 35A, and 35B. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method of forming a Micro-Electro-Mechanical System (MEMS), comprising:
   forming a lower electrode;
   forming a beam over the lower electrode;
   forming a first sacrificial layer on the beam;
   forming an insulator layer on the first sacrificial layer;
   forming a cavity via in the insulator layer, exposing a portion of the first sacrificial layer;
   forming an upper electrode on the insulator layer;
   forming a second sacrificial layer over the beam and in the cavity via;
   forming a lid material over the second sacrificial layer and the upper electrode;
   providing a vent hole in the lid material to expose at least the second sacrificial layer;
   venting the first sacrificial layer and the second sacrificial layer to form at least a lower cavity and an upper cavity; and
   sealing the vent hole with a material.

2. The method of claim 1, wherein the beam and the upper cavity are remote from the upper electrode.

3. The method of claim 1, wherein the vent hole is rounded or chamfered.

4. The method of claim 1, wherein the vent hole is octagonal.

5. The method of claim 1, wherein the first sacrificial layer and the second sacrificial layer are silicon material.

6. The method of claim 1, further comprising performing a hafnium clean to remove oxide and hydrogen on exposed surfaces of the second sacrificial layer prior to venting the first sacrificial layer and the second sacrificial layer.

7. The method of claim 6, wherein the venting the first sacrificial layer and the second sacrificial layer is selective to silicon material.

8. The method of claim 1, wherein the vent hole is provided greater than 5 microns away from the cavity via.

9. The method of claim 1, wherein the lid material is formed prior to venting the first sacrificial layer and the second sacrificial layer.

10. The method of claim 1, wherein the material sealing the vent hole comprises dielectric material.

11. The method of claim 1, wherein the material sealing the vent hole comprises metal material.

12. The method of claim 1, wherein the lid material comprises oxide material.

* * * * *